United States Patent
Taki et al.

(10) Patent No.: US 8,135,360 B2
(45) Date of Patent: Mar. 13, 2012

(54) RFID-TAG COMMUNICATION DEVICE

(75) Inventors: Kazunari Taki, Nagoya (JP); Yuji Kiyohara, Nagoya (JP); Takuya Nagai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1626 days.

(21) Appl. No.: 11/495,693

(22) Filed: Jul. 31, 2006

(65) Prior Publication Data

US 2006/0267734 A1   Nov. 30, 2006

Related U.S. Application Data

(63) Continuation-in-part of application No. PCT/JP2005/001620, filed on Feb. 3, 2005.

(30) Foreign Application Priority Data

Feb. 4, 2004  (JP) ................................. 2004-028013
Aug. 31, 2004  (JP) ................................. 2004-251854

(51) Int. Cl.
*H04B 1/04*   (2006.01)

(52) U.S. Cl. ................... 455/114.2; 340/10.1; 340/10.5; 340/572.7

(58) Field of Classification Search ................ 455/114.2
See application file for complete search history.

(56) References Cited

U.S. PATENT DOCUMENTS

| | | | |
|---|---|---|---|
| 5,771,449 A * | 6/1998 | Blasing et al. | 455/422.1 |
| 5,974,301 A * | 10/1999 | Palmer et al. | 455/63.1 |
| 6,539,204 B1 * | 3/2003 | Marsh et al. | 455/63.1 |
| 6,704,349 B1 * | 3/2004 | Masenten | 375/219 |
| 6,784,789 B2 * | 8/2004 | Eroglu et al. | 340/10.6 |

(Continued)

FOREIGN PATENT DOCUMENTS

JP    H5 206919    8/1993

(Continued)

OTHER PUBLICATIONS

International Search Report for International Application No. PCT/JP2005/001620, mailed May 10, 2005.

(Continued)

*Primary Examiner* — Duc Nguyen
*Assistant Examiner* — Ajibola Akinyemi
(74) *Attorney, Agent, or Firm* — Baker Botts L.L.P.

(57) ABSTRACT

An RFID-tag communication device including (a) an antenna from which a transmission signal is transmitted toward an RFID tag and through which a reply signal transmitted from the RFID tag in response to the transmission signal is received, for radio communication with the RFID tag, (b) a first-cancel-signal output portion operable to generate a digital first cancel signal for suppressing a leakage signal from a received signal which is received through the antenna and which contains the leakage signal as well as the rely signal, the leakage signal being a part of the transmission signal which is transmitted from the antenna and which is returned to and received by the antenna, (c) a first-cancel-signal control portion operable to control an amplitude and/or a phase of the first cancel signal generated by the first-cancel-signal output portion, (d) a first-cancel-signal D/A converting portion operable to convert the first cancel signal generated by the first-cancel-signal output portion, into an analog signal, (e) a first signal combining portion operable to combine together the analog first cancel signal generated by the first-cancel-signal D/A converting portion, and the received signal, to obtain a first composite signal.teh

32 Claims, 44 Drawing Sheets

U.S. PATENT DOCUMENTS

| | | | |
|---|---|---|---|
| 6,813,321 B1 * | 11/2004 | Katoh et al. | 375/329 |
| 7,187,907 B2 * | 3/2007 | Widrow | 455/73 |
| 2002/0085647 A1 * | 7/2002 | Oishi et al. | 375/297 |
| 2006/0034162 A1 * | 2/2006 | Jones et al. | 370/201 |

FOREIGN PATENT DOCUMENTS

| | | |
|---|---|---|
| JP | H8 122429 | 5/1996 |
| JP | H9 0069803 | 3/1997 |
| JP | H11-308143 A | 11/1999 |
| JP | 2000 278160 | 10/2000 |
| JP | 2001-168811 A | 6/2001 |
| JP | 2002 0076978 | 3/2002 |

OTHER PUBLICATIONS

Japanese Patent Office, Office Action for Japanese Patent Application No. 2004-251854 (counterpart to above-captioned patent application), mailed Sep. 10, 2008.

Japan Patent Office; Office Action in Japanese Patent Application No. 2005-025742 (counterpart to the above-captioned U.S. patent application) mailed Oct. 20, 2009.

* cited by examiner

| $\phi$ | $\sin(\phi)$ | $\sin(\phi + 0.5\pi)$ |
|---|---|---|
| 0 | 0 | 1 |
| $0.01\pi$ | 0.03141 | 0.99951 |
| $0.02\pi$ | 0.06279 | 0.99803 |
| ... | ... | ... |
| $0.2\pi$ | 0.58779 | 0.80902 |
| ... | ... | ... |
| ... | ... | ... |
| ... | ... | ... |
| $0.5\pi$ | 1 | 0 |

FIG.34

| $\phi(*\pi)$ | $\cos(\phi)$ | $\sin(\phi)$ |
|---|---|---|
| 0 | 1 | 0 |
| 1/2 | 0 | 1 |
| 1 | -1 | 0 |
| 3/2 | 0 | -1 |

FIG.35

| $\phi$ (*$\pi$) | cos($\phi$) |
|---|---|
| 1/4 | 0.7071 |
| 3/4 | -0.7071 |
| 5/4 | -0.7071 |
| 7/4 | 0.7071 |

FIG.36

| $\phi$ (*$\pi$) | cos($\phi$) | sin($\phi$) |
|---|---|---|
| 1/4 | 0.7071 | 0.7071 |
| 3/4 | -0.707 | 0.7071 |
| 5/4 | -0.7071 | -0.7071 |
| 7/4 | 0.7071 | -0.7071 |

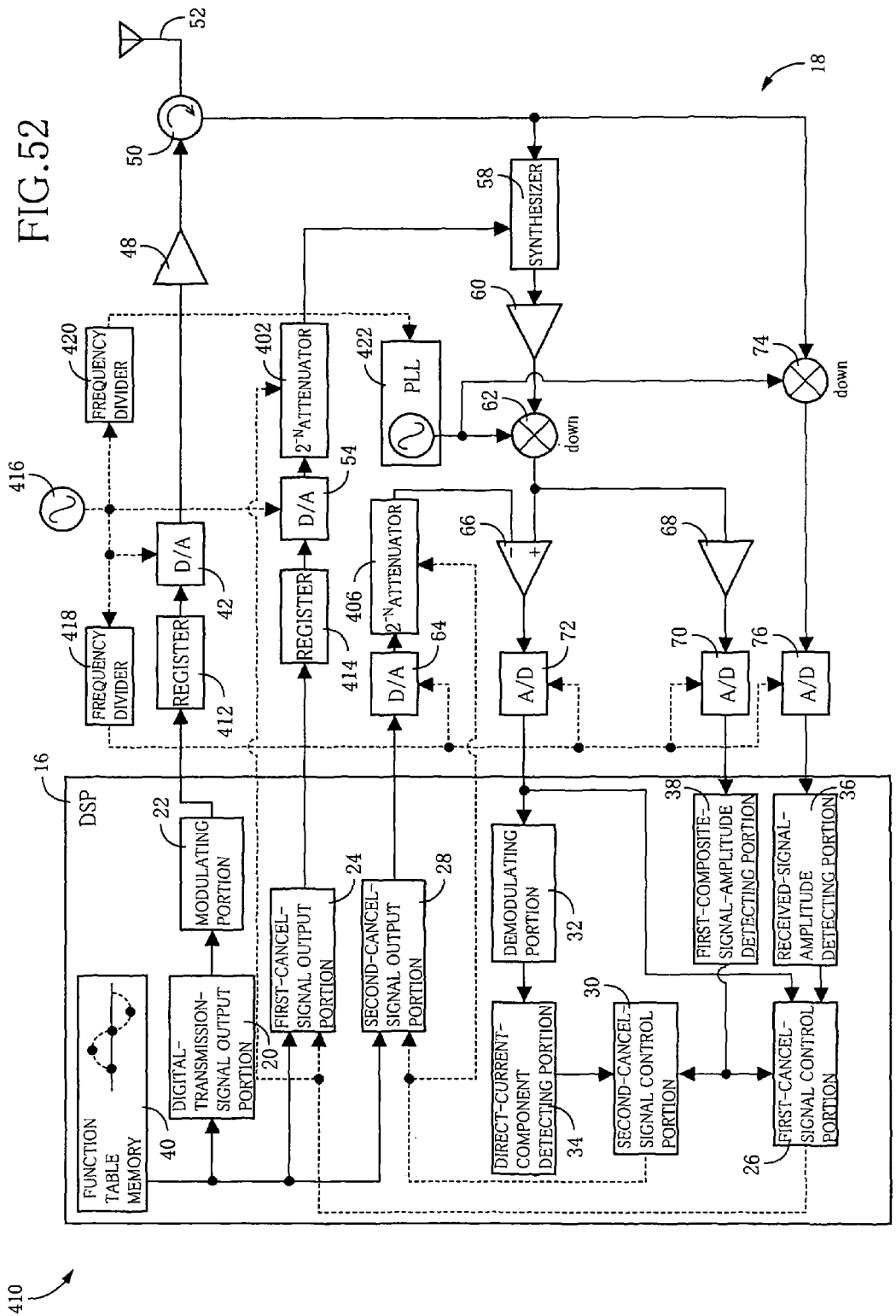

RFID-TAG COMMUNICATION DEVICE

The present application is a Continuation-in-Part of International Application No. PCT/JP2005/001620 filed Feb. 3, 2005, which claims the benefits of Japanese Patent Application No. 2004-028013 filed Feb. 4, 2004 and No. 2004-251854 filed Aug. 21, 2004.

BACKGROUND OF THE INVENTION

1. Field of the Invention

The present invention relates to an improvement of a radio-frequency identification tag (RFID-tag) communication device capable of radio communication with radio-frequency identification (RFID) tags for writing and reading information on and from the RFID tags.

2. Description of the Related Art

There is known an RFID system (radio-frequency identification system) wherein an RFID-tag (radio-frequency identification tag) communication device (e.g., an interrogator) reads out information, in a non-contact fashion, from small RFID tags (radio-frequency identification tags, e.g., transponders) on which information is written. In this RFID system, the RFID-tag communication device is capable of reading out the information from the RFID tags, even where the RFID tags are contaminated or located at positions invisible from the radio-frequency tag communication device. For this reason, the RFID system is expected to be used in various fields, such as management and inspection of articles of commodity.

Generally, the RFID-tag communication device is arranged to effect radio communication with the RFID tags, by transmitting a suitable transmission signal from its antenna toward the RFID tags, and receiving through the antenna a reply signal which is transmitted from the RFID tags in response to the signal received from the RFID-tag communication device. A leakage signal that is a part of the transmission signal which is transmitted from the RFID-tag communication device toward the RFID tags and returned to and received by the communication device and which has a relatively high intensity may be mixed with the reply signal transmitted from the RFID tags, so that the intensity of the signals received by the RFID-tag communication device may exceed a permissible upper limit of an amplifier provided in the RFID-tag communication device, whereby the received signals cannot be sufficiently amplified by the amplifier, and the reply signal component cannot be sufficiently amplified. Thus, the known RFID-tag communication device suffers from a risk of insufficiency of the signal-to-noise ratio. In view of this problem, there have been proposed techniques for suppressing the leakage signal. JP-8-122429 A discloses an example of an interference compensating device used in a mobile identification system.

However, the conventional technique to suppress the leakage signal due to the transmission signal transmitted from the RFID-tag communication device and returned to the communication device uses primarily analog processing to control the amplitude and phase of a compensating signal (canceling signal) to suppress the leakage signal, and therefore requires a comparatively expensive large phase shifter. The conventional technique has a further problem of difficulty of control of the phase shifter. Thus, there has not been a simple RFID-tag communication device developed for suppression of the leakage signal.

SUMMARY OF THE INVENTION

The present invention was made in view of the background art described above. It is therefore an object of this invention to provide an RFID-tag communication device which is simple in construction and which is capable of suppressing a leakage signal that is a part of the transmission signal which is transmitted from the communication device and which is returned to and received by the communication device.

The object indicated above may be achieved according to the principle of this invention, which provides an RFID-tag communication device including an antenna from which a transmission signal is transmitted toward an RFID tag and by which a reply signal transmitted from the RFID tag in response to the transmission signal is received, for radio communication with the RFID tag, the RFID-tag communication device comprising: a first-cancel-signal output portion operable to generate a digital first cancel signal for suppressing a leakage signal from a received signal which is received through the antenna and which contains the leakage signal as well as the rely signal, the leakage signal being a part of the transmission signal which is transmitted from the antenna and which is returned to and received by the antenna; a first-cancel-signal control portion operable to control an amplitude and/or a phase of the first cancel signal generated by the first-cancel-signal output portion; a first-cancel-signal D/A converting portion operable to convert the first cancel signal generated by the first-cancel-signal output portion, into an analog signal; and a first signal combining portion operable to combine together the analog first cancel signal generated by the first-cancel-signal D/A converting portion, and the received signal, to obtain a first composite signal.

The RFID-tag communication device of the present invention, which includes the first-cancel-signal output portion, first-cancel-signal control portion, first-cancel-signal D/A converting portion and first signal combining portion, as described above, does not require a phase shifter for controlling the first cancel signal, and permits easy control of the amplitude and/or phase of the first cancel signal by digital processing. Namely, the present RFID-tag communication device is simple in construction but is capable of suppressing the leakage signal which is a part of the transmission signal which is transmitted from the antenna and which is returned to and received by the antenna.

According to a first preferred form of the present invention, the RFID-tag communication device further comprises: a second-cancel-signal output portion operable to generate a digital second cancel signal for suppressing the leakage signal from the received signal; a second-cancel-signal control portion operable to control an amplitude and/or a phase of the second cancel signal generated by the second-cancel-signal output portion; a second-cancel-signal D/A converting portion operable to convert the second cancel signal generated by the second-cancel-signal output portion, into an analog signal; and a second signal combining portion operable to combine together the analog second cancel signal generated by the second-cancel-signal D/A converting portion, and the received signal, to obtain a second composite signal. The RFID-tag communication device according to the present first preferred form of the invention permits secondary suppression of the leakage signal at the second signal combining portion, as well as primary suppression of the leakage signal at the first signal combining portion, making it possible to further improve the signal-to-noise ratio.

In a first advantageous arrangement of the first preferred form of the invention, the first and second cancel signals have respective different frequencies. Therefore, the first and second cancel signals can be easily controlled according to the control signals corresponding to the frequencies of the first and second cancel signals.

In a second advantageous arrangement of the first preferred form of the invention, the RFID-tag communication device further comprises an amplifying portion interposed between the first and second signal combining portions and operable to amplify an amplitude of the first composite signal generated by the first signal combining portion. In this arrangement, the first composite signal and the second cancel signal can be suitably combined together by the second signal combining portion, to obtain the second composite signal. Further, the amplification of the first composite signal by the amplifying portion permits reception of the reply signal with high sensitivity.

In a third advantageous arrangement of the first preferred form of the invention, the RFID-tag communication device further comprises an amplifying portion operable to amplify an amplitude of the second composite signal generated by the second signal combining portion. This arrangement permits detection of the second composite signal with high sensitivity, by analog-to-digital conversion of the second composite signal or demodulation of the second composite signal.

According to a second preferred form of the present invention, the RFID-tag communication device further comprises a received-signal-amplitude detecting portion operable to detect an amplitude of the received signal, and the first-cancel-signal control portion controls an amplitude of the first cancel signal, on the basis of the amplitude of the received signal detected by the received-signal-amplitude detecting portion. The present form of the invention permits effective suppression of the leakage signal contained in the received signal.

According to a third preferred form of the present invention, the RFID-tag communication device according to claim 1, further comprising a first-composite-signal-amplitude detecting portion operable to detect an amplitude of the first composite signal generated by the first signal combining portion, and the first-cancel-signal control portion controls a phase of the first cancel signal, on the basis of the amplitude of the first composite signal detected by the first-composite-signal-amplitude detecting portion. The present form of the invention permits effective suppression of the leakage signal contained in the received signal.

In a fourth advantageous arrangement of the first preferred forms of the present invention, the RFID-tag communication device further comprises a first-composite-signal-amplitude detecting portion operable to detect an amplitude of the first composite signal generated by the first signal combining portion. In this communication device, the first-cancel-signal control portion controls a phase of the first cancel signal, on the basis of the amplitude of the first composite signal detected by the first-composite-signal-amplitude detecting portion, and the second-cancel-signal control portion controls an amplitude of the second cancel signal, on the basis of the amplitude of the first composite signal detected by the first-composite-signal-amplitude detecting portion. This arrangement permits effective suppression of the leakage signal contained in the received signal.

In a fifth advantageous arrangement of the first preferred form of the invention, the RFID-tag communication device further comprises a demodulating portion operable to demodulate the second composite signal generated by the second signal combining portion, and a direct-current-component detecting portion operable to detect a direct current component of the second composite signal demodulated by the demodulating portion. In this communication device, the second-cancel-signal control portion controls a phase of the second cancel signal on the basis of the direct current component of the demodulated second composite signal detected by the direct-current-component detecting portion. This arrangement permits effective suppression of the leakage signal contained in the received signal.

Preferably, the RFID-tag communication device according to the fifth advantageous arrangement of the first preferred form of the invention further comprises: a first-composite-signal-amplitude detecting portion operable to detect an amplitude of the first composite signal generated by the first signal combining portion; a digital-transmission-signal output portion operable to generate the transmission signal in the form of a digital signal; a transmission-signal D/A converting portion operable to covert the digital transmission signal generated by the digital-transmission-signal output portion, into an analog signal; a first-composite-signal A/D converting portion interposed between the first signal combining portion and the first-composite-signal-amplitude detecting portion and operable to convert the first composite signal generated by the first signal combining portion, into a digital signal; a second-composite-signal A/D converting portion interposed between the second signal combining portion and the demodulating portion and operable to convert the second composite signal generated by the second signal combining portion, into an analog signal; and a received-signal A/D converting portion operable to convert the received signal into an analog signal, wherein the first-cancel-signal control portion controls a phase of the first cancel signal, on the basis of the amplitude of the first composite signal detected by the first-composite-signal-amplitude detecting portion. In this communication device, the first-cancel-signal D/A converting portion, the second-cancel-signal D/A converting portion, the transmission-signal D/A converting portion, the first-composite-signal A/D converting portion, the second-composite-signal A/D converting portion and the receive-signal A/D converting portion use a common clock signal. The present communication device does not suffer from a difference in the reference phase between the transmission signal and the received signal, and permits effective suppression of the leakage signal contained in the received signal. In this respect, it is noted that the demodulation of the received signal the frequency of which has been reduced to an intermediate frequency has a risk of considerable generation of a relatively low frequency component upon the demodulation due to a difference between the frequency of the clock signal of the A/D converting portions and the intermediate frequency. However, this risk can be prevented by using the common clock signal for the digital-to-analog conversion and the analog-to-digital conversion.

According to a fourth preferred form of the present invention, the RFID-tag communication device further comprises: a local-oscillation-signal output portion operable to generate a local oscillation signal: a first up-converter operable to increase a frequency of the analog transmission signal generated by the transmission-signal D/A converting portion, by an amount corresponding to a frequency of the local oscillation signal generated by the local-oscillation-signal output portion; and a first down-converter operable to reduce a frequency of the first composite signal generated by the first signal combining portion, by the frequency of said local oscillation signal generated by the local-oscillation-signal output portion. In the present communication device, the analog-to-digital conversion of the first composite signal and the digital-to-analog conversion of the transmission signal can be effected with a simple converter arrangement using relatively inexpensive A/D and D/A converters.

In a first advantageous arrangement of the fourth preferred form of this invention, the RFID-tag communication device further comprises a second down-converter operable to reduce a frequency of the received signal, by an amount corresponding to the frequency of the local oscillation signal generated by the local-oscillation-signal output portion. In this communication device, the analog-to-digital conversion of the received signal can be effected by using a simple converter arrangement using a relatively inexpensive A/D converter.

According to a sixth advantageous arrangement of the first preferred form of this invention, the RFID-tag communication device further comprises a digital-transmission-signal output portion operable to generate the transmission signal in the form of a digital signal, and a table storing a sine-wave or cosine-wave table which represent predetermined sampling values corresponding to respective phases at predetermined sampling points, wherein the digital-transmission-signal output portion generates the transmission signal on the basis of the sine-wave or cosine-wave table. In this communication device, the digital-transmission-signal output portion can generate the digital transmission signal, with a relatively simple arrangement.

In the sixth advantageous arrangement of the first preferred form of the invention, the first-cancel-signal output portion is preferably arranged to generate the first cancel signal on the basis of the sine-wave or cosine-wave table, and the first-cancel-signal control portion is preferably arranged to control a phase of the first cancel signal by changing positions of the sine-wave or cosine-wave table from which the sampling values are read out. In this communication device, the first-cancel-signal output portion can generate the digital first cancel signal with a relatively simple arrangement, and the phase of the first cancel signal can be easily controlled.

Further, the invention, the first-cancel-signal control portion is preferably arranged to control an amplitude of the first cancel signal by multiplying the digital signal generated on the basis of the sine-wave or cosine-wave table, by a predetermined control value. In this communication device, the amplitude of the first cancel signal can be easily controlled.

In the sixth advantageous arrangement of the first preferred form of the invention, the second-cancel-signal output portion is preferably arranged to generate the second cancel signal on the basis of the sine-wave or cosine-wave table, and the second-cancel-signal control portion is preferably arranged to control a phase of the second cancel signal, by changing positions of the sine-wave or cosine-wave table from which the sampling values are read out. In this communication device, the second-cancel-signal output portion can generate the digital second cancel signal with a relatively simple arrangement, and the phase of the second cancel signal can be easily controlled.

Further, the second-cancel-signal control portion is preferably arranged to control an amplitude of the second cancel signal, by multiplying the digital signal generated on the basis of the sine-wave or cosine-wave table, by a predetermined control value. In this communication device, the amplitude of the first cancel signal can be easily controlled.

In the sixth advantageous arrangement of the first preferred form of the invention, the RFID-tag communication device preferably further comprises a local-oscillation-signal output portion operable to generate a local oscillation signal, and a down-converter operable to reduce an amplitude of said received signal by an amount corresponding to a frequency of the local oscillation signal generated by the local-oscillation-signal output portion. In this case, the first-cancel-signal control portion controls an amplitude and a phase of the first cancel signal on the basis of the received signal or an output of the down-converter, and controls the phase of the first cancel signal on the basis of the second composite signal generated by the second signal combining portion. This arrangement permits effective suppression of the leakage signal contained in the received signal. Where the first-cancel-signal control portion is arranged to set initial values of the amplitude and phase of the first cancel signal on the basis of the received signal or the first composite signal, the time required for subsequent control of the phase of the first cancel signal can be reduced.

According to a fifth preferred form of this invention, the RFID-tag communication device further comprises: a third-cancel-signal output portion operable to generate a third cancel signal for suppressing the leakage signal from the received signal; a third signal combining portion operable to combine together the third cancel signal generated by the third-cancel-signal output portion and the received signal, to obtain a third composite signal. In this form of the invention, the first-cancel-signal control portion controls an amplitude of the first cancel signal on the basis of the third composite signal generated by the third signal combining portion. In this communication device, the reply signal can be detected with high sensitivity, even where the received signal contains a comparatively large amount of the leakage signal (that is a part of the transmission signal transmitted from and returned to the communication device), or contains noise signals mixed therein due to reflection of the transmitted transmission signal by any structural body located near the communication device. In addition, the present communication device permits the first signal combining portion to have a relatively low upper limit of its input voltage, thereby making it possible to reduce the amount of generation of noises.

In a second advantageous arrangement of the fourth preferred form of the invention, the local-oscillation-signal output portion is operable to effect hopping of frequency of the local oscillation signal. This arrangement is effective to prevent the local-oscillation-signal output portion from disturbing or being disturbed by an operation of radio communication not associated with the radio communication with the RFID tag.

According to a sixth preferred form of the present invention, the RFID-tag communication device further comprises: a sine-wave-signal generating portion operable to generate a first sine-wave signal and a second sine-wave signal which have respective different phases; an amplitude control portion operable to control amplitudes of the first and second sine-wave signals generated by the sine-wave-signal generating portion; and a sine-wave synthesizing portion operable to combine together the first and second sine-wave signals the amplitudes of which have been controlled by the amplitude control portion, to synthesize a composite sine-wave signal for radio communication. The second sine-wave signal consists of a first component the phase of which is different by 90° from that of the first sine-wave signal, and a second component which has the same phase as that of the second sine-wave signal. The second component is combined with the second sine-wave signal into a sine-wave signal, while the first component is a cosine signal. The sine-wave signal and the cosine-wave signals which have respective different amplitudes are combined together to synthesize a composite sine-wave signal. Thus, the present RFID-tag communication device has a simple arrangement for changing the phase of the composite sine-wave signal, namely, a simple inexpensive phase shifting circuit arrangement, even where the antenna has a relatively large number of elements.

Where the antenna includes a plurality of transmitter elements, the sine-wave-signal generating portion is commonly used for the plurality of transmitter elements of the antenna, and the first and second sine-wave signals are amplified by a plurality of amplitude control portions corresponding to the respective transmitter elements, and are combined together by a plurality of sine-wave synthesizing portions corresponding to the respective transmitter elements. In this case, the circuit arrangement associated with the generation of the first and second sine-wave signals is simple and is accordingly inexpensive, even where the antenna has a relatively large number of transmitter elements.

In a first advantageous arrangement of the sixth preferred form of the invention, the sine-wave-signal generating portion generates the first and second sine-wave signals which have a phase difference of about 90°, and the sine-wave synthesizing portion generates the composite sine-wave signal having an amplitude and a phase which are different from those of the first and second sine-wave signals. In this arrangement, the first and second sine-wave signals can be provided as the sine-wave and cosine-wave signals, which are combined together by the sine-wave-signal combining portion to synthesize the composite sine-wave signal, so that the amplitude of the composite sine-wave signal can be easily controlled.

In the first advantageous arrangement of the sixth preferred form of the invention, the sine-wave-signal generating portion preferably includes a carrier-wave output portion operable to generate the first sine-wave signal as the transmission signal in the form of a carrier wave for obtaining an access to said RFID tag. In this case, the antenna comprises a transmitter portion operable to transmit the carrier wave generated by the carrier-wave output portion, toward the RFID tag, and a receiver portion operable to receive the reply signal transmitted from the RFID tag in response to the carrier wave, and the sine-wave synthesizing portion generates the composite sine-wave signal as said first cancel signal which has an amplitude substantially equal to an amplitude of the leakage signal, and a phase that is reversed with respect to that of the leakage signal. This arrangement permits detection of the reply signal with high sensitivity, owing to the first cancel signal generated by the sine-wave synthesizing portion to suppress or offset (cancel) the leakage signal that is a part of the transmission signal or carrier wave which is transmitted from the transmitter portion and which is returned to and received by the receiver portion.

In the first advantageous arrangement of the sixth preferred form of the invention, the sine-wave generating portion preferably includes a first digital-to-analog converting portion operable to convert a set of sine-wave sampling values into the first sine-wave signal, and a second digital-to-analog converting portion operable to convert a set of sine-wave sampling values into the second sine-wave signal. In this case, the first and second sine-wave signals can be generated by the first and second digital-to-analog converters, by converting the set of sine-wave sampling values.

In the first advantageous arrangement of the sixth preferred form of the invention, the first signal combining portion is preferably arranged to obtain the first composite signal by combining together the received signal received by the receiver portion, and the first cancel signal generated by the sine-wave synthesizing portion. In this case, the RFID-tag communication device further comprises an analog-to-digital converting portion operable to convert the first composite signal into an analog signal, and the first digital-to-analog converting portion and the analog-to-digital converting portion receive a common clock signal. Accordingly, the first digital-to-analog converting portion arranged to convert the set of sine-wave sampling values into the first sine-wave signal, and the analog-to-digital converting portion arranged to convert the first composite signal into the analog signal can be operated in synchronization with each other.

Preferably, the RFID-tag communication device according to the first advantageous arrangement of the sixth preferred form of this invention further comprises an up-converter operable to increase a frequency of the composite sine-wave signal generated by the sine-wave synthesizing portion, and a down-converter operable to reduce a frequency of the first composite signal generated by the first signal combining portion. In the presence of the up-converter to increase the frequency of the composite sine-wave signal, the sine-wave generating portion may be arranged to generate the first and second sine-wave signals having relatively low frequencies, so that these first and second sine-wave signals having the low frequencies are combined together by the sine-wave synthesizing portion, whereby the cost of manufacture of the communication device can be lowered. Further, the provision of the down-converter to reduce the frequency of the first composite signal generated by the first signal combining portion permits the analog-to-digital converting portion to convert the first composite signal into the digital signal after the frequency of the first composite signal has been reduced. In this respect, too, the cost of manufacture of the communication device can be lowered In the first advantageous arrangement of the sixth preferred form of the invention, the sine-wave synthesizing portion is preferably arranged to obtain, in addition to the first cancel signal, a second cancel signal having an amplitude substantially equal to an amplitude of the carrier wave, and a phase that is reversed with respect to that of the carrier wave. In this case, the sensitivity of reception of the reply signal can be further improved owing to the secondary suppression of the leakage signal according to the second cancel signal, in addition to the primary suppression of the leakage signal according to the first cancel signal.

In a second advantageous arrangement of the sixth preferred form of the invention, the antenna has a plurality of antenna elements for radio communication with the RFID tag, and the sine-wave synthesizing portion generates the composite sine-wave signal a phase of which has been controlled with respect to the plurality of antenna elements, such that the generated composite sine-wave signal is transmitted toward said RFID tag while a directivity of the plurality of antenna elements is controlled. In this arrangement, the composite sine-wave signal generated by the sine-wave synthesizing portion is transmitted toward the RFID tag while the directivity of the plurality of antenna elements is controlled.

In the second advantageous arrangement of the sixth preferred form of the invention, the sine-wave synthesizing portion is preferably arranged to transmit, toward the RFID tag, the composite sine-wave signal at least the phase of which has been controlled, such that the direction in which the plurality of antennas have a highest gain and which is temporarily held is sequentially changed. In this case, a so-called "phased-array control" of the phase of the composite sine-wave signal is effected so as, to temporarily hold and sequentially change the direction in which the plurality of antennas have the highest gain, so that the reply signal transmitted from the RFID-tag can be detected by the RFID-tag communication device, with a high degree of sensitivity.

In the second advantageous arrangement of the sixth preferred form of the invention, the sine-wave synthesizing portion is preferably arranged to transmit, toward the RFID tag, the composite sine-wave signal an amplitude and the phase of which have been controlled, such that a sensitivity of reception by the plurality of antennas of the reply signal transmitted from the RFID tag is maximized. In this case, a so-called "adaptive-array control" of the amplitude and phase of the composite sine-wave signal is effected so as to maximize the sensitivity of reception by the plurality of antennas of the reply signal transmitted from the RFID tag, so that the reply signal can be detected by the RFID-tag communication device, with a high degree of sensitivity.

In the second advantageous arrangement of the sixth preferred form of the invention, the sine-wave generating portion preferably includes a first digital-analog converter operable to convert a set of sine-wave sampling values into the first sine-wave signal, and a second digital-analog converter operable to convert a set of sine-wave sampling values into the second sine-wave signal. In this case, the first and second sine-wave signals are generated by the first and second digital-to-analog sine-wave signals, by converting the sets of sine-wave sampling values.

In the second advantageous arrangement of the sixth preferred form of the invention, the RFID-tag communication device preferably further comprises an up-converter operable to increase a frequency of the composite sine-wave signal synthesized by the sine-wave synthesizing portion. The provision of the up-converter to increase the frequency of the composite sine-wave signal permits the first and second sine-wave signals to have comparatively low frequencies, before the first and second sine-wave signals are combined together by the sine-wave synthesizing portion to synthesize the composite sine-wave signal, so that the cost of manufacture of the RFID-tag communication device can be lowered.

In a third advantageous arrangement of the sixth preferred form of the invention, the amplitude control portion includes a first variable attenuator or amplifier operable to control the amplitude of the first sine-wave signal, and a second variable attenuator or amplifier operable to control the amplitude of the second sine-wave signal, and a polarity switching portion operable to change polarities of the first and second sine-wave signals. In this case, the amplitudes of the first and sine-wave signals are controlled by the respective variable attenuators or amplifiers, while the polarities of the first and second sine-wave signals are controlled by the polarity switching portion. Namely, the amplitude and polarities of the first sine-wave signal (sine signal) and the second sine-wave signal (cosine signal) that are to be combined together by the sine-wave synthesizing portion to synthesize the composite sine-wave signal having the desired phase can be selected as desired with a high degree of freedom.

In the third advantageous arrangement of the sixth preferred form of the invention, the amplitude control portion includes a logic circuit operable to generate a control signal in the form of a serial signal, and a registering portion operable to convert the serial signal into a parallel signal and generate an amplitude control signal and a polarity control signal on the basis of the parallel signal, the amplitude control signal and the polarity control signal being applied to the first and second variable attenuators or amplifiers and the polarity switching portion for controlling the amplitudes and polarities of the first and second sine-wave signals. The amplitude control signal generated on the basis of the parallel signal obtained by converting the serial signal generated by the logic circuit is applied to the variable attenuators or amplifiers to control the amplitudes of the first and second sine-wave signals, while the polarity control signal similarly generated is applied to the polarity switching portion to control the polarities of the first and second sine-wave signals.

According to the present invention, there is also provided an RFID-tag communication device comprising: a first-cancel-signal output portion operable to generate a first cancel signal in the form of a digital signal for suppressing from a received signal received by an antenna a leakage signal that is a part of a transmission signal which is transmitted from the antenna and which is returned to and received by the antenna; a first-cancel-signal D/A converting portion operable to convert the first cancel signal generated by the first-cancel-signal output portion, into an analog signal; a first cancel-signal control portion operable to generate a first control signal for controlling an amplitude and/or a phase of the first cancel signal generated by the first-cancel-signal output portion, a first-cancel-signal attenuator operable according to the first control signal generated by the first-cancel-signal control portion, to attenuate the analog first cancel signal generated by the first-cancel-signal D/A converting portion, to an amplitude corresponding to the leakage signal; a first signal combining portion operable to combine together the first cancel signal which has been attenuated by the first-cancel-signal attenuator, and the received signal, to obtain a first composite signal. Accordingly, the present RFID-tag communication device permits effective suppression of the leakage signal by adequately controlling the first-cancel-signal attenuator depending upon the level of the leakage signal, even where the leakage signal has a comparatively low intensity. Namely, the present RFID-tag communication device is capable of suppressing the leakage signal with a simple arrangement, irrespective of the level or intensity of the leakage signal.

The first-cancel-signal attenuator may be arranged to attenuate the amplitude of the first cancel signal to a value which is closest to but not larger than the amplitude of the leakage signal. In this case, the amplitude of the first control signal generated by the first-cancel-signal control portion can be made equal to a maximum output amplitude of the first-cancel-signal D/A converting portion, or equal to a value close to ½ of the maximum output amplitude, so that the amplitude and phase of the first cancel signal can be accurately controlled, and the leakage signal can be effectively suppressed.

The first-cancel-signal attenuator may be arranged to attenuate the amplitude of the first cancel signal to a value which is larger than and closest to the amplitude of the leakage signal. In this case, the leakage signal can be effectively suppressed.

Further, the first-cancel-signal control portion may be arranged to generate the first control signal which causes the amplitude of the first cancel signal generated by the first-cancel-signal D/A converting portion, to be equal to ½ of the maximum amplitude, so that the leakage signal can be sufficiently suppressed.

The RFID-tag communication device 440 further includes: a second-cancel-signal output portion operable to generate the second cancel signal in the form of a digital signal for suppressing from the received signal the leakage signal the second-cancel-signal D/A converting portion operable to convert the second cancel signal generated by the second-cancel-signal output portion, into an analog signal; a second-cancel-signal output control operable to generate a second control signal for controlling an amplitude and/or a phase of the second cancel signal generated by the second-cancel-signal output portion; a second-cancel-signal attenuator operable according to the second control signal generated by the second-cancel-signal control portion, to attenuate the analog second cancel signal generated by the second-cancel-signal D/A converting portion, to an amplitude corresponding to the leakage signal; and a second signal combining portion operable to combine together the second cancel signal which has been attenuated by the second-cancel-signal attenuator, and the first composite signal generated by the first signal combining portion, to obtain a second composite signal. Accordingly, the present RFID-tag communication device permits secondary suppression of the leakage signal at the second signal combining portion, as well as primary suppression of the leakage signal at the first signal combining portion, making it possible to further improve the signal-to-noise ratio.

The RFID-tag communication device described above may further comprise an up-converter operable to increase a frequency of the analog first cancel signal generated by the first-cancel-signal D/A converting portion, and said first-cancel-signal attenuator attenuates the first cancel signal the frequency of which has been increased by the up-converter, by an amount corresponding to the leakage signal. This arrangement permits effective suppression of the leakage signal. The RFID-tag communication device may further comprises a similar up-converter for the second cancel signal.

The first-cancel-signal attenuator may be arranged to change its amount of attenuation of the first cancel signal, to a selected one of different values, so that the first-cancel-signal attenuator can be simplified in construction, and the control to attenuate the first cancel signal can be simplified. The second-cancel-signal attenuator may be similarly arranged.

Further, the different values to which the amount of attenuation of the first second cancel signal by the first-cancel-signal attenuator is variable are multiples of ½, so that the circuit arrangement of the first-cancel-signal attenuator can be made considerably simple. Further, the control to attenuate the first cancel signal can be simplified by a bit-shift logic using binary digits, for example. This arrangement is applicable to the second-cancel-signal attenuator.

The first-cancel-signal attenuator may includes a plurality of voltage dividers in the form of a plurality of registers, and a plurality of switches operable to selectively operate the plurality of voltage dividers. In this case, the first-cancel-signal attenuator is simple in construction and economical to manufacture. The second-cancel-signal attenuator may include similar voltage dividers and similar switches.

The first-cancel-signal attenuator may further include a buffer amplifier functioning as a buffer device, which assures a stable operation of the attenuator. The second-cancel-signal attenuator may further include a similar buffer amplifier.

The first-cancel-signal D/A converting portion may use four sampling values per one period of an output periodic function. In this case, the noise floor can be held low, permitting a high-speed converting operation of the first-cancel-signal D/A converting portion, and assuring a high signal-to-noise ratio of the analog first cancel signal which has been attenuated by the first-cancel-signal attenuator. Similarly, the second-cancel-signal D/A converting portion may use four sampling values per one period of the output periodic function.

BRIEF DESCRIPTION OF THE DRAWINGS

The above and other objects, features and industrial significance of this invention will be better understood by reading the following detailed description of preferred embodiments of the present invention, when considered in connection with the accompanying drawings in which:

FIG. 3 is a view showing a sine-wave table stored in a function table provided in the RFID-tag communication device of FIG. 2;

FIG. 34 is a view illustrating another example of the sine-wave table stored in the function table;

FIG. 35 is a view illustrating a further example of the sine-wave table stored in the function table;

FIG. 36 is a view illustrating a still further example of the sine-wave table stored in the function table;

FIG. 52 is a view showing an arrangement of an RFID-tag communication device constructed according to a ninth embodiment of this invention.

DETAILED DESCRIPTION OF THE PREFERRED EMBODIMENTS

The preferred embodiments of the present invention will be described by reference to the accompanying drawings.

Embodiment 1

Figure 1:
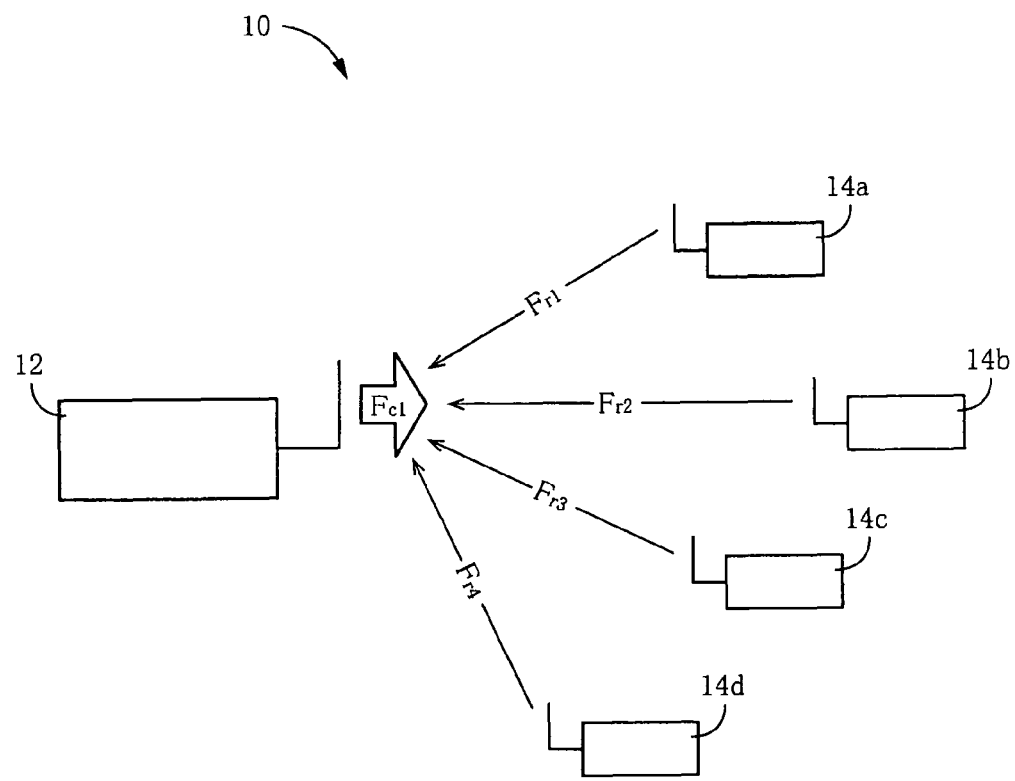
FIG. 1 is a view showing an arrangement of a communication system including an RFID-tag communication device according to this invention.

Reference is first made to FIG. 1 showing an RFID-tag communication system 10 to which the present invention is applicable and which includes an RFID-tag communication device 12 constructed according to a first embodiment of this invention, and a plurality of radio-frequency identification tags (hereinafter abbreviated as "RFID tags") 14, more specifically, four RFID tags 14$a$, 14$b$, 14$c$ and 14$d$. In the present RFID-tag communication system 10, the RFID-tag communication device 12 serves as an interrogator, while the RFID tags 14 serve as transponders. Namely, the RFID-tag communication device 12 is arranged to transmit a transmission signal in the form of a carrier wave $F_{c1}$, while the RFID tags 14$a$, 14$b$, 14$c$, 14$d$ are arranged to receive the carrier wave $F_{c1}$, modulate the received carrier wave $F_{c1}$ into reply signals in the form of reflected waves $F_{r1}$, $F_{r2}$, $F_{r3}$ and $F_{r4}$ (hereinafter collectively referred to as "reflected waves $F_{rf}$") on the basis of suitable information, and transmit the reflected waves $F_{rf}$ in reply to the carrier wave $F_{c1}$. The RFID-tag communication device 12 is arranged to demodulate the received reflected waves $F_{rf}$. Thus, radio communication is effected between the RFID-tag communication device 12 and the RFID tags.

Figure 2:
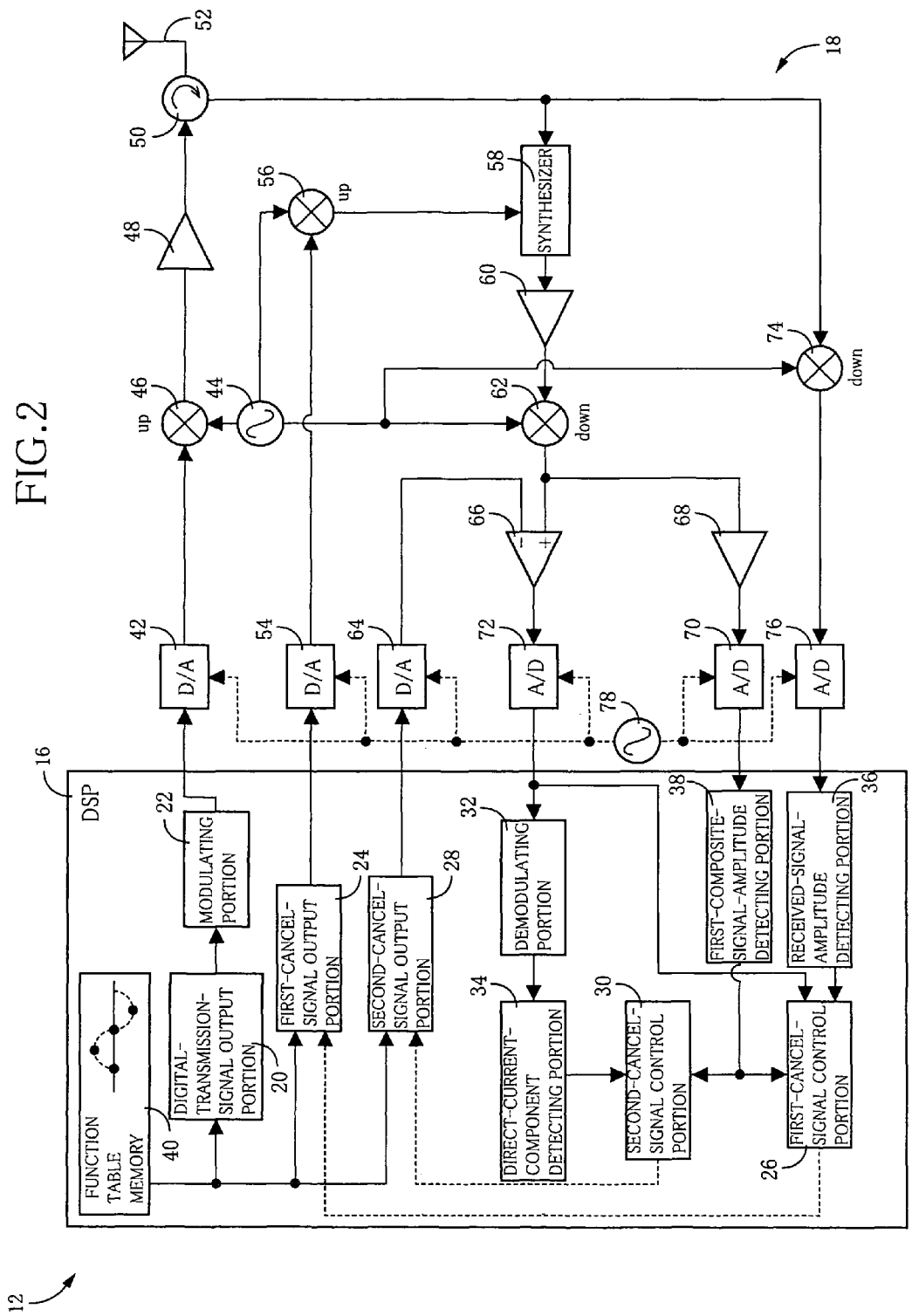
FIG. 2 is a view showing an electrical arrangement of the RFID-tag communication device of FIG. 1 according to one embodiment of the present invention.

Referring next to FIG. 2 showing an electrical arrangement of the RFID-tag communication device 12, this device 12 is operable to effect radio communication with the RFID tags 14, for implementing at least one of information writing and reading on and from the RFID tags 14. To this end, the RFID-tag communication device 12 includes a DSP (digital signal processor) 16, and a transmitter/receiver circuit 18. The DSP 16 is operable to output a digital signal as the transmission signal, and perform digital signal processing operations such as an operation to demodulate the reply signals received from the RFID tags 14. The transmitter/receiver circuit 18 is operable to convert the digital transmission signal received from the DSP 16, into an analog signal serving as the carrier wave $F_{c1}$, and to convert the reflected signals $F_{rf}$ received from the RFID tags 14, into a digital signal, which is applied to the DSP 16.

The DSP 16 is a so-called microcomputer system which incorporates a CPU, a ROM and a RAM and which operates to perform signal processing operations according to control programs stored in the ROM, while utilizing a temporary data storage function of the RAM. The DSP 16 includes, as functional elements, a digital-transmission-signal output portion 20, a modulating portion 22, a first-cancel-signal output portion 24, a first-cancel-signal control portion 26, a second-cancel-signal output portion 28, a second-cancel-signal control portion 30, a demodulating portion 32, a direct-current-component detecting portion 34, a received-signal-amplitude detecting portion 36, a first-composite-signal amplitude detecting portion 38, and a function table 40. The digital-transmission-signal output portion 20 is arranged to generate the digital transmission signal to be transmitted to the RFID tags 14. The modulating portion 22 is arranged to modulate the digital transmission signal generated by the digital-transmission-signal output portion 20, on the basis of a suitable command signal. The first-cancel-signal output portion 24 is arranged to generate a first cancel signal in the form of a digital signal, on the basis of the digital transmission signal. The first-cancel-signal control portion 26 is arranged to control at least one of an amplitude A1 and a phase φC1 of the first cancel signal generated by the first-cancel-signal output portion 24. The second-cancel-signal output portion 28 is arranged to generate a second cancel signal in the form of a digital signal, on the basis of the digital transmission signal. The second-cancel-signal control portion 30 is arranged to control at least one of an amplitude A2 and a phase φC2 of the second cancel signal generated by the second-cancel-signal output portion 28. The demodulating portion 32 is arranged to demodulate a received signal received through a transmitter/receiver antenna 52 (which will be described). The direct-current-component detecting portion 34 is arranged to detect a direct-current component (DC component) of the demodulated signal generated by the demodulating portion 32. The received-signal-amplitude detecting portion 36 is arranged to detect an amplitude AR of the above-indicated received signal. The first-composite-signal-amplitude detecting portion 38 is arranged to detect an amplitude AM1 of a first composite signal generated by a first signal combining portion 58 (which will be described). The function table 40 is provided to store sampling values corresponding to respective different phases at predetermined sampling points.

The function table 40 preferably stores a sine-wave or cosine-wave table of the sampling values corresponding to the different phases at the predetermined sampling points. FIG. 3 shows an example of the sine-wave table, which indicates two predetermined values sin φ and sin φ(π+0.5) corresponding to an initial phase φ. For example, the sine-wave table indicates sin φ=0, and sin (φ+0.5π)=1 which correspond to φ=0, and indicates sin φ=0.58779, and sin (φ+0.5π)=0.80902 which correspond to φ=0.2#. Since sin (φ+π)=sin φ, it is possible to read out, from the sine-wave table, sin (φ+π) and sin (φ+1.5π) on the basis of the above-indicated two values. For instance, successive values "0,1,0,−1, 0,1,0,−1,0,1,0,−1 . . ." corresponding to φ=0 are read out from the sine-wave table, and successive values "0.58779, 0.80902, −0.58779, −0.80902, 0.58779, 0.80902, −0.58779, −0.80902, 0.58779, 0.80902, −0.58779, −0.80902 . . ." corresponding to φ=0.2π are read out from the sine-wave table. On the basis of these successive values, a suitable sine-wave signal is generated. The phase of the sine-wave signal can be changed by changing the positions of the sine-wave table in the function table 40 from which the successive values are read out, and the amplitude of the sine-wave signal can be changed by multiplying the read-out sine-wave signal by a desired control value. Therefore, the above-described digital-transmission-signal output portion 20, first-cancel-signal output portion 24 and second-cancel-signal output portion 28 can generate the desired sine-wave signals.

The transmitter/receiver circuit 18 includes a transmission-signal D/A converting portion 42, a local-analog-oscillation-signal output portion 44, a first up-converter 46, a first amplifying portion 48, a transmission/reception separator 50, a transmitter/receiver antenna 52, a first-cancel-signal D/A converting portion 54, a second up-converter 56, a first signal combining portion 58, a second amplifying portion 60, a first down-converter 62, a second-cancel-signal D/A converting portion 64, a second signal combining portion 66, a third amplifying portion 68, a first-composite-signal A/D converting portion 70, a second-composite-signal A/D converting portion 72, a second down-converter 74, a received-signal A/D converting portion 76, and a clock-signal output portion 78. The transmission-signal D/A converting portion 42 is arranged to convert the digital transmission signal generated by the modulated portion 22, into an analog signal. The local-analog-oscillation-signal output portion 44 is arranged to generate a suitable local analog oscillation signal. The first up-converter 46 is arranged to increase the frequency of the analog transmission signal received from the above-described transmission-signal D/A converting portion 42, by an amount corresponding to the frequency of the local analog oscillation signal generated by the local-analog-oscillation-signal output portion 44. The first amplifying portion 48 is arranged to amplify the transmission signal generated by the first up-converter 46. The transmission/reception separator 50 is arranged to apply the transmission signal generated by the first amplifying portion 48, to a transmitter/receiver antenna 52, and to apply the reply signals (the received signals containing a leakage signal) received from the above-described RFID tags 14 through transmitter/receiver antenna 52, to the first-signal combining portion 58 and the second down-converter 74. The leakage signal is a part of the transmission signal which is transmitted from the antenna 52 of the RFID-tag communication device 12 and which is returned to and received by the antenna 52. The transmitter/receiver antenna 52 is arranged to transmit, as the carrier wave $F_{c1}$, the transmission signal received from the transmission/reception separator 50, and to receive the reflected waves $F_{rf}$ from the RFID tags 14 and apply the received reflected waves $F_{rf}$ to the transmission/reception separator 50. The first-cancel-signal D/A converting portion 54 is arranged to convert the first cancel signal generated by the above-described first-cancel-signal output portion 24, into an analog signal. The second up-converter 56 is arranged to increase the frequency of the first cancel signal converted into the analog signal by the first-cancel-signal D/A converting portion 54, by an amount corresponding to the frequency of the local analog oscillation signal generated by the above-described local-analog-oscillation-signal output portion 44. The first signal combining portion 58 is arranged to combine together the first cancel signal generated by the second up converter 56, and the above-described received signals received from the transmitter/receiver antenna 52 through the transmission/reception separator 50, obtain a first composite signal. The second amplifying portion 60 is arranged to amplify the first composite signal generated by the first signal combining portion 58, for increasing its amplitude AM1. The first down-converter 62 is arranged to reduce the frequency of the first composite signal generated by the second amplifying portion 60, by an amount corresponding to the frequency of the local analog oscillation signal generated by the above-described local-analog-oscillation-signal output portion 44. The second-cancel-signal D/A converting portion 64 is arranged to convert the second cancel signal generated by the above-described second-cancel-signal output portion 28, into an analog signal. The second signal combining portion 66 is arranged to combine together (and amplify, when needed) the second cancel signal converted by the second-cancel-signal D/A converting portion 64 into the analog signal, and the first composite signal generated by the first down-converter 62, to obtain a second composite signal. The third amplifying portion 68 is arranged to amplify the first composite signal generated by the first down-converter 62, for increasing its amplitude AM1. The first-composite-signal A/D converting portion 70 is arranged to convert the first composite signal received from the third amplifying portion 68, into a digital signal, and to apply the digital first composite signal to the above-described first-composite-signal-amplitude detecting portion 38. The second-composite-signal A/D converting portion 72 is arranged to convert the second composite signal received from the third amplifying portion 66, into a digital signal, and to apply the digital second composite signal to the above-described demodulating portion 32. The second down-converter 74 is arranged to reduce the frequency of the above-described received signals received through the transmission/reception separator 50, by an amount corresponding to the frequency of the local analog oscillation signal generated by the local-analog-oscillation-signal output portion 44. The received-signal A/D converting portion 76 is arranged to convert the received signals received from the second down-converter 74, into digital signals, and to apply the digital received signals to the above-described received-signal-amplitude detecting portion 36. The clock-signal output portion 78 is arranged to generate a suitable clock signal. Preferably, the clock-signal output portion 78 applies the clock signal to the above-described received-signal D/A converting portion 42, and applies the same clock signal to at least one of, and desirably all of the above-described first-cancel-signal D/A converting portion 54, second-cancel-signal D/A converting portion 64, first-composite-signal A/D converting portion 70, second-composite-signal A/D converting portion 72 and received-signal A/D converting portion 76. Preferably, the above-described received-signal A/D converting portion 76 uses a converter having a smaller number of bits, than a converter used by the first-composite-signal A/D converting portion 70, etc. This converter used by the received-signal A/D converting portion 76 has an advantage that a component of the received signals which relates to the modulation by the RFID tags 14 can be ignored. It is noted that the local-analog-oscillation-signal output portion 44 uses an oscillator operable to generate a frequency in the neighborhood of 900 MHz or 2.4 GHz. The transmission/reception separator 50 generally uses a circulator or a directional coupler.

Figure 4:
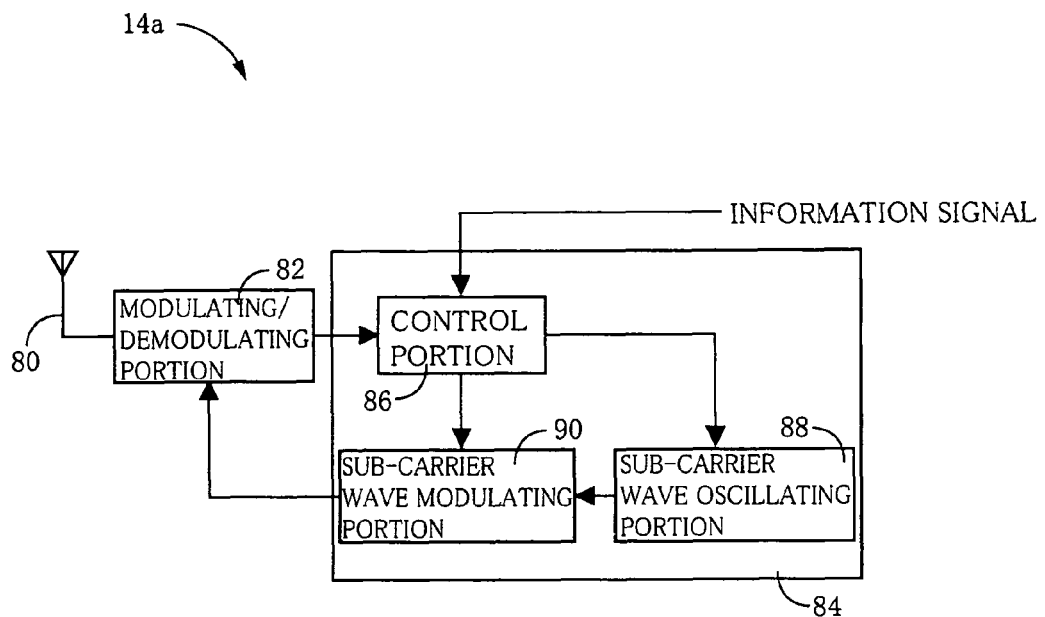
FIG. 4 is a block diagram showing an arrangement of an RFID-tag circuit which is-provided in each RFID tag in the communication system of FIG. 1 and which uses a sub-carrier wave.

Referring next to the block diagram of FIG. 4, there is shown an arrangement of an RFID-tag circuit 15A of each of the RFID tags 14. This RFID-tag circuit 15A includes an antenna portion 80 for receiving the transmission signal in the form of the carrier wave $F_{c1}$ from the RFID-tag communication device 12 and transmitting the reply signal in the form of the reflected wave $F_{rf}$ in reply to the received transmission signal, a modulating/demodulating portion 82 connected to the antenna portion 80 and operable to modulate and demodulate the received signals, and a digital circuit portion (ID-circuit portion) 84 operable to perform digital signal processing operations. The digital circuit portion 84 includes a control portion 86 operable to control the operation of the RFID-tag circuit 15A, by using the carrier wave Fc1 received from the antenna portion 80, as an energy source, a sub-carrier wave oscillating portion 88 operable to generate a sub-carrier wave, and a sub-carrier wave modulating portion 90 operable to modulate the sub-carrier wave generated by the sub-carrier wave oscillating portion 86, on the basis of a suitable information signal received through the control portion 86.

There will be described an operation of the communication system constructed as described above. Initially, the digital-transmission-signal output portion 20 of the RFID-tag communication device 12 generates the digital transmission signal on the basis of the function table stored in the function table 40. For instance, this transmission signal is a signal generated by sampling a sine wave. The digital transmission signal generated by the digital-transmission-signal output portion 20 is modulated by the modulating portion 22. Then, the modulated digital transmission signal generated by the modulating portion 22 is converted by the transmission-signal D/A converting portion 42 into an analog signal. The frequency of the analog transmission signal generated by the transmission-signal D/A converting portion 42 is then increased by the first up-converter 46, by an amount corresponding to the frequency of the local analog oscillation signal generated by the local-analog-oscillation-signal output portion 44. Then, the amplitude of the transmission signal generated by the first up-converter 46 is increased by the first amplifying portion 48. The transmission signal which has been amplified by the first amplifying portion 48 is applied to the transmitter/receiver antenna 53 through the transmission/reception separator 50, and is transmitted as the carrier wave $F_{c1}$ from the transmitter/receiver antenna 82 toward the RFID tags 14.

Figure 5:
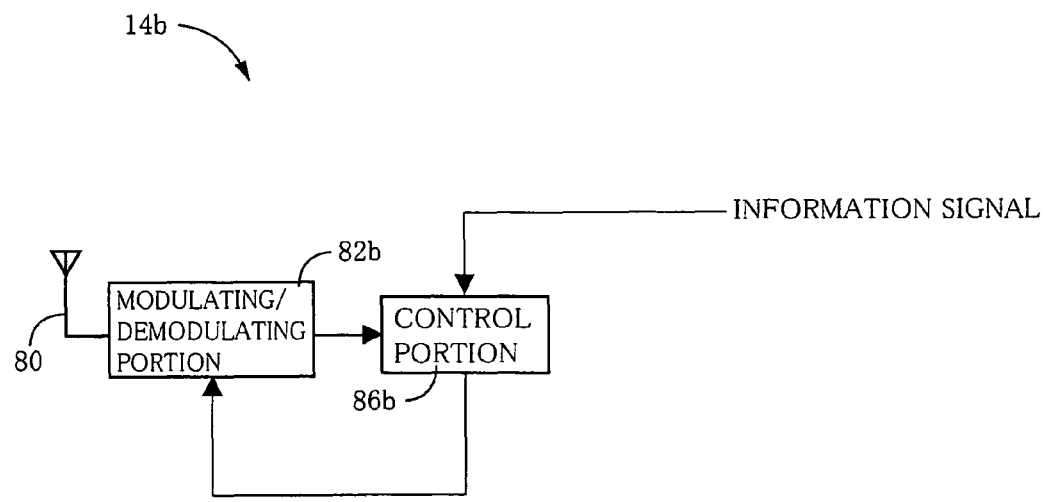
FIG. 5 is a block diagram showing an arrangement of an RFID-tag circuit which is provided in each RFID tag in the communication system of FIG. 1 and which does not use a sub-carrier wave.

The carrier wave $F_{c1}$ transmitted from the antenna 52 is received by the antenna portion 80 of the RFID tags 14, and demodulated by the modulating portion 82. A portion of the received carrier wave $F_{c1}$ is rectified by a rectifying portion (not shown), and a sub-carrier wave is generated by the sub-carrier oscillating portion 88, with the rectified carrier wave $F_{c1}$ used as an energy source. The sub-carrier wave generated by the sub-carrier oscillating portion 88 is subject to primary modulation by the sub-carrier modulating portion 90 on the basis of suitable information signal received through the control portion 86. The carrier wave $F_{c1}$ is subjected to secondary modulation by the modulating/demodulating portion 82, according to the sub-carrier wave subjected to the primary modulation by the sub-carrier modulating portion 90. The carrier wave $F_{c1}$ subjected to the secondary modulation is transmitted as the reflected wave $F_{rf}$ from the antenna portion 80, toward the RFID-tag communication device 12. The RFID tags 14 may have a modified RFID-tag circuit 15B as shown in FIG. 5, which does not use a sub-carrier wave. In this case, the signal supplied from the control portion 86B to the modulating/demodulating portion 82B and transmitted from the RFID tag 14 as the reply signal must be modulated by ASK (which may use an FSK signal) or PSK.

Figure 6:
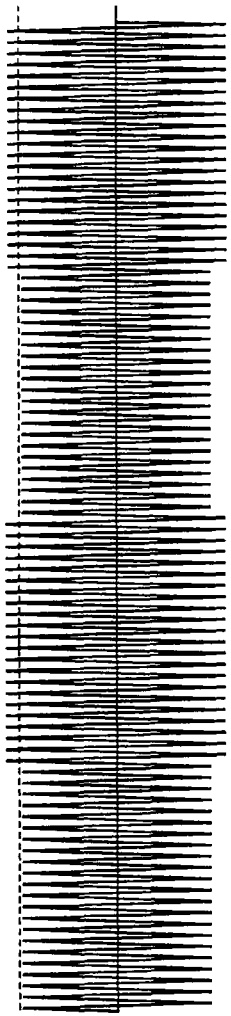
FIG. 6 is a view illustrating a waveform of a signal in the RFID-tag communication device of FIG. 2, which signal is received through a transmitter/receiver antenna.
Figure 7:
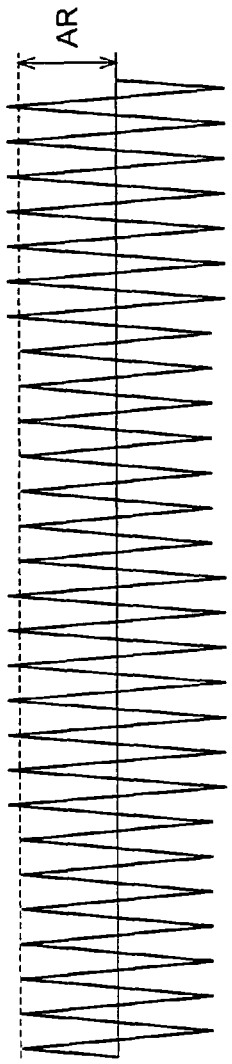
FIG. 7 is a view illustrating a waveform of a signal in the RFID-tag communication device of FIG. 2, which signal is a down-converted signal generated from a second down-converter.

The reflected wave $F_{rf}$ transmitted from each RFID tag 14 is received by the antenna 52 of the RFID-tag communication device 12, and applied as the received signal to the first signal combining portion 58 and the second down-converter 74 through the transmission/reception separator 50. At this time, a leakage signal that is a part of the transmission signal transmitted from the RFID-tag communication device 12 and returned to the communication device 12 through the transmission/reception separator 50 may be applied to the first signal combining portion 58 and second down-converter 74, together with the received signal. FIG. 6 illustrates a waveform of the received signal received by the first signal combining portion 58. It will be understood from FIG. 6 that the amplitude-modulated component is very small since the amplitude of the leakage signal is considerably larger than that of the reflected wave (reply signal). The frequency of the received signal received by the second down-converter 74 is reduced by the amount corresponding to the frequency of the local analog oscillation signal generated by the local-analog-oscillation-signal output portion 44. FIG. 7 illustrates a waveform of the received signal the frequency of which has been reduced by the second down-converter 74. The received signal the frequency of which has been reduced by the second down converter 74 is converted by the received-signal A/D converting portion 76, into a digital signal which is applied to the received-signal-amplitude detecting portion 36, so that the amplitude AR of the received signal is detected by the received-signal-amplitude detecting portion 36. An output of the received-signal-amplitude detecting portion 36 is applied to the first-cancel-signal control portion 26.

Figure 8:
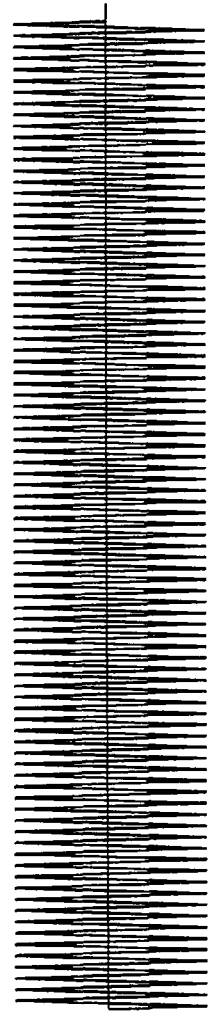
FIG. 8 is a view illustrating a waveform of a signal in the RFID-tag communication device of FIG. 2, which signal is a first cancel signal down-converted by a second up-converter.
Figure 9:
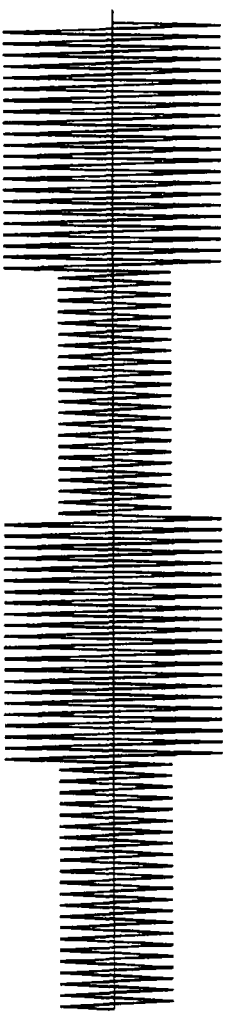
FIG. 9 is a view illustrating a waveform of a signal in the RFID-tag communication device of FIG. 2, which signal is a first composite signal generated from a first signal combining portion.

The first-cancel-signal control portion 26 determines the phase φC1 and the amplitude A1 of the first cancel signal, and the first-cancel-signal output portion 24 generates the first cancel signal in the form of a digital signal on the basis of the function table stored in the function table 40. Preferably, the amplitude A1 of the first cancel signal is determined by the amplitude AR of the received signal received from the received-signal-amplitude detecting portion 36. For example, the amplitude A1 of the first cancel signal which has been converted into the analog signal by the D/A converting portion 54 and the frequency of which has been increased by the second up-converter 56 is determined to be equal to the amplitude of the received signal received by the first signal combining portion 58. The first cancel signal generated by the first-cancel-signal output portion 24 is converted by the first-cancel-signal D/A converting portion 54 into the analog signal, and the frequency of the analog first cancel signal generated by the D/A converting portion 54 is increased by the second up-converter 56 by the amount corresponding to the frequency of the local analog oscillation signal generated by the local-analog-oscillation-signal output portion 44. FIG. 8 illustrates a waveform of the first cancel signal the frequency of which has been increased by the second up-converter 56. The first cancel signal the frequency of which has been increased by the second up-converter 56 and the received signal received by the first signal combining portion 58 from the transmission/reception separator 50 are combined together by the first signal combining portion 58 to obtain the first composite signal which does not include the leakage signal that is a part of the transmission signal which is transmitted from the RFID-tag communication device 12 and which is returned to and received by the communication device 12. Namely, the leakage signal is partially suppressed from the received signal received by the first signal combining portion 58. FIG. 9 illustrates a waveform of the first composite signal generated by the first signal combining portion 58. In FIG. 9, the amplitude of the first composite signal is exaggerated. While the amplitude of the first composite signal is smaller than that shown in FIG. 6 by an amount corresponding to the amplitude of the leakage signal, the first composite signal has the waveform as shown in FIG. 9 after this first composite signal is amplified by the second amplifying portion 60, because the amplitude-modulated component remains unchanged. The amplitude-modulated component of the first composite signal of FIG. 9 is larger than the other component, since a most of the leakage signal has been suppressed from the received signal of FIG. 6. Since the intensity or strength of the reply signal transmitted from the RFID tags 14 is higher than that of the leakage signal, a non-negligible portion of the leakage signal remains in the first composite signal. The amplitude of the first composite signal generated by the first signal combining portion 58 is amplified by the second amplifying portion 60, by a gain G1. Where the amplitude A1 and the phase φC1 of the first cancel signal are suitably determined, the intensity of the first cancel signal is relatively low, and the intensity of the input to the first down-converter 62 is accordingly low, so that the gain G1 of the second amplifying portion 60 is accordingly increased. A gain G2 of the above-described third amplifying portion 68 has a predetermined initial value. Then, the frequency of the first composite signal generated by the second amplifying portion 60 is reduced by the first down-converter 62 by the amount corresponding to the frequency of the local analog oscillation signal generated by the local-analog-signal output portion 44, and the first composite signal the frequency of which has been reduced is applied to the second signal combining portion 66 and the third amplifying portion 68.

Figure 10:
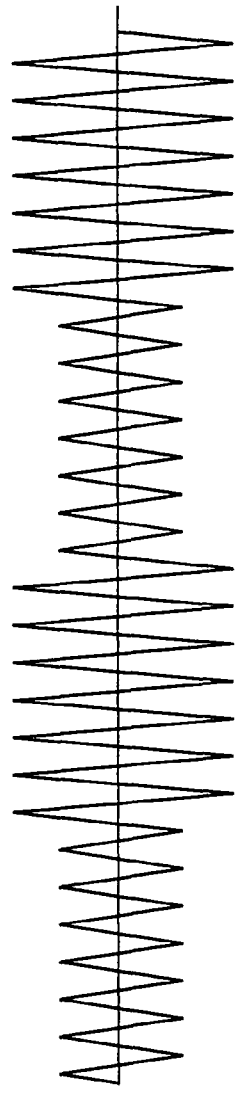
FIG. 10 is a view illustrating a waveform of a signal in the RFID-tag communication device of FIG. 2, which signal is a first composite signal down-converted by a first down-converter.

FIG. 10 illustrates a waveform of the first composite signal the frequency of which has been reduced by the first down-converter 62. The frequency of the clock signal generated by the clock-signal output portion 78 is preferably four times the frequency of the first composite signal (intermediate frequency signal) the frequency of which has been reduced, or a multiple of the frequency four times that of this intermediate frequency signal. The amplitude of the first composite signal applied to the third amplifying portion 68 is amplified by the gain G2. The amplitude of the first composite signal generated by the first down-converter 62 decreases as the suppression of the leakage signal progresses. Accordingly, the gain G2 of the third amplifying portion 68 is preferably increased as the suppression of the leakage signal progresses. The first composite signal generated by the third amplifying portion 68 is converted by the first-composite-signal A/D converting portion 70, into the digital signal, and the digital first composite signal is applied to the first-composite-signal-amplitude detecting portion 38, so that the amplitude AM1 of the first composite signal is detected by the first-composite-signal-amplitude detecting portion 38. The output of the first-composite-signal-amplitude detecting portion 38 is applied to the first-cancel-signal control portion 26 and the second-cancel-signal control portion 30. Preferably, the phase φC1 of the first cancel signal is controlled by the first-cancel-signal control portion 26, on the basis of the amplitude AM1 of the first composite signal, such that the amplitude AM1 is minimized, and preferably such that the mean value of the amplitude AM1 of the first composite signal is minimized.

Figure 11:
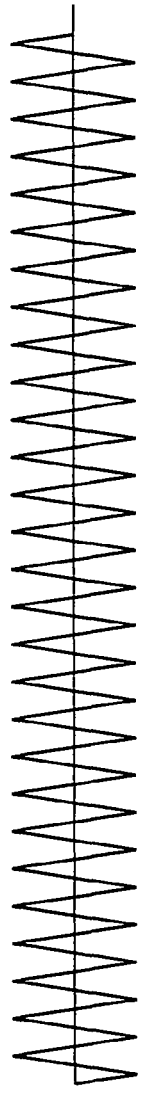
FIG. 11 is a view illustrating a waveform of a signal in the RFID-tag communication device of FIG. 2, which signal is a second cancel signal generated from a second cancel-signal D/A converting portion.
Figure 12:
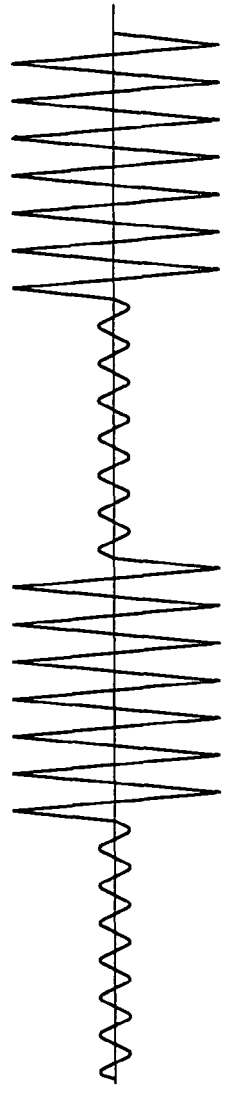
FIG. 12 is a view illustrating a waveform of a signal n the RFID-tag communication device of FIG. 2, which signal is a second composite signal generated from a second signal combining portion.

In the meantime, the phase φC2 and the amplitude AM2 of the second cancel signal described above are determined by the second-cancel-signal control portion 30. The second cancel signal in the form of a digital signal is generated by the second-cancel-signal output portion 28, on the basis of the function table stored in the function table 40. Preferably, the amplitude AM2 of the second cancel signal is determined on the basis of the amplitude AM1 of the first composite signal received from the first-composite-signal-amplitude detecting portion 38. Preferably, the amplitude A2 of the second cancel signal which has been converted into the analog signal by the D/A converting portion 64 is determined to be equal to the amplitude of the first composite signal the frequency of which has been reduced by the first down-converter 62 and which has been received the second signal combining portion 66. The second cancel signal generated by the second-cancel-signal output portion 28 is converted by the second-cancel-signal D/A converting portion 64 into the analog signal. FIG. 11 illustrates a waveform of the second cancel signal generated by the second-cancel-signal output portion 64. The second cancel signal generated by the second-cancel-signal D/A converting portion 64 and the first composite signal the frequency of which has been reduced by the first down-converter 62 are combined together by the second signal combining portion 66, to obtain the second composite signal which does not include the leakage signal. Namely, the leakage signal has been partially suppressed from the first composite signal received by the second signal combining portion 66. FIG. 12 illustrates a waveform of the second composite signal generated by the second signal combining portion 66. The amplitude-modulated component of the second composite signal shown in FIG. 12 is larger than the other component, to a larger extent than in the received signal of FIG. 6 and the first composite signal of FIG. 9. It will thus be understood that the leakage signal is very small in the second composite signal. The second composite signal generated by the second signal combining portion 66 is converted by the second-composite-signal A/D converting portion 72 into a digital signal, and the digital second composite signal is applied to the first-cancel-signal control portion 26 and the demodulating portion 32. The second composite signal is demodulated by the demodulating portion 32, whereby the information signal received from the RFID tag 14 is read. Preferably, the phase φC1 of the first cancel signal is controlled by the first-cancel-signal control portion 26, on the basis of the second composite signal. Preferably, the second signal combining portion 66 functions as a differential amplifier, and a gain G3 of the second signal combining portion 66 is controlled such that an input voltage of the second-composite-signal A/D converting portion 72 coincides with a desired value.

Figure 13:
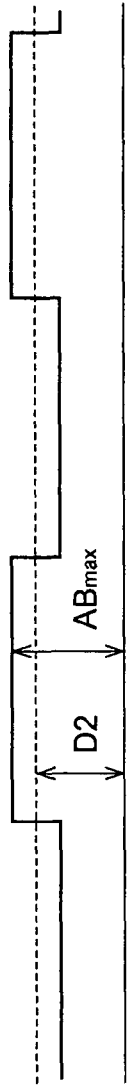
FIG. 13 is a view illustrating a waveform of a signal in the RFID-tag communication device of FIG. 2, which signal is a modulated signal generated from a modulating portion.

FIG. 13 illustrates a waveform of the demodulated signal generated by the demodulating portion 32. The direct-current-component detecting portion 34 is arranged to detect a direct current component of the demodulated signal of FIG. 13, and an output of the direct-current-component detecting portion 34 is applied to the second-cancel-signal control-portion 30. This direct current component corresponds to the leakage signal received by the RFID-tag communication device 12. Preferably, the phase φC2 of the second cancel signal is controlled by the second-cancel-signal control portion 30, so as to minimize an amplitude D2 of the direct current component. The arrangement of the RFID-tag communication device 12 described above permits effective suppression of the leakage signal received by the communication device 12, and assures highly sensitive communication with the RFID tags 14.

Referring to the flow charts of FIGS. 14-19, there will be described an operation of the DSP 16 of the RFID-tag communication device 12 to suppress the leakage signal by the communication device 12. A control routine shown in the flow charts is executed with an extremely short cycle time of about several milliseconds to about several tens of milliseconds.

Figure 14:
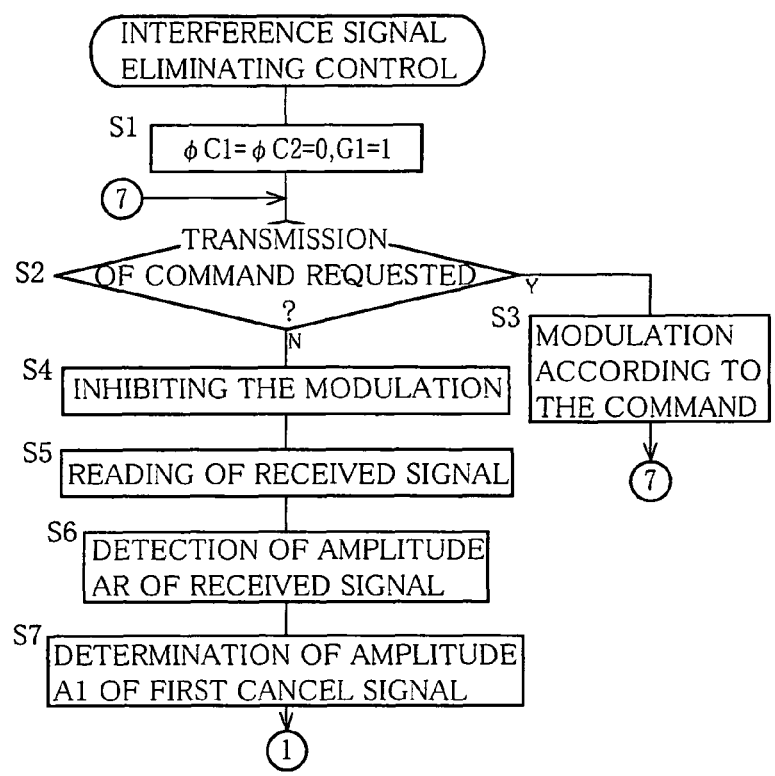
FIG. 14 is a part of a flow chart illustrating control operations of a DSP of the RFID-tag communication device of FIG. 2 to suppress a leakage signal that is a part of a transmission signal which is generated from the communication device and returned to and received by the communication device.

The control routine is initiated with step S1 of FIG. 14 to reset the phase φC1 of the first cancel signal and φC2 of the second cancel signal to "0", and set the gain G1 of the second amplifying portion 60 to "1". Then, the control flow goes to step S2 to determine whether a command signal should be transmitted toward the RFID tags 14. The transmission of the command signal is requested in an upper-order control routine (not shown). If an affirmative decision is obtained in step S2, the control flow goes to step S3 corresponding to the modulating portion 22 to modulate the above-described transmission signal according to the command signal. Then, step S5 and the following steps are implemented. If a negative decision is obtained in step S2, the control flow goes to step S4 to inhibit the modulation of the transmission signal, and then goes to the step S5 and the flowing steps. The step S5 is provided to read the received signal which has been converted into the digital signal by the received-signal A/D converting portion 76. In the next step S6 corresponding to the received-signal-amplitude detecting portion 36, the amplitude AR of the received signal read in the step S5 is detected. In the next step S7, the amplitude A1 of the first cancel signal is determined. Then, the control flow goes to step S8 of FIG. 15 and the following steps.

Figure 15:
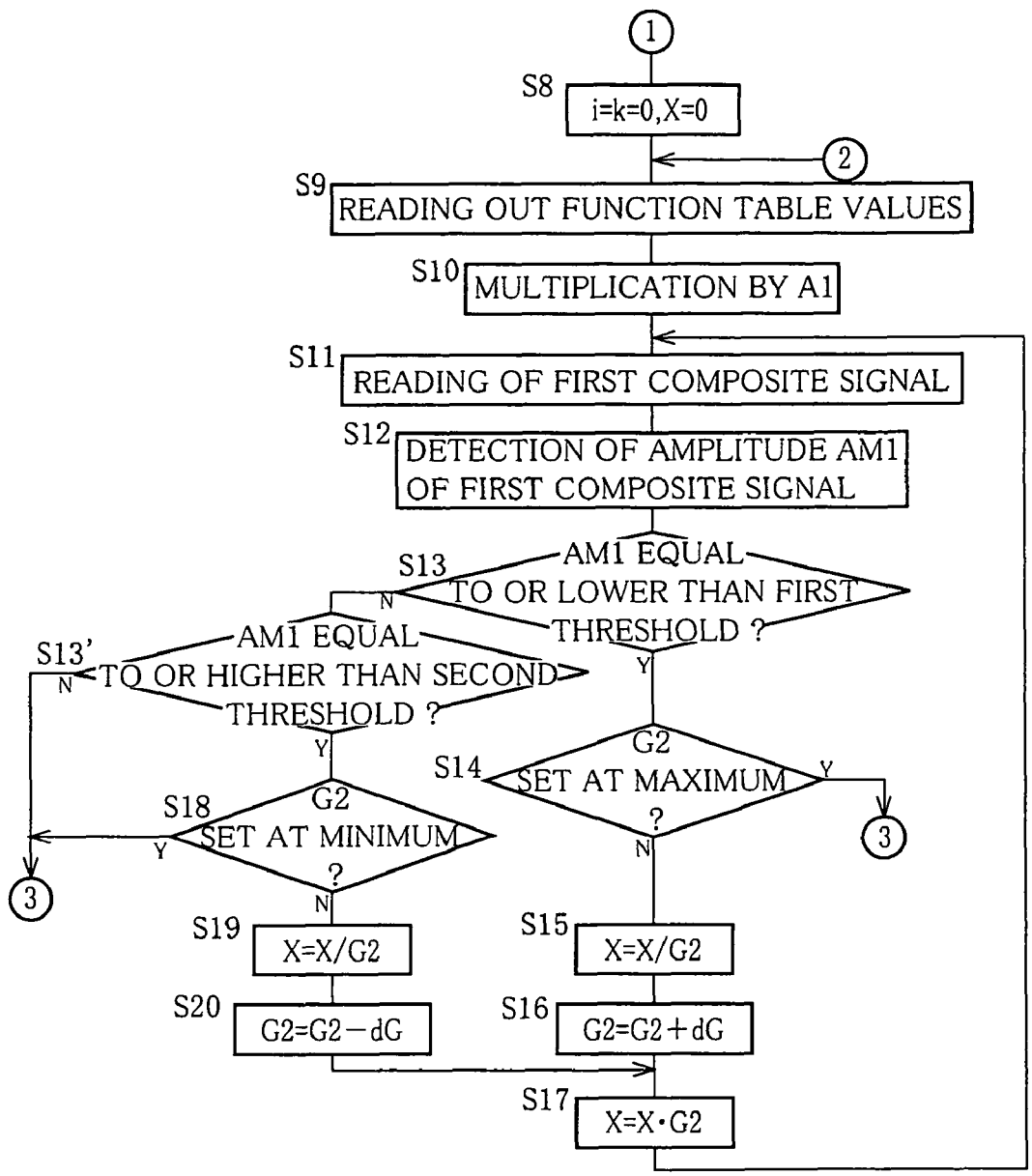
FIG. 15 is another part of the flow chart illustrating the above-described operation of the DSP of the RFID-tag communication device of FIG. 2.

In the step S8 of FIG. 15, variables "i", "k" and "X" are reset to "0". The control flow then goes to step S9 to read out function values from the function table 40. In the next step S10, the function values read out in the step S9 are multiplied by the amplitude A1 determined in the step S7. The control flow then goes to step S11 to read the first composite signal which has been converted into the digital signal by the first-composite-signal A/D converting portion 70. In the next step S12, the amplitude AM1 of the first composite signal detected in the step S11 is detected. Then, the control flow goes to step S13 to determine whether the amplitude AM1 of the first composite signal detected in the step S12 is equal to or lower than a first threshold value. That is, an optimum range of the amplitude AM1 in which the input voltage of the first-composite-signal A/D converting portion 70 is adequate is defined by the first threshold value that is a lower limit, and a second threshold value that is an upper limit. If the input voltage is initially lower than the first threshold value or lower limit, the gain G2 of the third amplifying portion 68 should be increased. If an affirmative decision is obtained in the step S13, therefore, the control flow goes to step S14 to determine whether the gain G2 of the third amplifying portion 68 is set at the maximum value. If a negative decision is obtained in the step S13, the control flow goes to step S13' to determine whether the amplitude AM1 of the first composite signal detected in the step S12 is equal to or higher than the second threshold value. If a negative decision is obtained in the step S13', this means that the input voltage of the first-composite-signal A/D converting portion 70 is adequate. In this case, the control flow goes to step S21 of FIG. 16 and the following steps. If an affirmative decision is obtained in the step S13', that is, if the input voltage of the first-composite-signal A/D converting portion 70 is higher than the second threshold value or upper limit, the control flow goes to step S18 to determine whether the gain G2 is set at the minimum value. If an affirmative decision is obtained in the step S14, that is, the gain G2 of the third amplifying portion 68 is set at the maximum value, the control flow goes to the step S21 of FIG. 16 and the following steps. If a negative decision is obtained in the step S14, that is, if the gain G2 of the third amplifying portion 68 is not set at the maximum value, the control flow goes to step S15 to divide the variable "X" by the gain G2. The step S15 is followed by step S16 to add a predetermined value dG to the gain G2, and step S17 to multiply the variable "X" by the gain G2. Then, the control flow goes back to the step S11. If an affirmative decision is obtained in the step S18, that is, if the gain G2 of the third amplifying portion 68 is set at the minimum value, the control flow goes to the step S21 of FIG. 16 and the following steps. If a negative decision is obtained in the step S18, the control flow goes to step S19 to divide the variable "X" by the gain G2, and to step S20 to subtract the predetermined value dG from the gain G2. Then, the control flow goes to the step S17 and the following steps. Thus, the gain G2 of the third amplifying portion 68 is controlled such that the amplitude AM1 of the first composite signal (the input voltage of the first-composite-signal A/D converting portion 70) is held within the optimum range, so that the communication of the RFID-tag communication device 12 with the RFID tags 14 can be effected with high sensitivity, even when the amplitude of the first composite signal generated by the first signal combining portion 58 is reduced by the suppression of the leakage signal.

Figure 16:
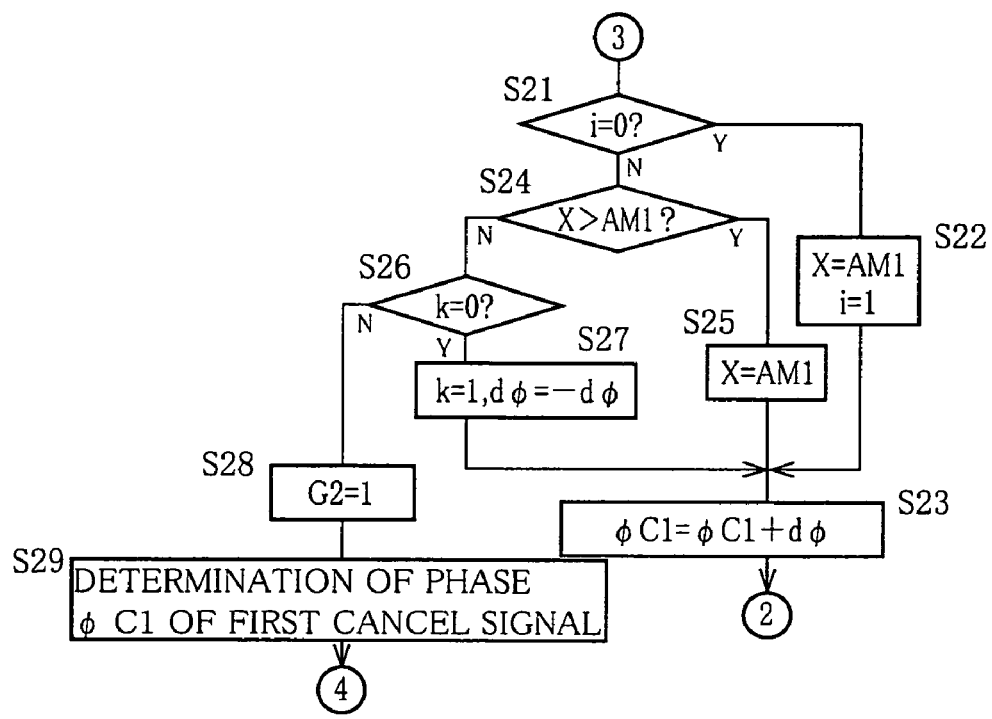
FIG. 16 is a further part of the flow chart illustrating the control operations of the DSP.

The step S21 of FIG. 16 is provided to determine whether the variable "i" is set at "0". If an affirmative decision is obtained in the step S21, the control flow goes to step S22 to set the variable "X" to AM1, and set the variable "i" to "1". Then, the control flow goes to step S23 to add a predetermined value dφ to the phase φC1 of the first cancel signal, and to the step S9 of FIG. 15 and the following steps. If a negative decision is obtained in the step S21, the control flow goes to step S24 to determine whether the variable "X" is larger than the amplitude AM1. If an affirmative decision is obtained in the step S24, the control flow goes to step S25 to set the variable "X" to AM1, and to the step S23. If a negative decision is obtained in the step S24, the control flow goes to step S26 to determine whether the variable "k" is set at "0". If an affirmative decision is obtained in the step S26, the control flow goes to step S27 to set the variable "k" to "1", and set the predetermined value dϕ to −dϕ, and then goes to the step S23. If a negative decision is obtained in the step S26, the control flow goes to step S28 to set the gain G2 to "1", and to step S29 to determine the phase ϕC1 of the first cancel signal. The step S29 is followed by step S30 of FIG. 17 and the following steps. Thus, the phase ϕC1 of the first cancel signal is controlled so as to minimize the amplitude AM1 of the first composite signal.

Figure 17:
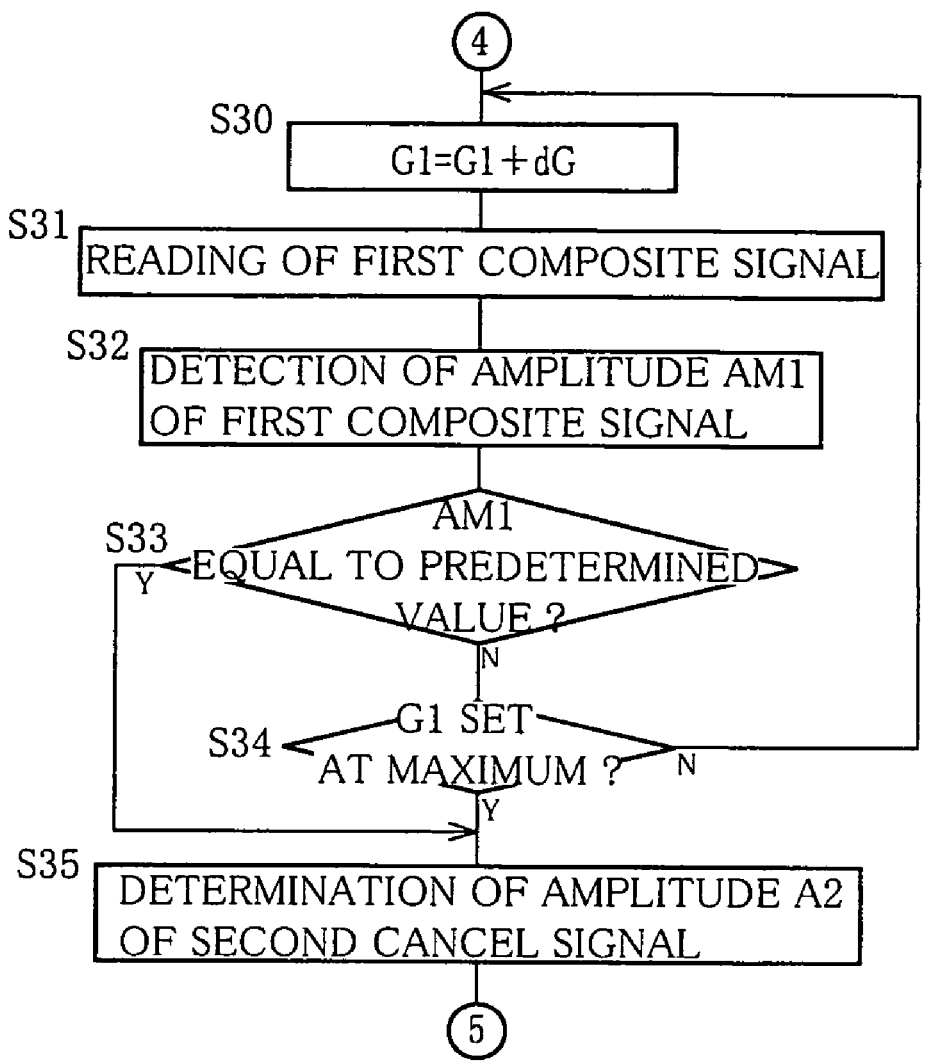
FIG. 17 is a still further part of the flow chart illustrating the control operations of the DSP.

In the step S30 of FIG. 17, the predetermined value dG is added to the gain G1 of the second amplifying portion 60. Then, step S31 is implemented to read the first composite signal which has been converted into the digital signal by the first-composite-signal A/D converting portion 70. Step S32 is then implemented to detect the amplitude AM1 of the first composite signal read in the step S31. The control flow then goes to step S33 to determine whether the amplitude AM1 of the first composite signal detected in the step S32 is set equal to a predetermined value. If an affirmative decision is obtained in the step S33, the control flow goes to step S35 to determine the amplitude AM2 of the second cancel signal, and to step S36 of FIG. 18 and the following steps. If a negative decision is obtained in the step S33, the control flow goes to step S34 to determine whether the gain G1 of the second amplifying portion 60 is set at the maximum value. If an affirmative decision is obtained in the step S34, the control flow goes to the step S35 and the following steps. The operation of the DSP 16 described above by reference to the flow charts of FIGS. 14-17 permits high-frequency amplification by the second amplifying portion 60 of the received signal the amplitude-modulated component of which is increased as a result of suppression of the leakage signal. Accordingly, the present RFID-tag communication device 12 permits detection of the reply signals with high sensitivity, with a reduced influence of the noise.

Figure 18:
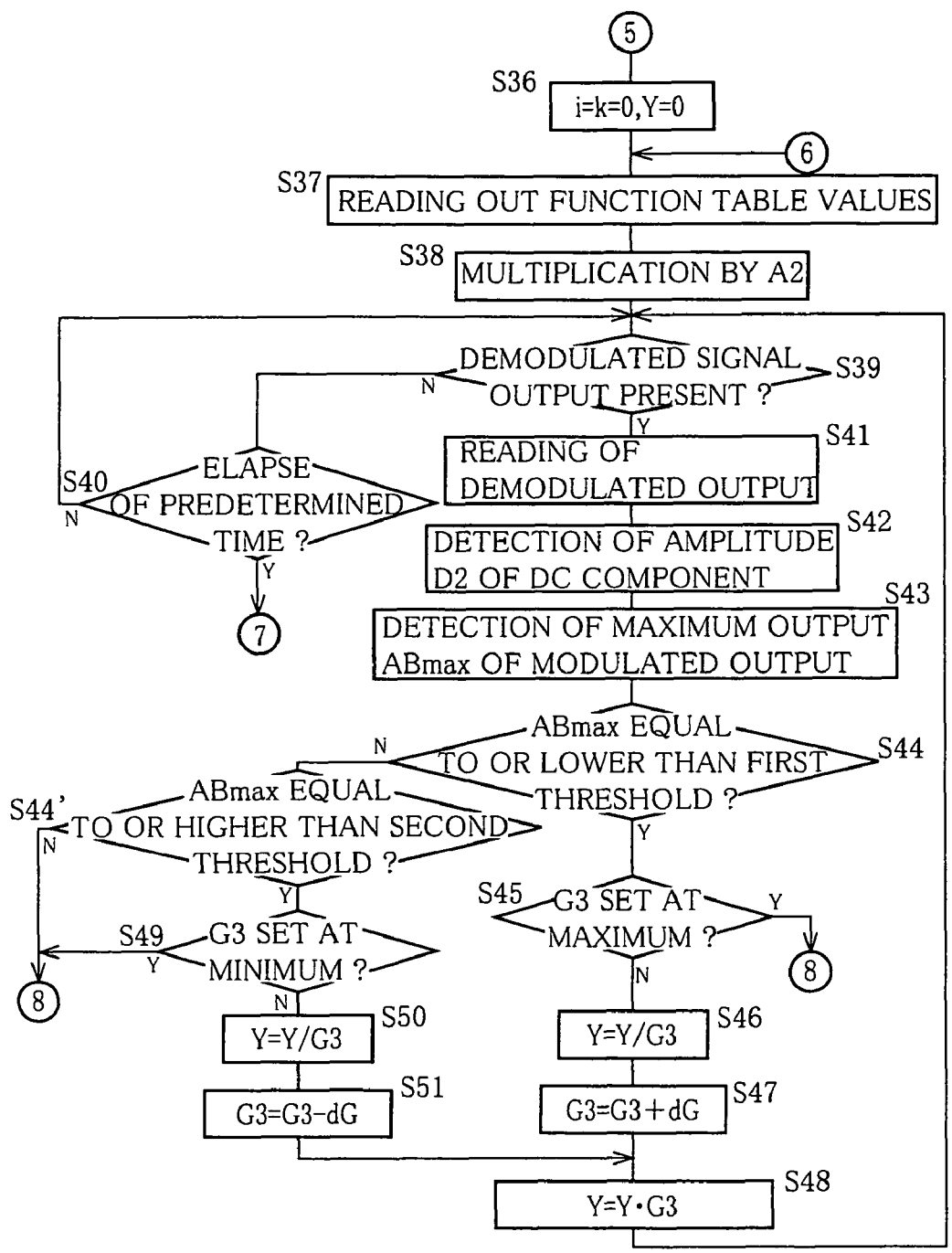
FIG. 18 is a yet further part of the flow chart illustrating the control operations of the DSP.

In the step S36 of FIG. 18, the variables "i", "k" and "Y" are reset to "0". Then, step S37 is implemented to read out the function values from the function table 40. The control flow then goes to step S38 to multiply the function values read out in the step S37, by the amplitude A2 determined in the step S35. Step S39 is then implemented to determine whether the demodulated signal output of the demodulating portion 32 is present. If a negative decision is obtained in the step S39, the control flow goes to step S40 determine whether a predetermined time has elapsed. If an affirmative decision is obtained in the step S40, this means that the RFID tags 14 have not transmitted the reply signals. In this case, the control flow goes back to the step S2 of FIG. 14 and the following steps. If a negative decision is obtained in the step S40, the control flow goes back to the step S39. If an affirmative decision is obtained in the step S39, that is, if the demodulated signal output of the demodulating portion 32 is present, the control flow goes to step S41 corresponding to the demodulating portion 32, to read the demodulated second composite signal generated by the demodulating portion 32. Then, step S42 corresponding to the direct-current-component detecting portion 34 is implemented to detect the amplitude D2 of the direct current component of the demodulated second composite signal. The control flow then goes to step S43 to detect a maximum amplitude $AB_{max}$ of the modulated second composite signal, and to step S44 to determine whether the maximum amplitude $AB_{max}$ of the demodulated signal detected in the step S43 is equal to or lower than a first threshold value (which is different from the first threshold value used in the step S13 of FIG. 15). That is, an optimum range of the amplitude $AB_{max}$ in which the input voltage of the second-composite-signal A/D converting portion 72 is adequate is defined by the first threshold value that is a lower limit, and a second threshold value that is an upper limit. If the input voltage is initially lower than the first threshold value or lower limit, the gain G3 of the second signal combining portion 66 should be increased. If an affirmative decision is obtained in the step S44, therefore, the control flow goes to step S45 to determine whether the gain G3 of the second signal combining portion 66 is set at the maximum value. If a negative decision is obtained in the step S45, the control flow goes to step S44' to determine whether the amplitude $AB_{max}$ of the modulated second composite signal detected in the step S43 is equal to or higher than the second threshold value (which is different from the second threshold value used in the step S13' of FIG. 15). If a negative decision is obtained in the step S44', this means that the input voltage of the second-composite-signal A/D converting portion 72 is adequate. In this case, the control flow goes to step S52 of FIG. 19 and the following steps. If an affirmative decision is obtained in the step S44', that is, if the input voltage of the second-composite-signal A/D converting portion 72 is higher than the second threshold value or upper limit, the control flow goes to step S49 to determine whether the gain G3 is set at the minimum value. If an affirmative decision is obtained in the step S45, that is, the gain G3 of the second signal combining portion 66 is set at the maximum value, the control flow goes to the step S52 of FIG. 19 and the following steps. If a negative decision is obtained in the step S45, that is, if the gain G3 of the second signal combining portion 66 is not set at the maximum value, the control flow goes to step S46 to divide the variable "Y" by the gain G3. The step S46 is followed by step S47 to add a predetermined value dG to the gain G3, to increase the amplifying factor of the second signal combining portion 66, and step S48 to multiply the variable "Y" by the gain G3. Then, the control flow goes back to the step S39. If an affirmative decision is obtained in the step S49, that is, if the gain G3 of the second signal combining portion 66 is set at the minimum value, even where the input voltage of the second-composite-signal A/D converting portion 72 is higher than the upper limit, the control flow goes to the step S52 of FIG. 16 and the following steps. If a negative decision is obtained in the step S49, that is, if the gain G3 of the second signal combining portion 66 is not set at the minimum value, the control flow goes to step S50 to divide the variable "Y" by the gain G3, and to step S51 to subtract the predetermined value dG from the gain G3, to reduce the amplifying factor of the second signal combining portion 66. Then, the control flow goes to the step S48 and the following steps.

Figure 19:
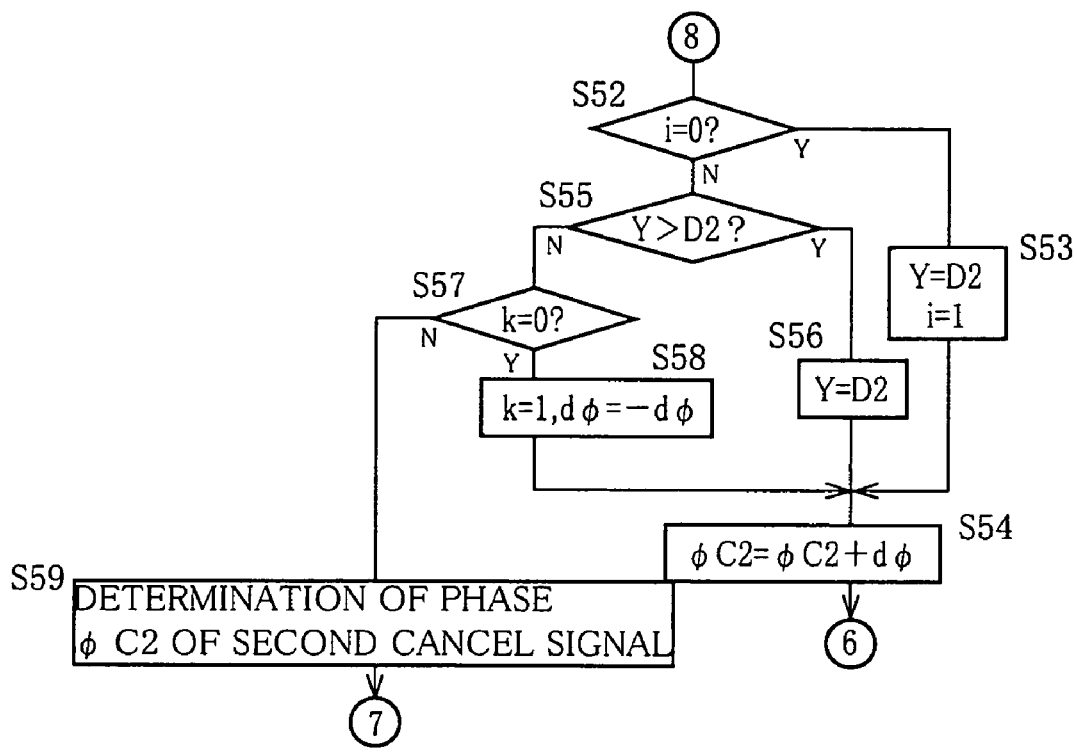
FIG. 19 is another part of the flow chart illustrating the control operations of the DSP.

The step S52 of FIG. 19 is provided to determine whether the variable "i" is set at "0". If an affirmative decision is obtained in the step S52, the control flow goes to step S53 to set the variable "Y" to D2, and set the variable "i" to "1". Then, the control flow goes to step S54 to add a predetermined value dϕ to the phase ϕC2 of the second cancel signal, and to the step S37 of FIG. 18 and the following steps. If a negative decision is obtained in the step S52, the control flow goes to step S55 to determine whether the variable "Y" is larger than the amplitude D2 of the direct current component of the demodulated second composite signal. If an affirmative decision is obtained in the step S55, the control flow goes to step S56 to set the variable "Y" to D2, and to the step S54. If a negative decision is obtained in the step S55, the control flow goes to step S57 to determine whether the variable "k" is set at "0". If an affirmative decision is obtained in the step S57, the control flow goes to step S58 to set the variable "k" to "1", and set the predetermined value dφ to −dφ, and then goes to the step 54. If a negative decision is obtained in the step S57, the control flow goes to step S59 to determine the phase φC2 of the second cancel signal. The step S59 is followed by step S2 of FIG. 14 and the following steps. Thus, the phase φC2 of the second cancel signal is controlled so as to minimize the direct current component D2 of the demodulated second composite signal. It will be understood that the steps S7 and S29 correspond to the first-cancel-signal control portion 26, and the steps S35 and S59 correspond to the second-cancel-signal control portion 30, while the steps S12 and S32 correspond to the first-composite-signal-amplitude detecting portion 38.

Figure 20:
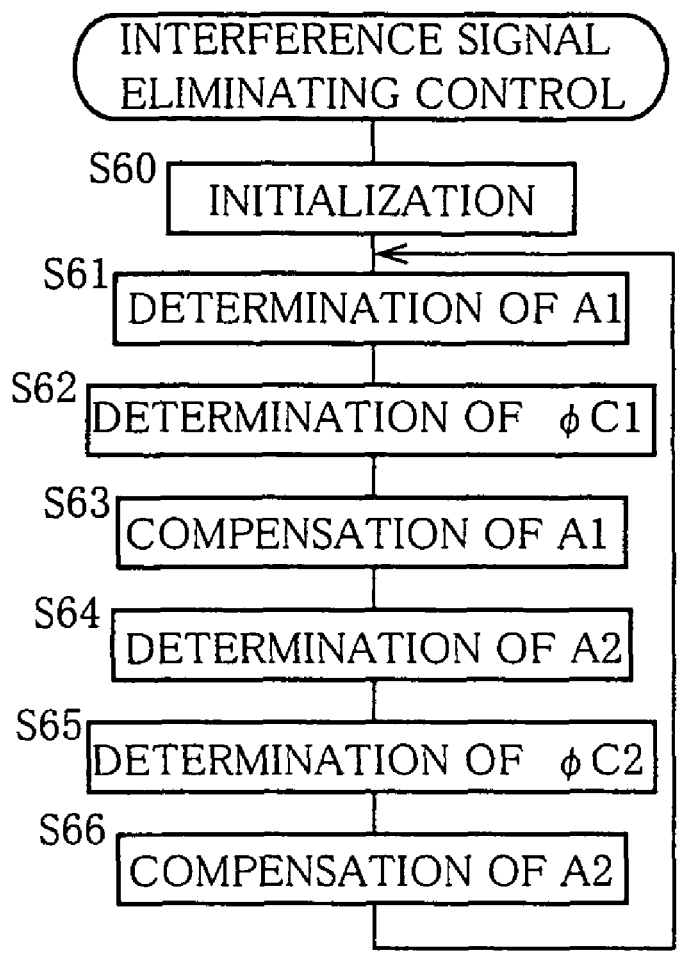
FIG. 20 is a part of a flow chart alternative to the flow chart of FIGS. 14-19.

The RFID-tag communication device 12 according to the first embodiment described above may be modified to further include compensating means for compensating the amplitudes of the first and second cancel signals, in particular, for a variation in the phases of the first signal combining portion 58 and the second signal combining portion 66, and an influence of the gain G1 of the second amplifying portion 60, for example. In a preferred modification, predetermined compensating amounts are preferably stored in a memory device of the DSP 16, and the amplitudes and phases of the first and second cancel signals are determined so as to minimize the amplitude of the leakage signal received by the RFID-tag communication system 10, and the amplitude A1 of the first cancel signal and the amplitude A2 of the second cancel signal are compensated to further reduce the amplitude of the leakage signal. For instance, the modification uses a control routine illustrated in the flow chart of FIG. 20 in place of the control routine illustrated in the flow charts of FIGS. 14-19. The control routine of FIG. 20 is initiated with step S60 corresponding to the step S1 of FIG. 14, to perform an initial setting. Then, the control flow goes to step S61 corresponding to the steps S2-S7, to determine the amplitude A1 of the first cancel signal, and to step S62 corresponding to the steps S8-S29 of FIGS. 15 and 16, to determine the phase φC1 of the first cancel signal. Then, step S63 is implemented to compensate the amplitude A1 of the first cancel signal for a possible variation due to a change of the phase of the first signal combining portion 58 and the gain G1 of the second amplifying portion 60. In this case, the compensation of the amplitude A1 is effected so as to minimize the amplitude Am1 of the first composite signal. Step S64 corresponding to the steps S30-S34 of FIG. 17 is then implemented to determine the amplitude A2 of the second cancel signal. The control flow then goes to step S75 corresponding to the steps S36-S59 of FIGS. 18 and 19, to determine the phase φC2 of the second cancel signal. Step S66 is then implemented to compensate the amplitude A2 of the second cancel signal for a possible variation due to a change of the phase of the second signal combining portion 66 and the gain G2 of the second signal combining portion 66, so as to minimize the direct current component D2 of the demodulated second composite signal. In the modification form of the first embodiment described above, the steps S63 and S66 are implemented in addition to the steps described above with respect to the first embodiment. It will be understood that the steps S61-S63 correspond to the first-cancel-signal control portion 26, while the steps S64-S66 correspond to the second-cancel-signal control portion 30.

Figure 21:
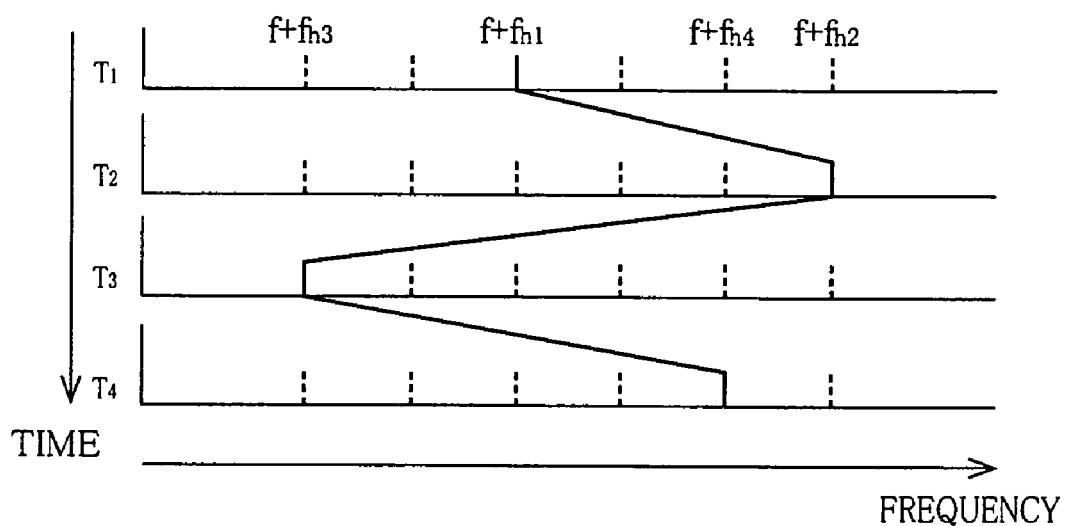
FIG. 21 is a view for explaining frequency hopping of a local oscillation signal in the RFID-tag communication device of FIG. 2.

The local-analog-oscillation-signal output portion 44 may be arranged to effect frequency hopping of the local analog oscillation signal. FIG. 21 is a view for explaining the frequency hopping of the local analog oscillation signal. As shown in FIG. 21, the frequency of the local analog oscillation signal may be hoped sequentially, for example, from fh1 to fh2, from fh2 to fh3, and from fh3 to fh4, so that the frequency of the transmission signal to be transmitted from the transmitter/receiver antenna 52 changes at a predetermined time interval, such that the frequency is equal to f+fh1 at a point of time T1, f+fh2 at a point of time T2, f+fh3 at a point of time T3, and f+fh4 at a point of time T4, for example, wherein "f" represents the frequency of the transmission signal which has been converted into the analog signal by the transmission-signal D/A converting portion 42. In the present arrangement, initial values of the amplitude A1 and phase φC1 of the first cancel signal, and the amplitude A2 and phase φC2 of the second cancel signal are stored for each of the different frequency values to which the frequency of the local analog oscillation signal is hopped, so that the initial values are selected depending upon the present frequency of the local analog oscillation signal during the frequency hopping. This arrangement permits suppression of the leakage signal even where the frequency of the local analog oscillation signal is hopped.

As described above, the RFID-tag communication device 12 includes: the first-cancel-signal output portion 24 operable to generate the first cancel signal in the form of a digital signal for suppressing from the received signal the leakage signal that is a part of the transmission signal that is a part of the transmission signal which is transmitted from the transmitter/receiver antenna 52 and which is returned to and received by the antenna 52; the first-cancel-signal control portion 26 operable to control the amplitude A1 and/or the phase φC1 of the first cancel signal generated by the first-cancel-signal output portion 24; the first-cancel-signal D/A converting portion 54 operable to convert the first cancel signal generated by the first-cancel-signal output portion 24, into an analog signal; and the first signal combining portion 58 operable to combine together the first cancel signal which has been converted into the analog signal by the first-cancel-signal D/A converting portion 54, and the received signal, to obtain the first composite signal. Accordingly, the present RFID-tag communication device 12 does not require a phase shifter for controlling the first cancel signal, and permits easy control of the amplitude and/or phase of the first cancel signal by digital signal processing. Namely, the present RFID-tag communication device 12 is simple in construction and is capable of suppressing the leakage signal that is a part of the transmission signal which is transmitted from by the RFID-tag communication device 12 and which is returned to and received by the communication device 12.

The RFID-tag communication device 12 further includes: the second-cancel-signal output portion 28 operable to generate the second cancel signal in the form of a digital signal for suppressing from the received signal the leakage signal received by the communication device 12; the second-cancel-signal control portion 30 operable to control the amplitude A2 and/or the phase φC2 of the second cancel signal generated by the second-cancel-signal output portion 28; the second-cancel-signal D/A converting portion 64 operable to convert the second cancel signal generated by the second-cancel-signal output portion 28, into an analog signal; and the second signal combining portion 66 operable to combine together the second cancel signal which has been converted into the analog signal by the second-cancel-signal D/A converting portion 64, and the received signal, to obtain the second composite signal. Accordingly, the present RFID-tag communication device 12 permits secondary suppression of the leakage signal at the second signal combining portion, as well as primary suppression of the leakage signal at the first signal combining portion. Further, the present RFID-tag communication device 12 does not require the phase shifter for controlling the cancel signal, and permits easy control by digital signal processing. It is noted that it is difficult to provide a phase shifter practically operable to deal with a relatively low or intermediate frequency. In this respect, the digital processing according to the first embodiment is highly significant.

The first cancel signal and the second cancel signals have respective different frequencies, and can therefore be easily be controlled according to the control signals corresponding to the frequencies of the first and second cancel signals.

The RFID-tag communication device 12 further includes the second amplifying portion 60 the gain G1 of which is variable and which is interposed between the first signal combining portion 58 and the second signal combining portion 66 and operable to amplify the first composite signal generated by the first signal combining portion 58. Accordingly, the first composite signal and the second cancel signal can be suitably combined together to obtain the second composite signal by the second signal combining portion 66. Further, the high-frequency amplification of the first composite signal by the second amplifying portion 60 improves the signal-to-noise ratio, and permits demodulation of the reply signals from the RFID tags 14, with a high degree of sensitivity.

Further, the second signal combining portion 66 also functions as an amplifying portion the gain G3 of which is variable and which is operable to amplify the second composite signal, so that the second composite signal can be detected with high sensitivity, by analog-to-digital conversion of the second composite signal or demodulation of the second composite signal.

The RFID-tag communication device 12 further includes the received-signal-amplitude detecting portion 36 operable to detect the amplitude AR of the received signal, so that the first-cancel-signal control portion 26 can control the amplitude A1 of the first cancel signal on the basis of the amplitude AR of the received signal detected by the received-signal-amplitude detecting portion 36, whereby the leakage signal contained in the received signal can be effectively suppressed.

The RFID-tag communication device 12 further includes the first-composite-signal-amplitude detecting portion 38 operable to detect the amplitude AM1 of the first composite signal generated by the first signal combining portion 58, so that the second-cancel-signal control portion 26 can control the phase $\phi C1$ of the first cancel signal on the basis of the amplitude AM1 of the first composite signal detected by the first-composite-signal-amplitude detecting portion 38, whereby the leakage signal contained in the received signal can be effectively suppressed.

Further, the second-cancel-signal control portion 30 is operable to control the amplitude AM2 of the second cancel signal on the basis of the amplitude AM1 of the first composite signal detected by the first-composite-signal-amplitude detecting portion 38, so that the leakage signal contained in the received signal can be effectively suppressed.

The RFID-tag communication device 12 further includes the direct-current-component detecting portion 34 operable to detect the direct current component of the demodulated signal generated by the demodulating portion 32 provided to demodulate the second composite signal generated by the second signal combining portion 66, so that the second-cancel-signal control portion 30 can control the phase $\phi C2$ of the second cancel signal on the basis of the direct current component of the demodulated signal detected by the direct-current-component detecting portion 34, whereby the leakage signal contained in the received signal can be effectively suppressed.

The RFID-tag communication device 12 further includes: the digital-transmission-signal output portion 20 operable to generate the transmission signal in the form of a digital signal; the transmission-signal D/A converting portion 42 operable to convert the transmission signal generated by the digital-transmission-signal output portion 20, into an analog signal; the first-composite-signal A/D converting portion 70 which is interposed between the first signal combining portion 58 and the first-composite-signal-amplitude detecting portion 38 and which is operable to convert the first composite signal generated by the first signal combining portion 58, into a digital signal; the second-composite-signal A/D converting portion 72 which is interposed between the second signal combining portion 66 and the demodulating portion 32 and which is operable to convert the second composite signal generated by the second signal combining portion 66, into a digital signal; and the received-signal A/D converting portion 76 operable to convert the received signal into a digital signal. The above-described first-cancel-signal D/A converting portion 54, second-cancel-signal D/A converting portion 64, transmission-signal D/A converting portion 42, first-composite-signal A/D converting portion 70, second-composite-signal-A/D converting portion 72 and received-signal A/D converting portion 76 use the common clock signal generated by the clock-signal output portion 78, to prevent a difference in the reference phase between the transmission signal and the received signal, thereby permitting effective suppression of the leakage signal contained in the received signal. It is noted that the demodulation of the received signal the frequency of which has been reduced by the first down-converter 62 to an intermediate frequency has a risk of considerable generation of a relatively low frequency component upon the demodulation due to a difference between the frequency of the clock signal of the A/D converting portions and the intermediate frequency. However, this risk can be prevented by using the common clock signal for the digital-to-analog conversion and the analog-to-digital conversion.

The RFID-tag communication device 12 further includes: the local-oscillation-signal output portion 44 operable to generate the predetermined local oscillation signal; the first up-converter 46 operable to increase the frequency of the transmission signal which has been converted into an analog signal by the transmission-signal D/A converting portion 43, by an amount corresponding to the frequency of the local oscillation signal generated by the local-oscillation-signal output portion 44; and the first down-converter 62 operable to reduce the frequency of the first composite signal generated by the first signal combining portion 58, by an amount corresponding to the frequency of the local oscillation signal generated by the local-oscillation-signal output portion 44. Accordingly, the analog-to-digital conversion of the first composite signal and the digital-to-analog conversion of the transmission signal can be effected by a simple converter arrangement using relatively inexpensive A/D and D/A converters.

The RFID-tag communication device 12 further includes the second down-converter 74 operable to reduce the frequency of the received signal, by an amount corresponding to the frequency of the local oscillation signal generated by the local-oscillation-signal output portion 44. Accordingly, the analog-to-digital conversion of the received signal can be effected by using a simple converter arrangement using a relatively inexpensive A/D converter.

Further, the digital-transmission-signal output portion 20 is arranged to generate the transmission signal on the basis of the predetermined sampling values which correspond to the respective different phases at the predetermined sampling points and which are represented by the function table stored in the function table 40. Accordingly, the digital-transmission-signal output portion 20 can generate the digital transmission signal, with a relatively simple arrangement.

Further, the first-cancel-signal output portion 24 is arranged to generate the first cancel signal on the basis of the function table stored in the function table 40, and the first-cancel-signal control portion 26 is arranged to control the phase φC1 of the first cancel signal, by changing the positions of the function table from which the function values are read out. Accordingly, the first-cancel-signal output portion 24 can generate the digital first cancel signal, with a relatively simple arrangement, and the phase φC1 of the first cancel signal can be easily controlled.

Further, the first-cancel-signal control portion 26 is arranged to control the amplitude A1 of the first cancel signal, by multiplying the digital signal generated on the basis of the function table stored in the function table 40, by a suitable control value. Thus, the amplitude A1 of the first cancel signal can be easily controlled.

Further, the second-cancel-signal output portion 28 is arranged to generate the second cancel signal on the basis of the function table stored in the function table 40, and the second-cancel-signal control portion 30 is arranged to control the phase φC2 of the second cancel signal, by changing the positions of the function table from which the function values are read out. Accordingly, the second-cancel-signal output portion 26 can generate the second cancel signal, with a relatively simple arrangement, and the phase φC2 of the second cancel signal can be easily controlled.

Further, the second-cancel-signal control portion 30 is arranged to control the amplitude A2 of the second cancel signal, by multiplying the digital signal generated on the basis of the function table in the function table 40, by a suitable control value. Thus, the amplitude A2 of the second cancel signal can be easily controlled.

Further, the first-cancel-signal output portion 26 is arranged to control the amplitude A1 and the phase φC1 of the first cancel signal on the basis of the received signal or the output of the second down-converter 74, and to control the phase φC1 of the first cancel signal on the basis of the second composite signal generated by the second signal combining portion 66. This arrangement permits effective suppression of the leakage signal contained in the received signal. Where the first-cancel-signal control portion is arranged to set the initial values of the amplitude A1 and phase φC1 of the first cancel signal on the basis of the received signal or the first composite signal, the time required for subsequent control of the phase φC1 of the first cancel signal can be reduced.

The local-oscillation-signal output portion 44 is arranged to effect the frequency hopping of the local oscillation signal. This arrangement is effective to prevent the local-oscillation-signal output portion 44 from disturbing or being disturbed by an operation of radio communication not associated with the ratio communication with the RFID tag 14.

There will be described in detail second through sixth embodiments of this invention by reference to the accompanying drawings. The same reference signs as used in the first embodiment will be used to identify the same elements, which will not be described.

Embodiment 2

Figure 22:
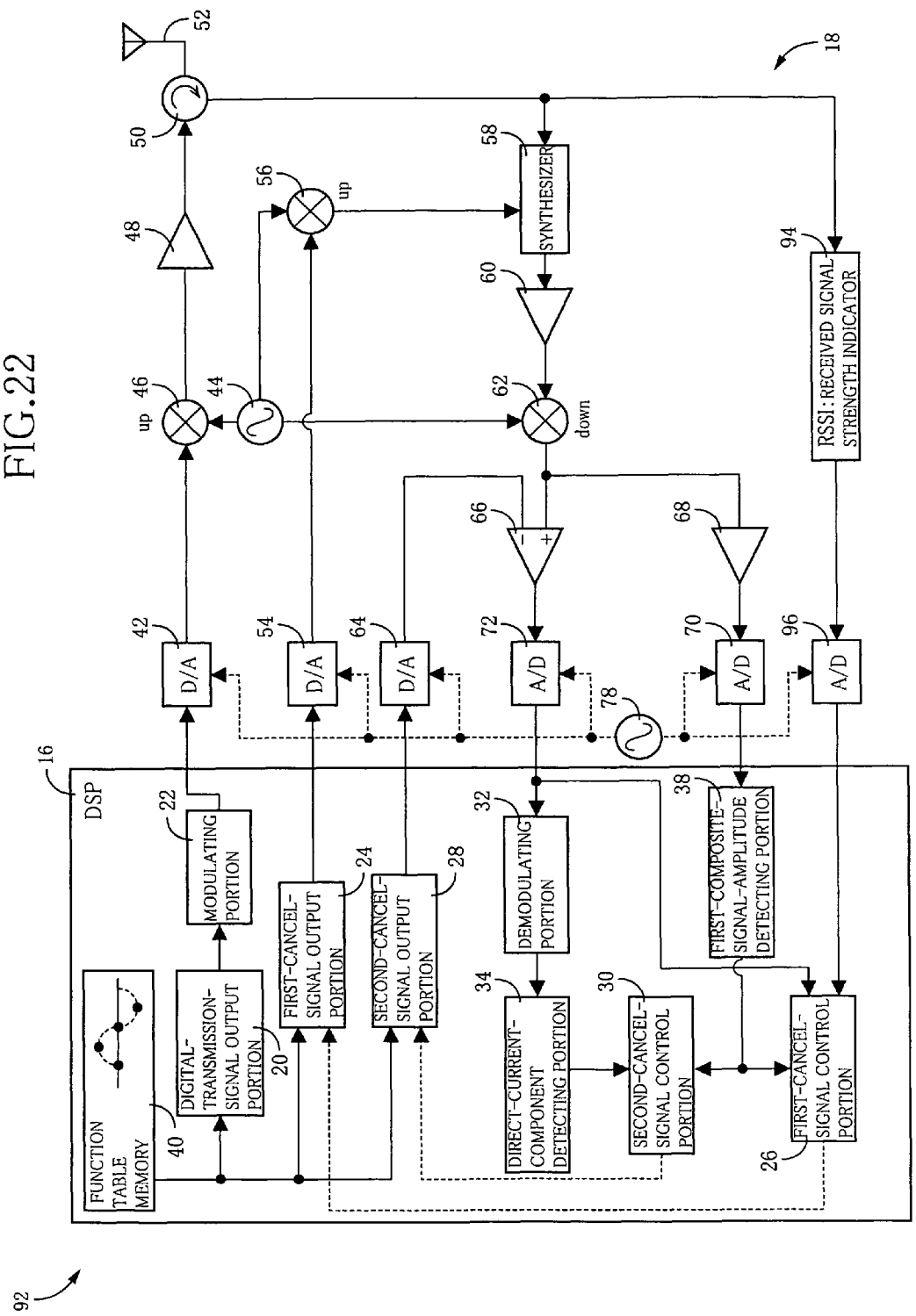
FIG. 22 is a view showing an electrical arrangement of an RFID-tag communication device constructed according to a second embodiment of this invention.

Referring to FIG. 22 showing an electrical arrangement of an RFID-tag communication device 92 constructed according to the second embodiment of this invention, the transmitter/receiver circuit 18 of this RFID-tag communication device 92 includes an RSSI (received signal strength indicator) 94 and an amplitude-signal A/D converting portion 96. The RSSI 94 is arranged to detect the amplitude AR of the received signal received from the transmission/reception separator 50, and the amplitude-signal A/D converting portion 96 is arranged to convert an output of the RSSI 94 indicative of the amplitude AR of the received signal, into a digital signal to be applied to the first-cancel-signal control portion 26. In the present second embodiment, the amplitude AR of the received signal received through the antenna 52 is directly detected by the RSSI 94, and the signal indicative of the detected amplitude AR is converted by the amplitude-signal A/D converting portion 96 into the digital signal to be applied to the first-cancel-signal control portion 26, so that the transmitter/receiver circuit 18 is advantageously simplified in construction.

Embodiment 3

Figure 23:
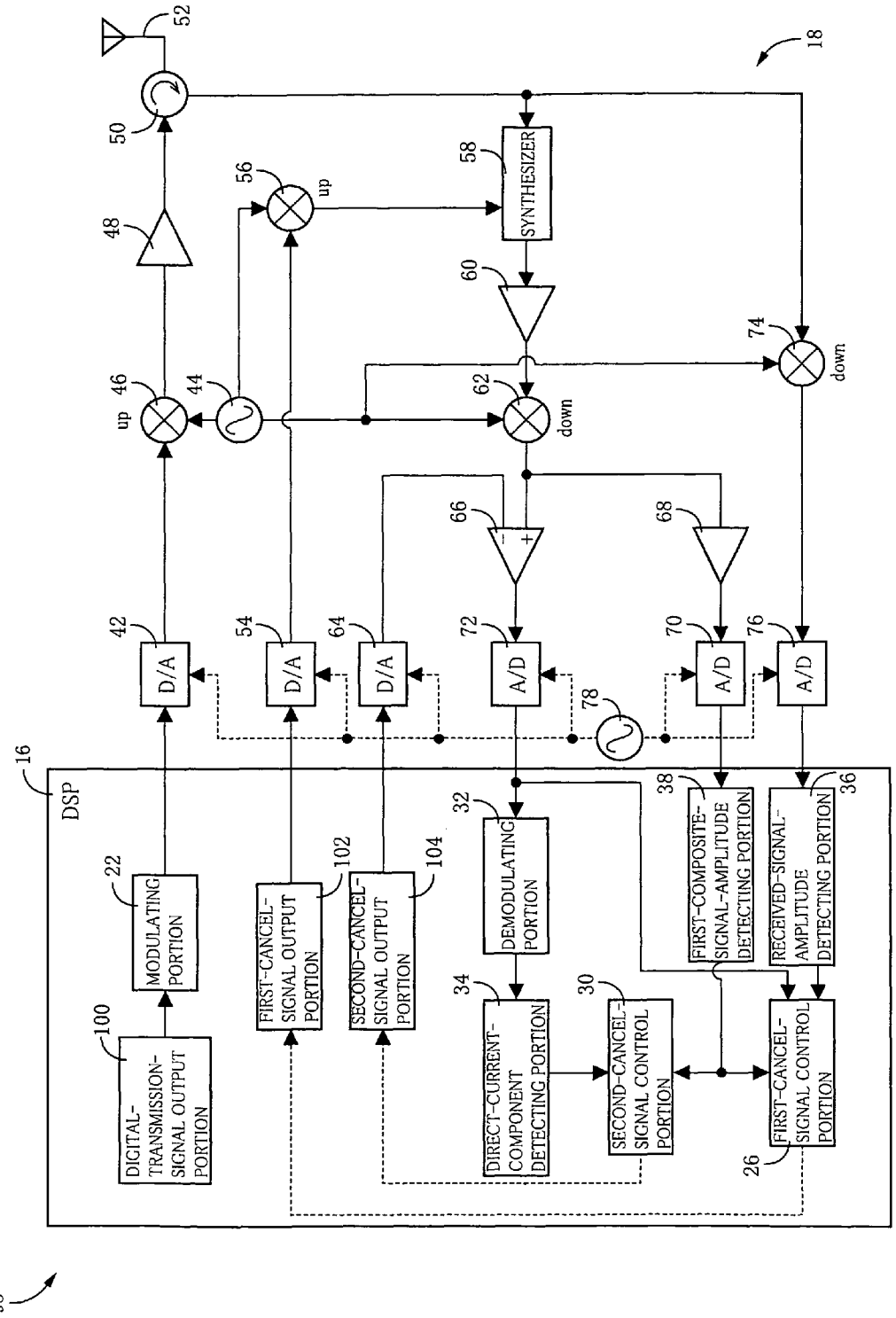
FIG. 23 is a view showing an electrical arrangement of an RFID-tag communication device constructed according to a third embodiment of this invention.
Figure 24:
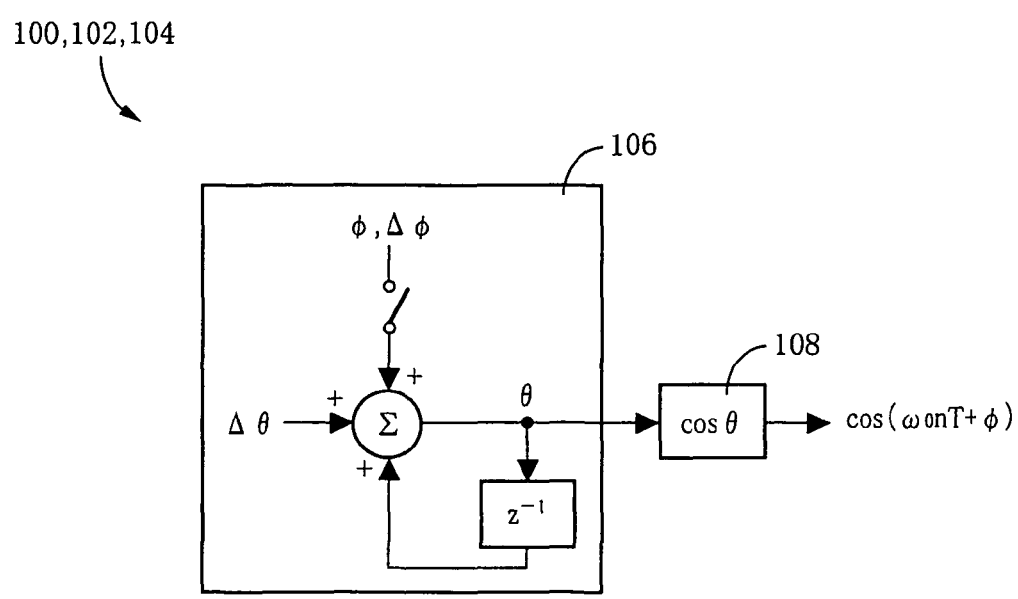
FIG. 24 is a view showing arrangements of a transmitted-digital-signal output portion, a first-cancel-signal output portion and a second-cancel-signal output portion of the RFID-tag communication device of FIG. 23.

Referring to FIG. 23 showing an electrical arrangement of an RFID-tag communication device 98 constructed according to the third embodiment of this invention, the present communication device 98 does not include the function table 40, and includes a digital-transmission-signal output portion 100, a first-cancel-signal output portion 102, and a second-cancel-signal output portion 104 in place of the digital-transmission-signal output portion 20, first-cancel-signal output portion 24 and second-cancel-signal output portion 26. The output portions 100, 102, 104 are operable independently of each other, to generate digital signals in the form of sine-wave or cosine-wave signals, without using the function table 40 provided in the first embodiment. Reference is made to FIG. 24 showing an arrangement of each of the digital-transmission-signal output portion 100, first-cancel-signal output portion 102 and second-cancel-signal output portion 104. Each of these output portions 100, 102, 104 includes an integrator 106 and an arithmetic unit 108. The integrator 106 is arranged to calculate a phase θ ($=\omega_0 nT$) by incrementing an initial phase φ by a predetermined value Δθ (e.g., π/2). The arithmetic unit 108 is arranged to calculate a cosine wave cos θ corresponding to the phase φ calculated by the integrator 106. To change the phase θ by a desired amount ±Δφ, the initial phase is changed by the desired amount ±Δφ, by a switching operation. The digital-transmission-signal output portion 100, first-cancel-signal output portion 102 and second-cancel-signal output portion 104 perform arithmetic operations to calculate the desired amount ±Δφ, from time to time, and multiply a cosine wave cos θ calculated by the arithmetic unit 108, by a control value depending upon the phase θ calculated by the integrator 106, for thereby amplifying the cosine wave cos θ, to generate a desired digital signal in the form of the cosine wave. The present third embodiment does not require the function table 40, and does not require the frequency of the clock signal generated by the clock-signal output portion 78 to be set four times the frequency of the first composite signal (intermediate frequency signal) the frequency of which has been reduced by the first down converter 62, or a multiple of the frequency four times that of this intermediate frequency signal, in order to simplify the function table stored in the function table 40. Thus, the present third embodiment permits the first and second cancel signals having the desired phase and amplitude. The amplitude and phase of the received signal may be detected without the provision of the received-signal-amplitude detecting portion 36. In this case, the first-cancel-signal output portion 102 may be modified to generate a first cancel signal having the detected amplitude of the received signal and a phase opposite to the detected phase of the received signal. The phase of the first cancel signal is subsequently adjusted so as to minimize the output of the first-composite-signal-amplitude detecting portion 38. This modification is effective to maximize the control speed of the first cancel signal.

Embodiment 4

Figure 25:
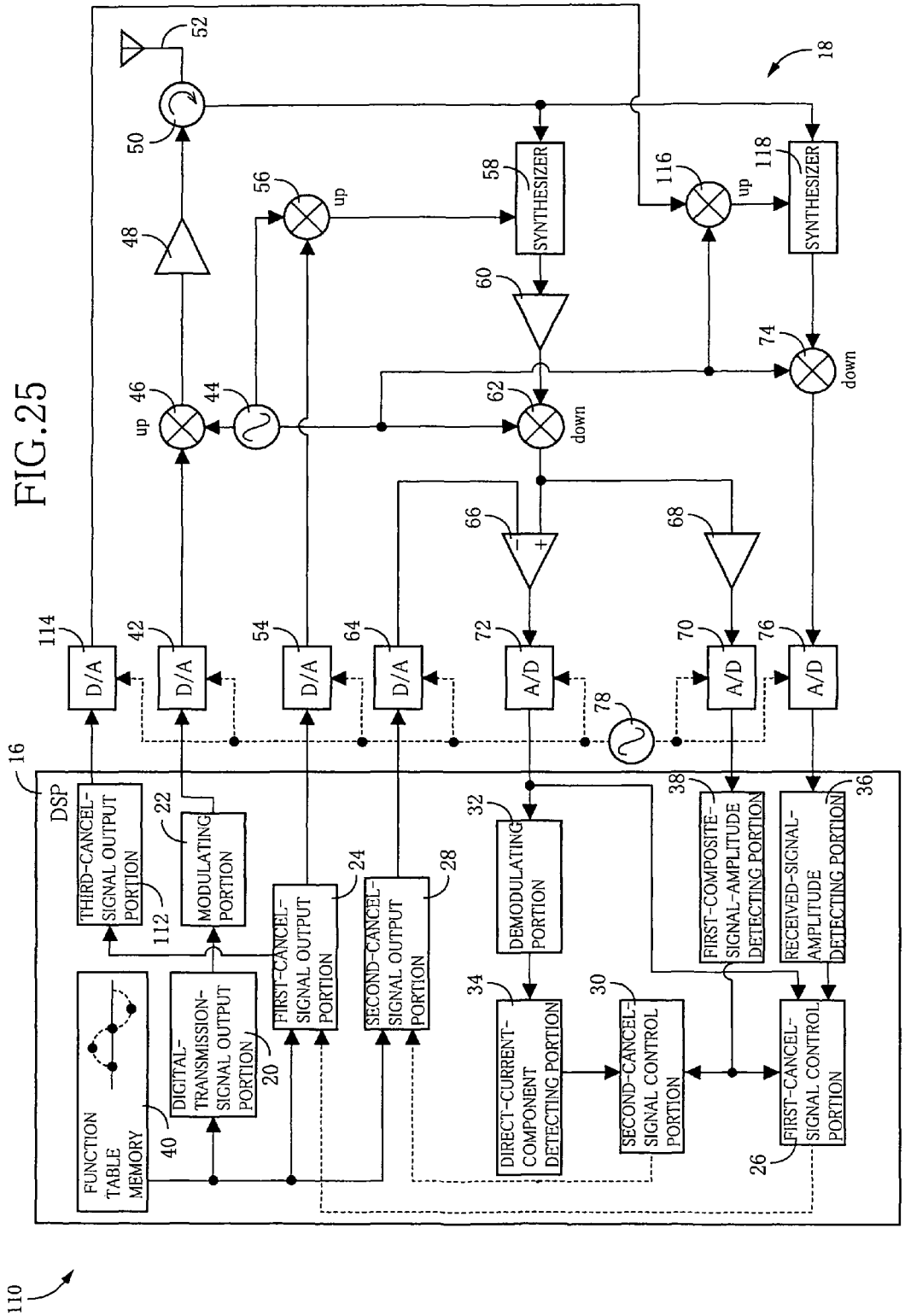
FIG. 25 is a view showing an electrical arrangement of an RFID-tag communication device constructed according to a fourth embodiment of this invention.

Referring to FIG. 25 showing an electrical arrangement of an RFID-tag communication device 110 constructed according to the fourth embodiment of this invention, this communication device 110 includes a third-cancel-signal output portion 112, a third-cancel-signal D/A converting portion 114, a third down-converter 116 and a third signal combining portion 118. The third-cancel-signal output portion 112 is arranged to generate a third cancel signal in the form of a digital signal on the basis of the received signal. The third-cancel-signal D/A converting portion 114 is arranged to convert the third cancel signal generated by the third-cancel-signal output portion 112, into an analog signal. The third down-converter 116 is arranged to reduce the frequency of the analog third cancel signal generated by the third-cancel-signal D/A converting portion 114, by an amount corresponding to the frequency of the local oscillation signal generated by the local-oscillation-signal output portion 44. The third signal combining portion 118 is arranged to combine together the third cancel signal the frequency of which has been reduced by the third down converter 116, and the received signal received from the transmission/reception separator 50. In the present fourth embodiment, the leakage signal contained in the received signal is suppressed by the third signal combining portion 118, before the frequency of the received signal is reduced by the second down-converter 74, so that the reply signal from each RFID tag 14 can be detected with high sensitivity, even where the received signal contains a comparatively large amount of the leakage signal (that is a part of the transmission signal transmitted from and returned to the communication device), or contains noise signals mixed therein due to reflection of the transmitted transmission signal by any structural body located near the communication device. In addition, the present RFID-tag communication device 110 permits the second down-converter 62 to have a relatively low upper limit of the input voltage, thereby making it possible to reduce the amount of noises remaining in the output of the second down-converter 74, whereby the sensitivity of the RFID-tag communication device 110 to the reply signal transmitted from the RFID tag 14 can be improved. Since the output of the third down-converter 116 is not applied to the demodulator 32, the third down-converter 116 does not have an adverse effect on the sensitivity of the communication device 10 to the reply signal even where the third down-converter 116 has a relatively high lower limit of the input voltage.

In the preceding embodiments, the first-cancel-signal output portion 24, 102, first-cancel-signal control portion 26, second-cancel-signal output portion 28, 104, second-cancel-signal control portion 30, etc. are functional elements incorporated in the DSP 16, those portions may be control devices separate from the DSP 16.

Although the second signal combining portion 66 in the preceding embodiments also functions as an amplifier to amplify the second composite signal, a second-composite-signal amplifying portion may be interposed between the second signal combining portion 66 and the second-composite-signal A/D converting portion 72. Further, the first signal combining portion 58 may be arranged to also function as an amplifier to amplify the first composite signal. In this case, the second amplifying portion 60 is not required.

In the preceding embodiments, the RFID-tag communication device 12, 92, 98, 110 is provided with the transmitter/receiver antenna 52 used to transmit the carrier wave $F_{c1}$ toward the RFID tags 14 and receive the reflected waves $F_{rf}$ transmitted from the RFID tags 14. However, the RFID-tag communication device may use a transmitter antenna through which the carrier wave $F_{c1}$ is transmitted toward the RFID tags 14, and a receiver antenna through which the reflected waves $F_{rf}$ transmitted from the RFID tags 14 are received.

In the preceding embodiments, the RFID-tag communication device 12, 92, 98, 110 is provided with the first down-converter 62 operable to reduce the frequency of the first composite signal to generate an intermediate frequency signal. However, the provision of the first down-converter 62 to reduce the frequency of the first composite signal is not essential. The suppression of the first down-converter 62 simplifies the arrangement of the transmitter/receiver circuit 18.

While the RFID-tag communication device 12, 92, 98, 110 in the preceding embodiments is used as an interrogator in the communication system 10, the RFID-tag communication device may be used as an RFID-tag producing device for writing desired information on the RFID tags 14, or an RFID-tag reader/writer for reading or writing information from or on the RFID tags 14.

Embodiment 5

Figure 26:
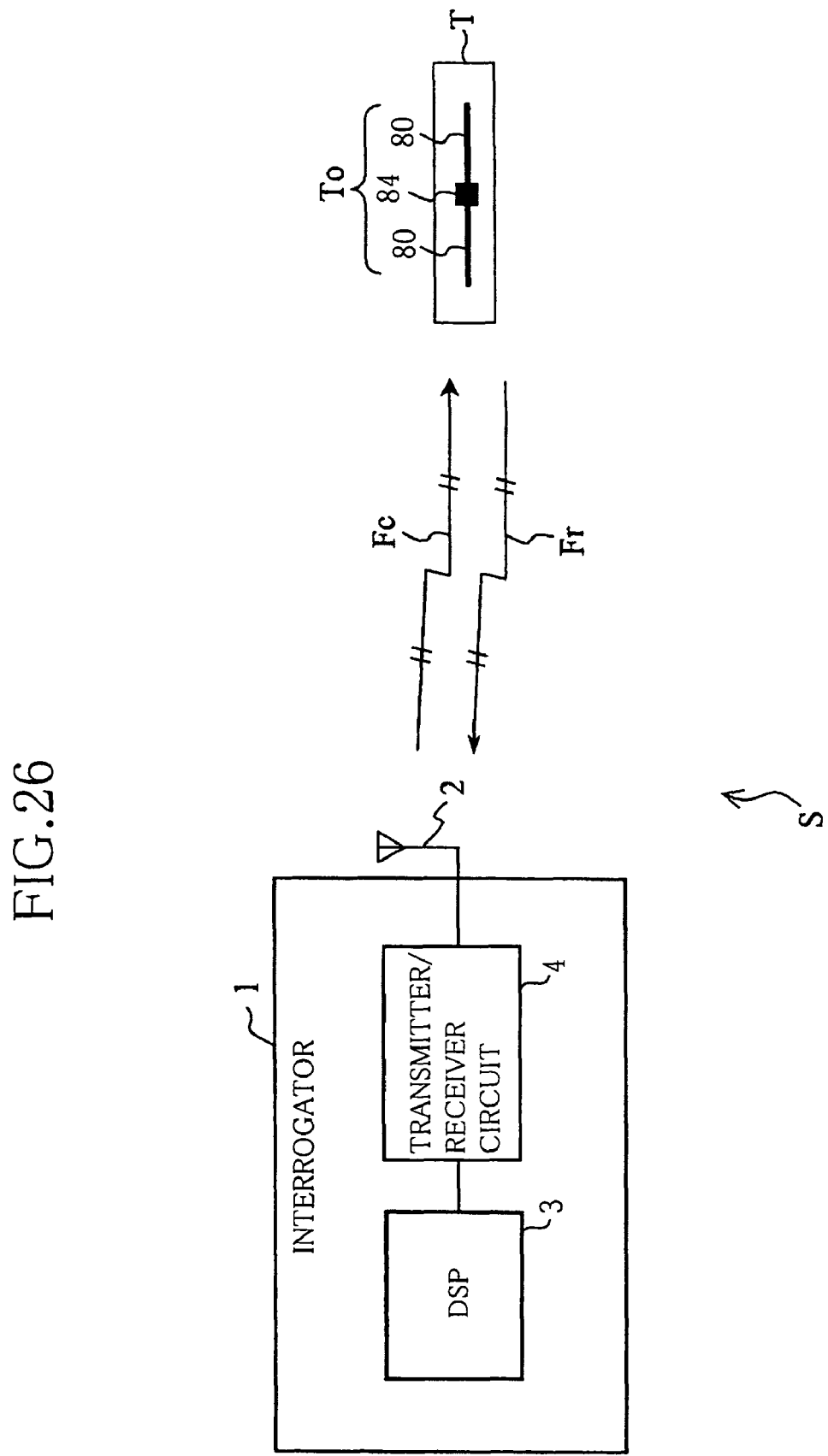
FIG. 26 is a view schematically showing an overall arrangement of a communication system device constructed according to a fifth embodiment of this invention.

Referring to FIG. 26 schematically showing an overall arrangement of a communication system S constructed according to the fifth embodiment of this invention, the communication system S is an RFID (radio-frequency identification) communication system including an RFID-tag communication device in the form of an interrogator 1 and a transponder in the form of an RFID tag T. The communication system S may include a plurality of interrogators 1, and a plurality of RFID tags T. The RFID tag T has an RFID-circuit element $T_0$ including the antenna portion 80, the modulating/demodulating portion 82 and the digital circuit portion (IC-circuit portion) 84, like the RFID tags 14 in the first embodiment described above.

The interrogator 1 arranged to effect radio communication with the antenna portion 80 of the RFID-circuit element $T_0$ consists of a transmitter/receiver antenna 2, a DSP (digital signal processor) 3 and a transmitter/receiver circuit 4. The DSP 3 is arranged to effect digital signal processing operations to effect at least one of information writing and reading on and from the RFID-circuit element $T_0$ through the antenna 2, by generating a digital transmission signal in the form of an interrogating wave $F_c$, and/or demodulating a reply signal in the form of a reflected wave $F_r$ transmitted from the RFID-circuit element $T_0$. The transmitter/receiver circuit 34 is arranged to convert the transmission signal generated by the DSP 3 into an analog signal, transmit the analog transmission signal as the interrogating wave $F_c$ through the antenna 2, receive the reflected wave $F_r$ from the RFID-circuit element $T_0$, convert the received reflected wave $F_r$ into a digital signal, and apply the digital signal to the DSP 3.

Figure 27:
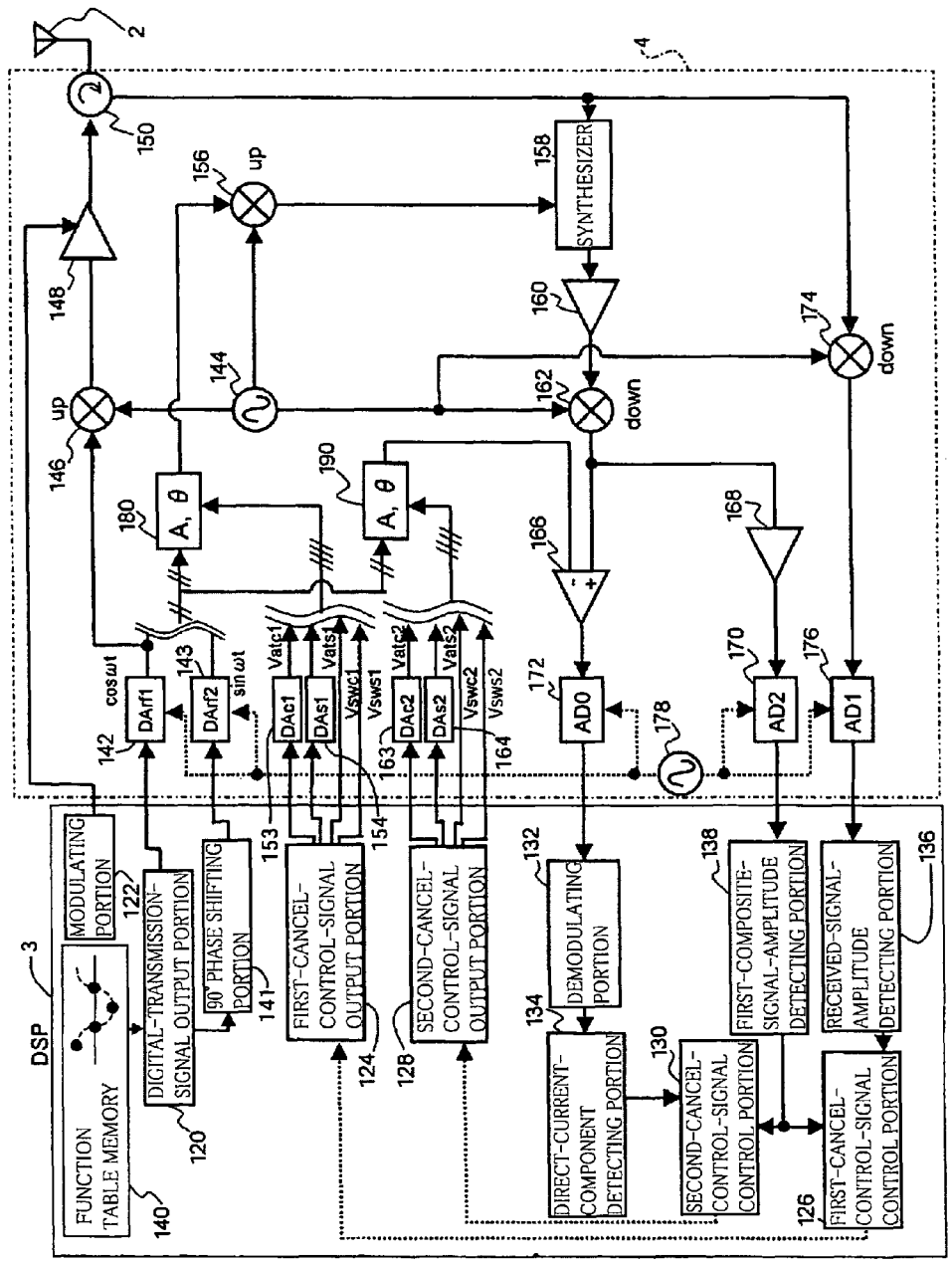
FIG. 27 is a functional block diagram showing a functional arrangement of an interrogator shown in FIG. 26.

The block diagram of FIG. 27 shows a functional arrangement of the interrogator 1, which consists of the antenna 2, DSP3 and transmitter/receiver circuit 4, as described above.

The DSP3 is constituted by a so-called microcomputer system incorporating a CPU, a ROM and a RAM and operable to perform signal processing operations according to control programs stored in the ROM, while utilizing a temporary data storage function of the RAM. The DSP3 includes a function table 140, a digital-transmission-signal output portion 120, a 90° phase shifting portion (phase converting portion) 141, a modulating portion 122, a first-cancel-control signal output portion 124, a first-cancel-control-signal control portion 126, a second-cancel-control-signal output portion 128, a second-cancel-control-signal control portion 130, a demodulating portion 132, a direct-current-component detecting portion 134, a received-signal-amplitude detecting portion 136, and a first-composite-signal-amplitude detecting portion 138. The function table is provided to store sampling values corresponding to respective different phases at predetermined sampling points. The digital-transmission-signal output portion 120 is arranged to generate the digital transmission signal in the form of a carrier wave (sine-wave signal) to be transmitted to the RFID-circuit element $T_0$, on the basis of sampling values of a function table stored in the function table 140. The 90° phase shifting portion 141 is arranged to generate, on the basis of the sampling values stored in the function table 140, a digital signal (sine-wave signal) which is delayed with respect to the digital signal generated by the digital-transmission-signal output portion 120, by a time corresponding to one sampling value, namely, a digital transmission signal the phase of which is different by 90° from that of the digital transmission signal generated by the digital-transmission-signal output portion 120. The modulating portion 122 is arranged to modulate the above-indicated carrier wave on the basis of a suitable command signal, for thereby generating an access signal. The first-cancel-control-signal output portion 124 is arranged to generate a first cancel control signal for generating a first cancel signal (first offset signal) to effect primary suppression or cancellation (offsetting) of an unnecessary or interference wave that is a part of the digital transmission signal which is transmitted from the antenna 2 toward the RFID-circuit element $T_0$ and returned to the transmission/receiver circuit 4. The first-cancel-control-signal control portion 126 is arranged to control the amplitude and phase of the first cancel control signal generated by the first-cancel-control-signal output portion 124. The second-cancel-control-signal output portion 128 is arranged to generate a second cancel control signal for generating a second cancel signal (second offset signal) to effect secondary suppression or cancellation of the above-indicated unnecessary wave. The second-cancel-control-signal control portion 130 is arranged to control the amplitude and phase of the second cancel control signal generated by the second-cancel-control-signal output portion 128. The demodulating portion 132 is arranged to demodulate a received signal received through the antenna 2. The direct-current-component detecting portion 134 is arranged to detect a direct-current component (DC component) of the demodulated signal generated by the demodulating portion 132. The received-signal-amplitude detecting portion 136 is arranged to detect the amplitude of the above-indicated received signal. The first-composite-signal-amplitude detecting portion 138 is arranged to detect the amplitude of a first composite signal generated by a first signal combining portion 158 (which will be described).

The transmitter/receiver circuit 4 includes a high-speed first transmission-signal D/A converting portion 142, a high-speed second transmission-signal D/A converting portion 143, a local-oscillation-signal output portion 144, a first up-converter 146, a first amplifying portion 148, a transmission/reception separator 150, low-speed first-cancel-control-signal D/A converting portions 153, 154, a first-composite-sine-wave-signal generating circuit 180, a second up-converter 156, the above-indicated first signal combining portion (synthesizer) 158, a second amplifying portion 160, a first down-converter 162, low-speed second-cancel-control-signal D/A converting portions 163, 164, a second-composite-sine-wave-signal generating circuit 190, a second signal combining portion 166, a third amplifying portion 168, a first-composite-signal A/D converting portion 170, a second-composite-signal A/D converting portion 172, a second down-converter 174, a received-signal A/D converting portion 176, and a clock-signal output portion 178. The high-speed first transmission-signal D/A converting portion 142 is arranged to convert the digital transmission signal generated by the digital-transmission-signal output portion 120, into an analog signal, for generating a first sine-wave signal. The high-speed second transmission-signal D/A converting portion 143 is arranged to convert the digital transmission signal generated by the 90° phase shifting portion 141 into an analog signal, for generating a second sine-wave signal the phase of which is different by 90° from that of the first sine-wave signal indicated above. The local-oscillation-signal output portion 144 is arranged to generate a suitable local oscillation signal. The first up-converter 146 is arranged to increase the frequency of the analog transmission signal received from the above-described first transmission-signal D/A converting portion 142, by an amount corresponding to the frequency of the local oscillation signal generated by the local-oscillation-signal output portion 144. The first amplifying portion 148 is arranged to amplify the transmission signal generated by the first up-converter 146. The transmission/reception separator 150 is arranged to apply the transmission signal generated by the first amplifying portion 148, to the transmitter/receiver antenna 2, and to apply the reply signal (the received signal containing a leakage signal that is a part of the transmission signal transmitted from the communication device and returned to the communication device) received from the above-described RFID-circuit element $T_0$ through the transmitter/receiver antenna 2, to the first signal combining portion 158 and the second down-converter 174. The low-speed first-cancel-control-signal D/A converting portions 153, 154 are arranged to convert the first cancel control signal generated by the first-cancel-control-signal output portion 124, into amplitude signals. The first-composite-sine-wave-signal generating circuit 180 is arranged to receive the first and second sine-wave signals from the first transmission-signal D/A converting portion 142 and the second transmission-signal D/A converting portion 143, and combine together the received first and second sine-wave signals to obtain a composite sine-wave signal (first cancel signal for the primary suppression or cancellation of the unnecessary wave) having an amplitude and a phase that are different from those of the first and second sine-wave signals, on the basis of the amplitude control signals received from the first-cancel-control-signal D/A converting portions 153, 154 and polarity control signals received from the first-cancel-control-signal output portion 124, while the amplitudes of the first and second sine-wave signals are-controlled. The second up-converter 156 is arranged to increase the frequency of the first cancel signal generated by the first-composite-sine-wave-signal generating portion 180, by an amount corresponding to the frequency of the local oscillation signal generated by the above-described local-oscillation-signal output portion 144. The first signal combining portion (synthesizer) 158 is arranged to combine together the first cancel signal generated by the second up converter 156, and the above-described received signal received from the transmitter/receiver antenna 2 through the transmission/reception separator 150, to obtain a first composite signal. The second amplifying portion 160 is arranged to amplify the first composite signal generated by the first signal combining portion 158, for increasing its amplitude. The first down-converter 162 is arranged to reduce the frequency of the first composite signal generated by the second amplifying portion 160, by an amount corresponding to the frequency of the local oscillation signal generated by the above-described local-oscillation-signal output portion 144. The low-speed second-cancel-control-signal D/A converting portion 163, 164 are arranged to convert the second cancel control signal generated by the above-described second-cancel-control signal output portion 128, into amplitude signals. The second-composite-sine-wave-signal generating circuit 190 is arranged to receive the first and second sine-wave signals from the first transmission-signal D/A converting portion 142 and the second transmission-signal D/A converting portion 143, combine together the received first and second sine-wave signals to synthesize a composite sine-wave signal (second cancel signal for the secondary suppression or cancellation of the unnecessary wave) having an amplitude and a phase that are different from those of the first and second sine-wave signals, on the basis of the amplitude control signals received from the second-cancel-control-signal D/A converting portions 163, 164 and polarity control signals received from the first-cancel-control-signal output portion 128, while the amplitudes of the first and second sine-wave signals are controlled. The second signal combining portion 166 is arranged to combine together (and amplify, when needed) the second cancel signal generated by the second-composite-sine-wave-signal generating portion 190 and the first composite signal generated by the first down-converter 162, to obtain a second composite signal. The third amplifying portion 168 is arranged to amplify the first composite signal generated by the first down-converter 162, for increasing its amplitude. The first-composite-signal A/D converting portion 170 is arranged to convert the first composite signal received from the third amplifying portion 168, into a digital signal, and to apply the digital first composite signal to the above-described first-composite-signal-amplitude detecting portion 138. The second-composite-signal A/D converting portion 172 is arranged to convert the second composite signal received from the second signal combining portion 166, into a digital signal, and to apply the digital second composite signal to the above-described demodulating portion 132. The second down-converter 174 is arranged to reduce the frequency of the above-described received signal received through the transmission/reception separator 150, by an amount corresponding to the frequency of the local oscillation signal generated by the local-oscillation-signal output portion 144. The received-signal A/D converting portion 176 is arranged to convert the received signal received from the second down-converter 174, into a digital signal, and to apply the digital received signal to the above-described received-signal-amplitude detecting portion 136. The clock-signal output portion 178 is arranged to generate a suitable clock signal.

The clock-signal output portion 178 applies the clock signal to the above-described transmission-signal D/A converting portions 142, 143, and applies the same clock signal to the above-described first-composite-signal A/D converting portion 170, second-composite-signal A/D converting portion 172, and received-signal A/D converting portion 176. The above-described received-signal A/D converting portion 176 uses a converter having a smaller number of bits, than a converter used by the first-composite-signal A/D converting portion 170, etc. This converter used by the received-signal A/D converting portion 176 has an advantage that a component of the received signal which relates to the modulation by the RFID-circuit element $T_0$ can be ignored. It is noted that the local-oscillation-signal output portion 144 uses an oscillator operable to generate a frequency in the neighborhood of 900 MHz or 2.4 GHz. The transmission/reception separator 150 generally uses a circulator or a directional coupler.

A basic operation of the RFID communication system S will be described by reference to FIGS. 28-32.

As shown in FIG. 27, the digital-transmission-signal output portion 120 of the DSP 3 of the interrogator 1 in the present RFID communication system S generates the digital transmission signal on the basis of the function table stored in the function table 140. The generated digital transmission signal is converted by the first transmission-signal D/A converting portion 142 into an analog signal (sine-wave signal).

The frequency of the analog transmission signal generated by the first transmission-signal D/A converting portion 142 is increased by the first up-converter 146 by an amount corresponding to the frequency of the local oscillation signal generated by the local-oscillation-signal output portion 144, and the analog transmission signal generated by the first up-converter 146 is amplified by the first amplifying portion 148 and modulated according to a signal received from the modulating portion 122. The modulated transmission signal generated by the first amplifying portion 148 is applied to the antenna 2 through the transmission/reception separator 150, and transmitted as the interrogating wave $F_c$ from the antenna 2 toward the RFID-circuit element $T_0$.

The interrogating wave $F_c$ transmitted from the antenna 2 and received by the antenna 80 of the RFID-circuit element $T_0$ as shown in FIG. 26 is modulated by the modulating/demodulating portion 82. A portion of the interrogating wave $F_c$ is rectified by a rectifying portion of the RFID-circuit portion $T_0$, and is used as an energy source (power source) of the RFID-circuit element $T_0$. With an electric energy of this energy source, the control portion 86 of the Digital-circuit portion 84 generates the reply signal on the basis of information signals stored in a memory of the RFID-circuit element $T_0$, and the modulating/demodulating portion 82 modulates the interrogating wave $F_c$ on the basis of the generated reply signal. The modulated interrogating wave $F_c$ is transmitted as the reflected wave $F_r$ from the antenna portion 80 toward the interrogator 1.

The reflected wave $F_r$ transmitted from the RFID-circuit element $T_0$ is received by the antenna 2 of the interrogator 1, and applied as the received signal to the first signal combining portion 158 and the second down-converter 174 through the transmission/reception separator 150. At this time, a leakage signal that is a part of the transmission signal which is transmitted from the RFID-tag communication device and returned to the communication device through the transmission/reception separator 150 may be applied to the first signal combining portion 158 and second down-converter 174, together with the received signal.

The frequency of the received signal received by the second down-converter 174 is reduced by the amount corresponding to the frequency of the local oscillation signal generated by the local-oscillation-signal output portion 144. The received signal the frequency of which has been reduced by the second down-converter 74 is converted by the received-signal A/D converting portion 176, into a digital signal which is applied to the received-signal-amplitude detecting portion 136, so that the amplitude of the received signal is detected by the received-signal-amplitude detecting portion 136. An output of the received-signal-amplitude detecting portion 136 is applied to the first-cancel-control-signal control portion 126.

The first-cancel-control-signal control portion 126 determines the phase and the amplitude of the first cancel control signal for the primary suppression or cancellation (offsetting) of the leakage signal, on the basis of the amplitude of the received signal received from the received-signal-amplitude detecting portion 136 and the amplitude of the received signal received from the first-composite-signal-amplitude detecting portion 138, as shown in FIG. 27. The output of the first-cancel-control-signal control portion 126 is applied to the first-cancel-control-signal output portion 124. The first-cancel-signal output portion 124 generates the first cancel control signal in the form of a digital signal having the phase and amplitude determined by the first-cancel-control-signal control portion 126.

The 90° phase shifting portion 141 generates a transmission signal in the form of a digital signal, on the basis of the sampling values of the function table received by the digital-transmission-signal output portion 120. This digital transmission signal is converted by the second transmission-signal D/A converting potion 143 into an analog signal (second sine-wave signal). The second sine-wave signal generated by the second transmission-signal D/A converting portion 143 and the first sine-wave signal generated by the first transmission-signal D/A converting portion 142 are applied to the first-composite-sine-wave-signal generating circuit 180 and the second composite-sine-wave-signal generating circuit 190.

The first-composite-sine-wave-signal generating circuit 180 is provided to combine together the received first and second sine-wave signals to synthesize the composite sine-wave signal (first cancel signal for the primary suppression or cancellation of the leakage signal), on the basis of the first cancel control signal received from the first-cancel-control-signal output portion 124, more precisely, polarity control signals Vswc1 and Vsws1 received from the first-cancel-control-signal output portion 124, and amplitude control signals Vatc1 and Vats1 received from the first-cancel-control-signal D/A converting portions 153, 154, while the amplitudes of the first and second sine-wave signals are controlled.

The amplitude of the first cancel signal generated by the first-composite-sine-wave-signal generating circuit 180 is increased by the second up-converter 156, by an amount corresponding to the frequency of the local oscillation signal generated by the local-oscillation-signal output portion 144. The first cancel signal generated by the second up-converter 156 and the received signal received through the transmission/reception separator 150 are combined together by the first signal combining portion 158 to obtain the first composite signal from which the leakage signal received by the RFID-tag communication device 12 is totally or partially suppressed.

The amplitude of the first composite signal generated by the first signal combining portion 158 is amplified by the second amplifying portion 160, by a predetermined gain. Where the amplitude and the phase of the first cancel signal are suitably determined, the intensity of the first cancel signal is relatively low, and the intensity of the input to the first down-converter 162 is accordingly low, so that the gain of the second amplifying portion 160 is accordingly increased.

The frequency of the first composite signal generated by the second amplifying portion 160 is reduced by the first down-converter 162 by the amount corresponding to the frequency of the local oscillation signal generated by the local-signal output portion 144, and the first composite signal the frequency of which has been reduced is applied to the second signal combining portion 166 and the third amplifying portion 168. The gain of the third amplifying portion 168 is set at a predetermined initial value. The frequency of the clock signal generated by the clock-signal output portion 178 is preferably four times the frequency of the first composite signal (intermediate frequency signal) the frequency of which has been reduced, or a multiple of the frequency four times that of this intermediate frequency signal.

The amplitude of the first composite signal applied to the third amplifying portion 168 is amplified by a predetermined gain. The amplitude of the first composite signal generated by the first down-converter 162 decreases as the suppression or reduction of the leakage signal progresses. Accordingly, the gain of the third amplifying portion 168 is preferably increased as the suppression of the leakage signal progresses.

The first composite signal generated by the third amplifying portion 168 is converted by the first-composite-signal A/D converting portion 170, into the digital signal, and the digital first composite signal is applied to the first-composite-signal-amplitude detecting portion 138, so that the amplitude of the first composite signal is detected by the first-composite-signal-amplitude detecting portion 138. The output of the first-composite-signal-amplitude detecting portion 138 is applied to the first-cancel-control-signal control portion 126 and the second-cancel-control-signal control portion 130. The phase and amplitude of the first cancel control signal are controlled by the first-cancel-control-signal control portion 126, on the basis of the output of the received-signal-amplitude detecting portion 136 and the output of the first-composite-signal-amplitude detecting portion 138, such that the amplitude of the first cancel signal generated by the first-composite-sine-wave-signal generating circuit 180 and converted by the first up-converter 156 is equal to the amplitude of the received signal received by the first signal combining portion 158, and such that the phases of those first cancel signal and received signal are reversed with respect to each other. Namely, the amplitude of the first cancel signal is determined by the output of the received-signal-amplitude detecting portion 136, and the phase of the first cancel signal is determined on the basis of the output of the first-composite-signal-amplitude detecting portion 138, so as to minimize the output of the first-composite-signal-amplitude detecting portion 138.

In the meantime, the phase and the amplitude of the second cancel control signal for the secondary suppression or cancellation (offsetting) of the leakage signal are determined by the second-cancel-control-signal control portion 130, on the basis of the output of the first-composite-signal-amplitude detecting portion 138 (indicative of the amplitude of the received signal subjected to the primary suppression of the leakage signal) and the second composite signal generated by the second-composite-signal A/D converting portion 172, as shown in FIG. 27. The output of the second-cancel-control-signal control portion 130 is applied to the second-cancel-control-signal output portion 128, which generates the second cancel control signal for the secondary suppression of the leakage signal, in the form of a digital signal having the phase and amplitude determined by the second-cancel-control-signal control portion 130.

Like the first-composite-sine-wave-signal generating circuit 180, the second-composite-sine-wave-signal generating circuit 190 is provided to combine together the received first and second sine-wave signals to synthesize the composite sine-wave signal (second cancel signal for the secondary suppression or cancellation f the leakage signal), on the basis of the second cancel control signal received from the second-cancel-control-signal output portion 128, more precisely, polarity control signals Vswc2 and Vsws2 received from the second-cancel-control-signal output portion 130, and amplitude control signals Vatc2 and Vats2 received from the second-cancel-control-signal D/A converting portions 163, 164, while the amplitudes of the first and second sine-wave signals are controlled.

The second cancel signal generated by the second-composite-sine-wave-signal generating circuit 190 and the first composite signal the frequency of which has been reduced by the first down-converter 162 are combined together by the second signal combining portion 166 to obtain the second composite signal from which the leakage signal has been totally or partially suppressed.

The second composite signal generated by the second signal combining portion 166 is converted into the digital signal by the second-composite-signal A/D converting portion 172, and demodulated by the modulating portion 132, whereby the reply signal (reflected wave signal $F_r$) received from the RFID-circuit element $T_0$ is read. The second composite signal demodulated by the demodulating portion 132 is applied to the direct-current-component detecting portion 134, so that the direct current component of the demodulated signal is detected by the direct-current-component detecting portion 134. An output of the detecting portion 134 is received by the second-cancel-control-signal control portion 130. The phase and amplitude of the second cancel control signal are controlled by the second-cancel-control-signal control portion 130, on the basis of the amplitude of the direct current component which is detected by the direct-current-component detecting portion 134 and which indicates the leakage signal, and the output of the first-composite-signal-amplitude detecting portion 138, such that the amplitude of the second cancel signal generated by the second-composite-sine-wave-signal generating circuit 190 is equal to the amplitude of the first composite signal converted by the first down-converter 162 and received by the second signal combining portion 166, and such that the phases of those second cancel signal and first composite signal are reversed with respect to each other. Namely, the amplitude of the second cancel signal is determined by the output of the first-composite-signal-amplitude detecting portion 138, and the phase of the second cancel signal is determined so as to minimize the amplitude of the direct current component detected by the direct-current-component detecting portion 134.

In the RFID-tag communication system S of FIG. 27 the basic operation of which has been described above, the leakage signal that is a part of the transmission signal which is transmitted from the interrogator 1 toward the RFID-circuit element $T_0$ and returned to the interrogator 1 can be totally or partially suppressed from the received signal received through the antenna 2. Thus, the communication system S is capable of radio communication between the interrogator 1 and the RFID-circuit element $T_0$, with a high degree of sensitivity.

In the RFID-tag communication system S of the present fifth embodiment constructed and operating as described above, the first-composite-sine-wave-signal generating circuit 180 and the second-composite-sine-wave-signal generating circuit 190 are provided to combine together a cosine-wave signal (first sine-wave signal) and a sine-wave signal (second sine-wave signal) which have respective different amplitudes and respective phases having a phase difference of 90°, to synthesize composite sine-wave signals. Thus, the present RFID-tag communication system S has a simple arrangement for changing the phases of the composite sine-wave signals as desired.

Figure 28:
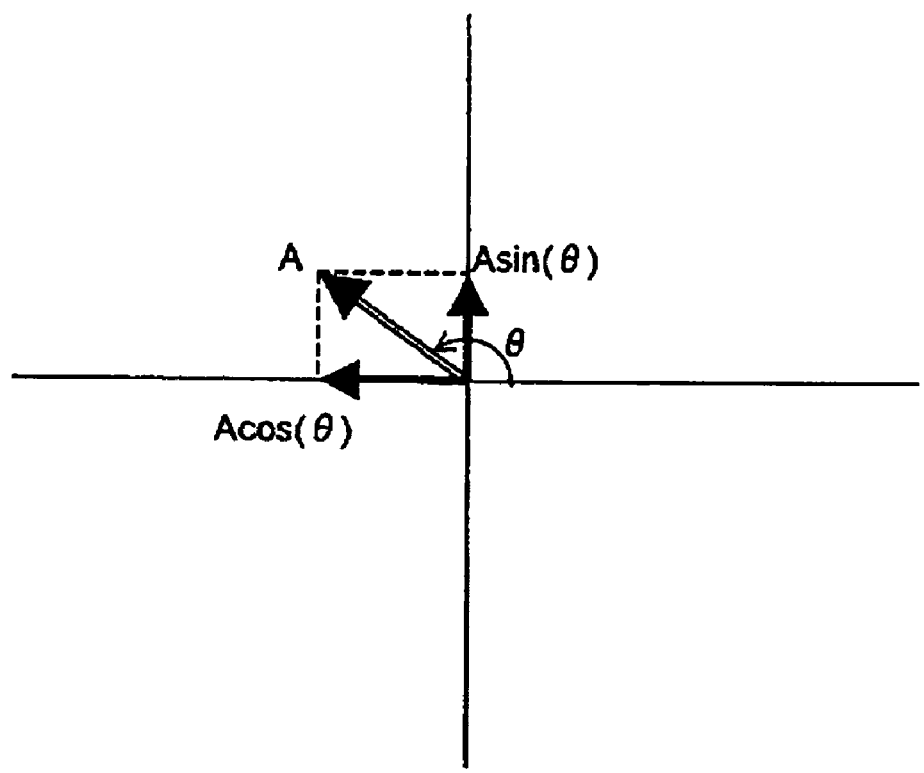
FIG. 28 is a vectorial view for explaining the principle of the present invention.
Figure 29:
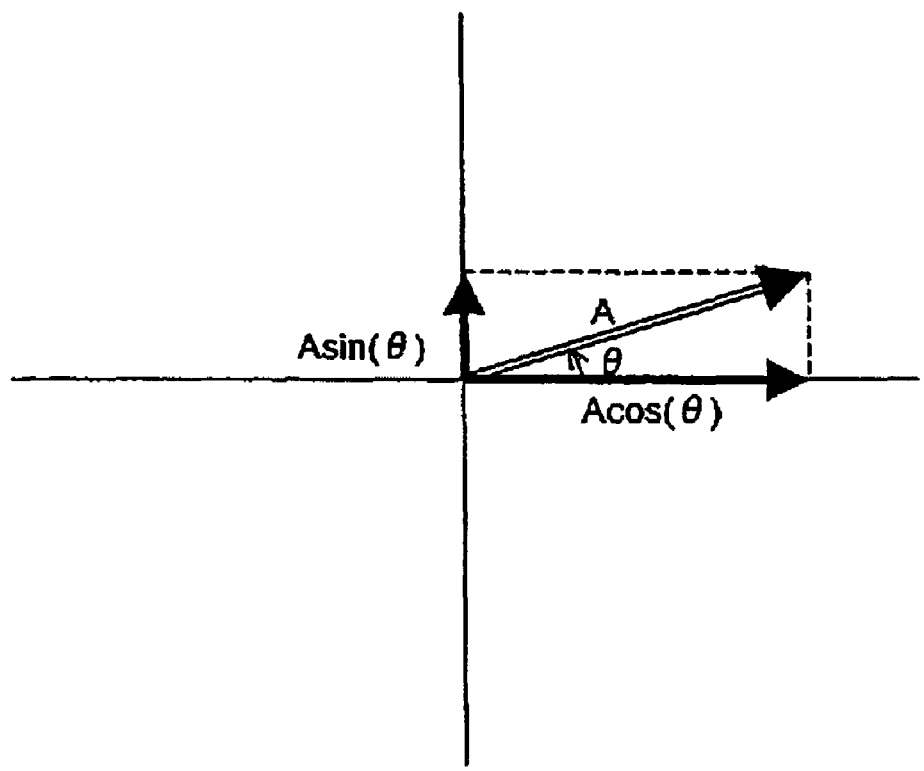
FIG. 29 is a vectorial view for explaining the principle of the invention.
Figure 30:
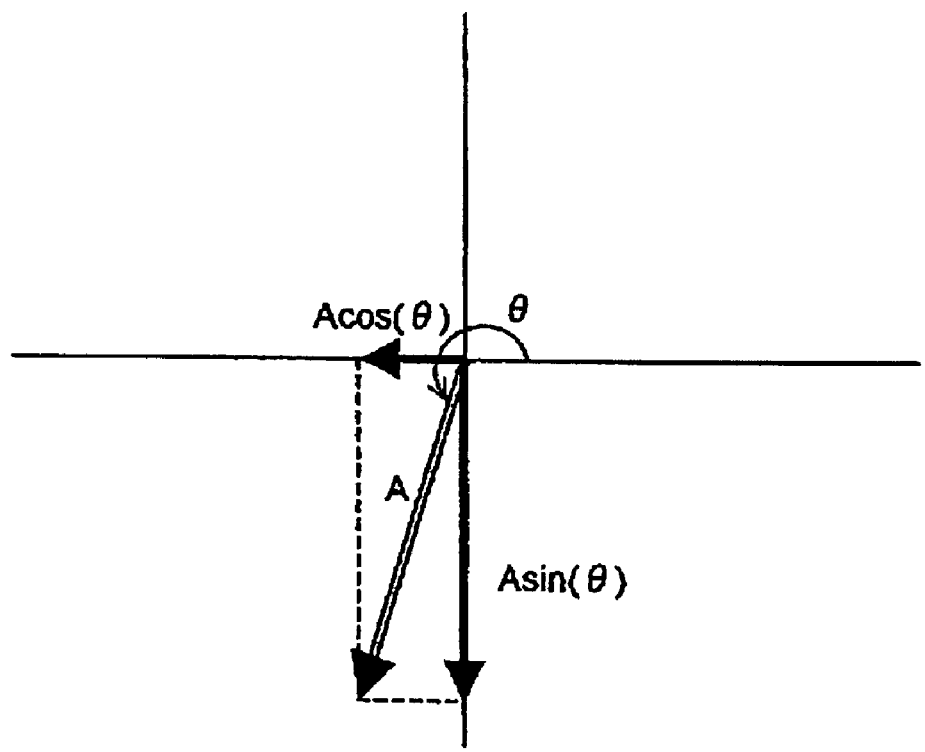
FIG. 30 is a vectorial view for explaining the principle of the invention.
Figure 31:
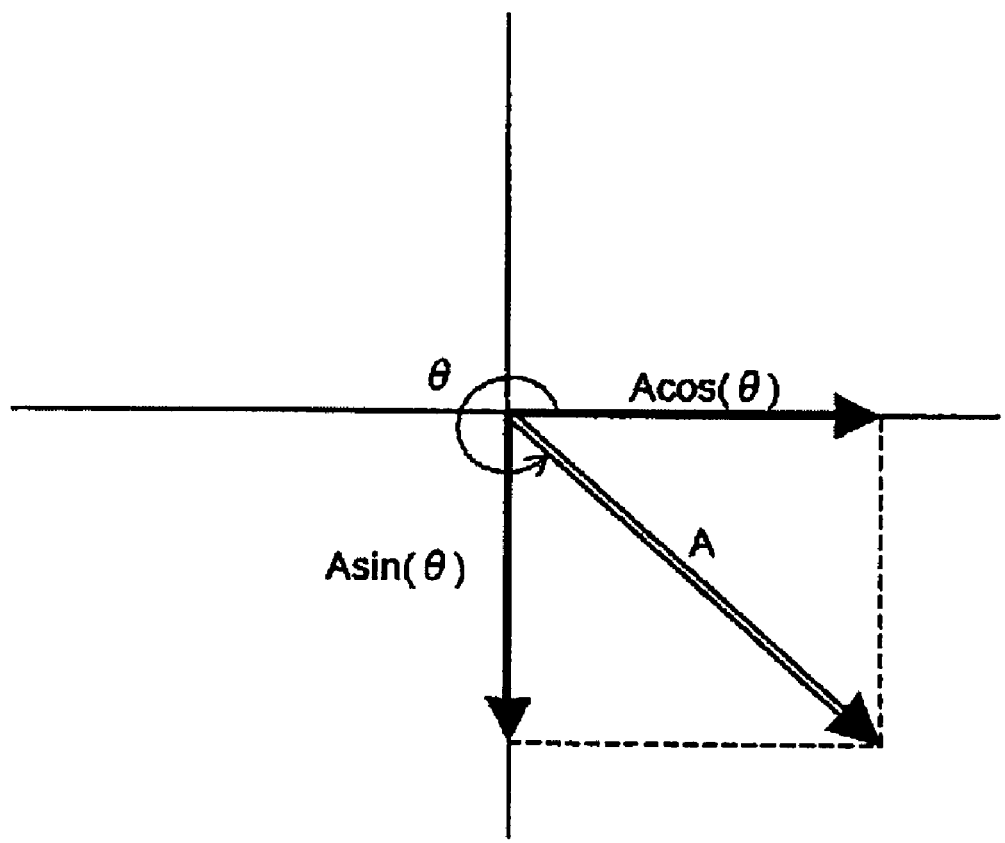
FIG. 31 is a vectorial view for explaining the principle of the invention.
Figure 32:
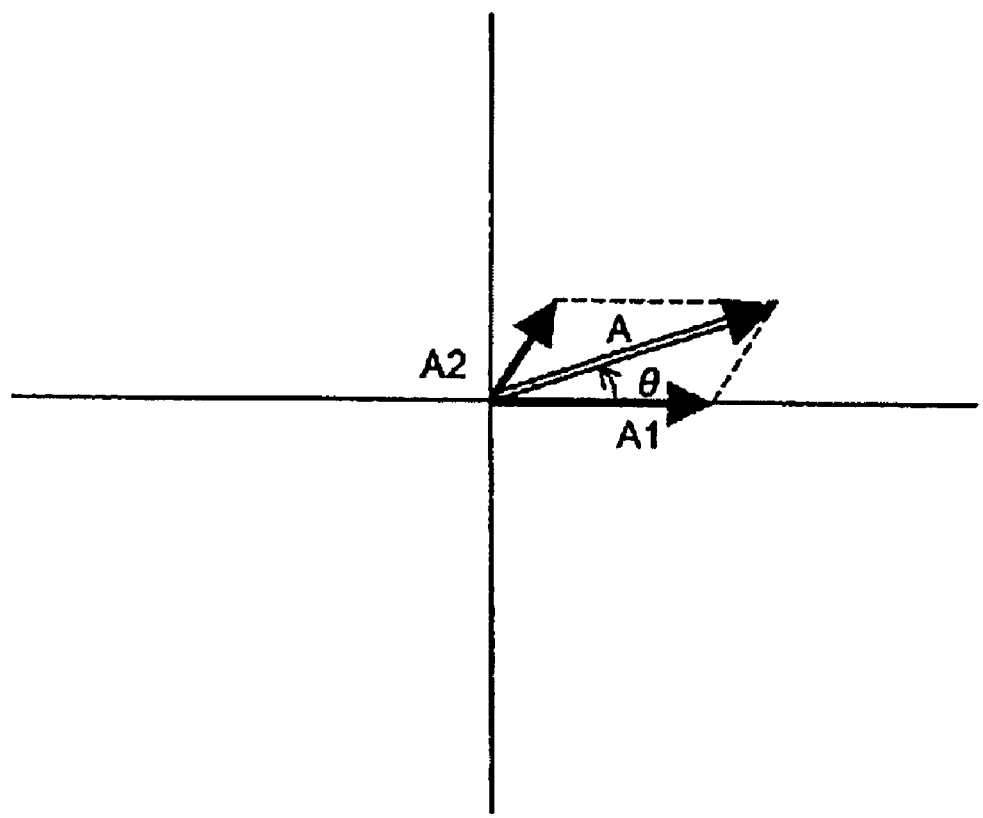
FIG. 32 is a vectorial view for explaining the principle of the invention.

FIGS. 28-32 are vectorial views for explaining the principle of the fifth embodiment of this invention. The vectorial view of FIG. 28 shows a composite sine-wave signal having a phase θ and an amplitude A. This composite sine-wave signal is synthesized by combining together a first sine-wave signal (cosine-wave signal) having an amplitude A cos θ, and a second sine-wave signal which has a phase different 90° from the phase of the first sine-wave signal and which has an amplitude A sin θ, namely, by adding vectors of the first and second sine-wave signals. By controlling the amplitudes of the first and second sine-wave signals, a composite sine-wave signal having the desired phase and amplitude can be synthesized, as shown in FIGS. 29-31. In the cases of FIGS. 29-31, the two sine-wave signals having a phase difference of 90° are used to synthesize the composite sine-wave signal by utilizing the same function table, as described below. However, the two sine-wave signals to be used need not have a phase difference of 90°, and may have any other desired phase difference. For example, two sine-wave signals A1 and A2 having a phase difference smaller than 90°, as indicated in FIG. 32, may be combined to synthesize a composite sine-wave signal having the desired phase and amplitude.

The function table 140 shown in FIG. 27 stores a function table in the form of a sine-wave table indicating sampling values corresponding to respective different phases at predetermined sampling points. In the present fifth embodiment, the digital-transmission-signal output portion 120 and the 90° phase shifting portion 141 are arranged to generate the above-described first and second sine-wave signals, respectively, on the basis of the function table stored in the function table 140. FIGS. 33-36 show examples of the sine-wave table (IF table) stored in the function table 140.

In the examples of the sine-wave table shown in FIGS. 33-36, the oscillation frequency is made equal to ¼ of the sampling frequency, for simplifying the control to generate the sine-wave signals.

Figure 33:
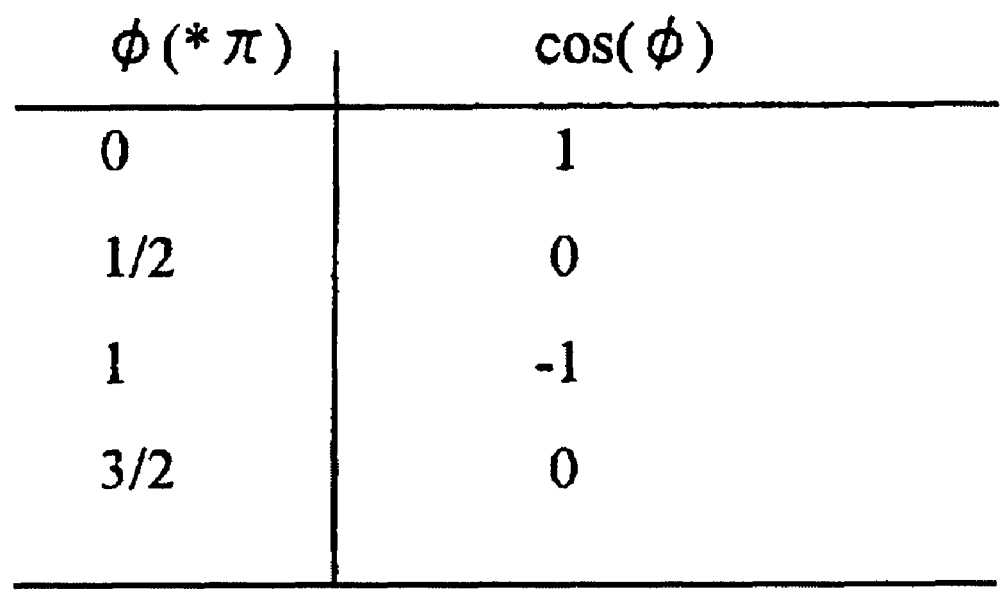
FIG. 33 is a view illustrating an example of a sine-wave table stored in the function table.

In the example of FIG. 33, different values cos φ are stored in relation to respective different initial phase values φ. Namely, the sine-wave table indicates successive discrete values "1", "0", "−1" and "0" in relation to respective different initial phase values φ=0π, π/2, 1π, and 3π/2. These successive discrete values are read out from the digital-transmission-signal output portion 120 and applied to the first transmission-signal D/A converting portion 142, so that the first sine-wave signal (cosine-wave signal) is generated by the first transmission-signal D/A converting portion 142. The 90° phase shifting portion 141 which has received the output of the first transmission-signal output portion 120 delays the moment of application of this output to the second transmission-signal output portion 143, by a time corresponding to one sampling value, with respect to the moment of application to the first transmission-signal output portion 142, so that the second transmission-signal D/A converting portion 143 generates the second sine-wave signal the phase of which is different by 90° from that of the first sine-wave signal. Alternatively, the 90° phase shifting portion 141 shifts by one position the positions of the sine-wave table from which the successive discrete values are read out in relation to the initial phase values, and applies the thus read-out successive discrete values to the second transmission-signal D/A converting portion 143 for generating the second sine-wave signal. For instance, the successive values "0", "1", "0" and "−1" are read out in relation to the respective different initial phase values φ=0π, π/2, 1π, and 3π/2.

Figure 34:
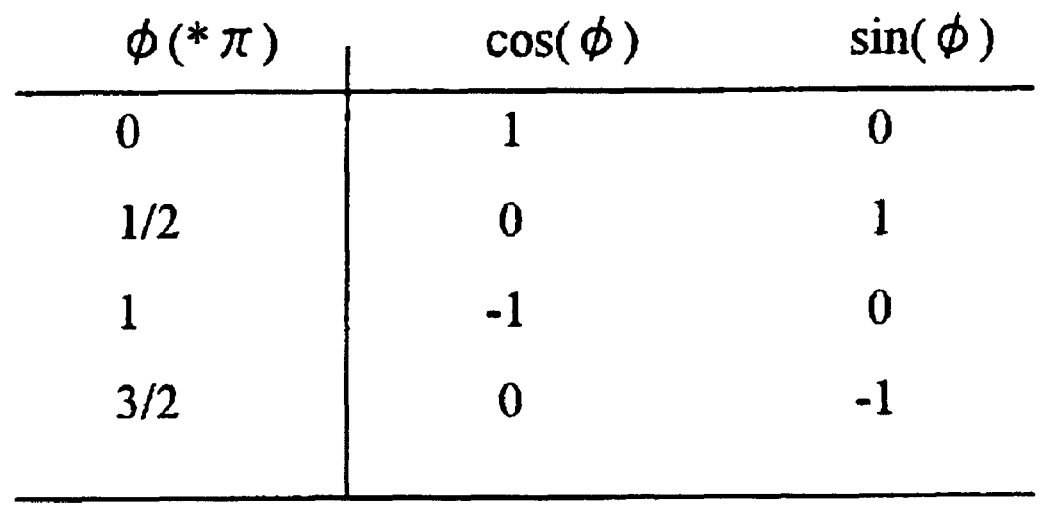

In the case of FIG. 34, a set of values cos φ for the first sine-wave signal and a set of values sin φ for the second sine-wave signal are stored in the function table 140. The first transmission-signal output portion 120 reads out successive discrete values "1", "0", "−1" and "0" in relation to the respective initial phase values φ=0π, π/2, 1π, and 3π/2, so that the first transmission-signal D/A converting portion 142 generates the first sine-wave signal, while the 90° phase shifting portion 141 reads out successive discrete values "0", "1", "0", and "−1" in relation to the respective initial phase values φ=0π, π/2, 1π, and 3π/2, so that the second transmission-signal D/A converting portion 143 generates the second sine-wave signal.

The sine-wave tables of FIGS. 33 and 34 may be replaced by respective sine-wave tables of FIGS. 35 and 36. The sine-wave table of FIG. 35 stores successive discrete values cos φ (e.g., "0.7071", "−0.7071", "−0.7071" and "0.7071") in relation to respective different initial phases φ=π/4, 3π/4, 5π/4, and 7π/4, while the sine-wave table of FIG. 36 stores successive discrete values cos φ (e.g., "0.7071", "−0.7071", "−0.7071" and "0.7071") and successive discrete values sin φ (e.g., "0.7071", "0.7071", "−0.7071" and "−0.7071"), in relation to the respective different initial phases φ=π/4, 3π/4, 5π/4, and 7π/4.

The first and second sine-wave signals having the phase difference of 90 are generated by the first transmission-signal D/A converting portion 142 and the second transmission-signal D/A converting portion 143, on the basis of the read-out successive discrete values shown in FIGS. 33-36 by way of example, and the generated first and second sine-wave signals are applied to the first-composite-sine-wave-signal generating circuit 180 and the second-composite-sine-wave-signal generating circuit 190, respectively.

As described above, the phase of the sine-wave signal to be generated can be changed by changing the positions of the sine-wave table in the function table 140 from which the successive discrete values are read out, and the amplitude of the sine-wave signal can be changed by multiplying the read-out sine-wave signal by a control value.

Figure 37:
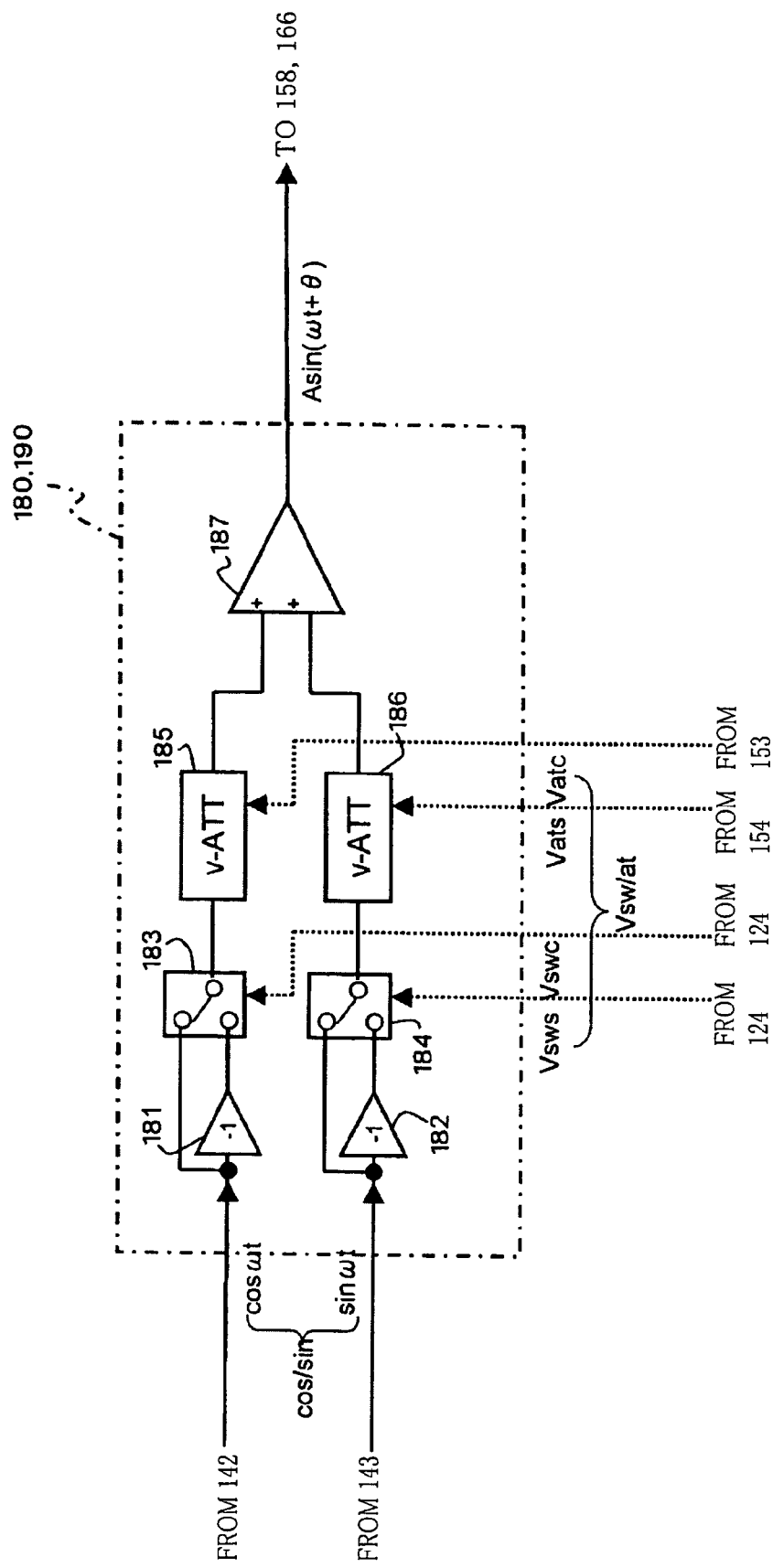
FIG. 37 is a circuit diagram showing in detail a first-composite sine-wave signal generating circuit.

Referring to FIG. 37, there is shown in detail an arrangement of the first-composite-sine-wave-signal generating circuit 180, which includes an amplifier 181, an amplifier 182, a switch 183, a switch 184, a variable attenuator 185, a variable attenuator 186, and an adder 187. The variable attenuator 185 operates according to the amplitude control signal Vatc1 (control voltage) generated by the first-cancel-control-signal D/A converting portion 153, as an amplitude control portion operable to control the amplitude of the first sine-wave signal (cos ωt) generated by the first transmission-signal D/A converting portion 142. The amplifier 181 has a gain of −1 for reversing the polarity of the first sine-wave signal. The switch 183 operates according to the polarity control signal Vswc1 generated by the first-cancel-control signal output portion 124, to switch or control the polarity of the first sine-wave signal. The variable attenuator 186 operates according to the amplitude control signal Vats1 (control voltage) generated by the first-cancel-control-signal D/A converting portion 154, as an amplitude control portion operable to control the amplitude of the second sine-wave signal (sin ωt) generated by the second transmission-signal D/A converting portion 143. The amplifier 182 has a gain of −1 for reversing the polarity of the second sine-wave signal. The switch 184 operates according to the polarity control signal Vsws1 generated by the second-cancel-control signal output portion 124, to switch or control the polarity of the second sine-wave signal. The adder 187 functions as a sine-wave synthesizing portion operable to combine together the outputs of the variable attenuators 185, 186, to synthesize the composite sine-wave signal.

In the first-composite-sine-wave-signal generating circuit 180 arranged as described above, the amplitudes of the first and second sine-wave signals are controlled by the respective variable attenuators 185, 186 according to the respective amplitude control signals (control voltages) Vatc1 and Vats1, and the polarities of the first and second sine-wave signals are controlled according to the respective polarity control signals Vswc1 and Vsws1, by the amplifiers 181, 182 and switches 183, 184 which cooperate to function as a polarity switching portion operable to change the polarities of the first and second sine-wave signals. Accordingly, the amplitudes and the polarities of the first sine-wave signal sin ωt and the second sine-wave signal cos ωt that are to be combined together by the adder 187 to synthesize the composite sine-wave signal having the desired phase can be selected as desired with a high degree of freedom. The thus synthesized composite sine-wave signal is applied to the second up-converter 156.

The second-composite-sine-wave-signal generating circuit 190 has the same arrangement as the first-composite-sine-wave-signal generating circuit 180 described above. In the second-composite-sine-wave-signal generating circuit 190, the amplitudes of the first and second sine-wave signals are controlled by the respective variable attenuators 185, 186 according to the respective amplitude control signals (control voltages) Vatc2 and Vats2, and the polarities of the first and second sine-wave signals are controlled according to the respective polarity control signals Vswc2 and Vsws2, by the amplifiers 181, 182 and switches 183, 184 which cooperate to function as a polarity switching portion. Accordingly, the amplitudes and the polarities of the first sine-wave signal sin ωt and the second sine-wave signal cos ωt that are to be combined together by the adder 187 to synthesize the composite sine-wave signal having the desired phase can be selected as desired with a high degree of freedom. The thus synthesized composite sine-wave signal is applied to the second signal combining portion 166. The first-composite-sine-wave-signal generating circuit 180 and the second-composite-sine-wave-signal generating circuit 180 are limited to the arrangement described above, but may be otherwise arranged.

Figure 38:
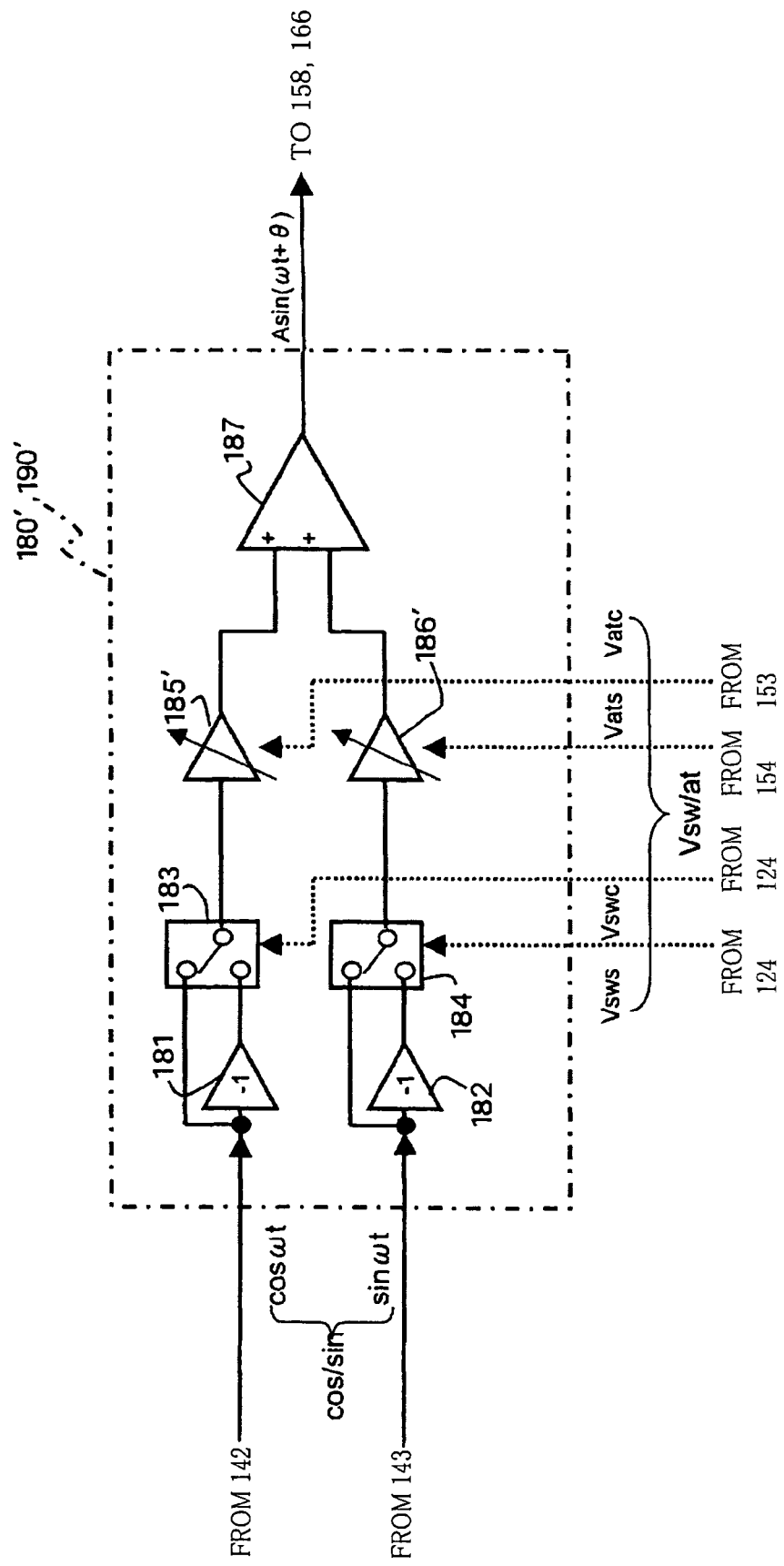
FIG. 38 is a circuit diagram showing a modified form of the composite sine-wave signal generating circuit.

Referring to the circuit diagram of FIG. 38, there is shown a modified first-composite-sine-wave-signal generating circuit 180' provided in place of the first-composite-sine-wave signal generating circuit 180 shown in FIG. 37. In this composite-sine-wave-signal generating circuit 180', variable-gain amplifiers 185', 186' are provided as amplitude control portions, in place of the variable attenuators 185, 186 of FIG. 37. Like the variable attenuator 185, the variable-gain amplifier 185' operates according to the amplitude control signal (control voltage) Vatc1 generated by the first-cancel-control-signal D/A converting portion 153, to control the amplitude of the first sine-wave signal (cos ωt) generated by the first transmission-signal D/A converting portion 142. Like the variable attenuator 186, the variable-gain amplifier 186' operates according to the polarity amplitude control signal (control voltage) Vats1 generated by the second-cancel-control-signal D/A converting portion 154, to control the amplitude of the second sine-wave signal (sin ωt) generated by the second transmission-signal D/A converting portion 143. In the other aspects, the arrangement and operation of the first-composite-sine-wave-signal generating circuit 180' are identical with those of the first-composite-sine-wave-signal generating circuit 180. The second-composite-sine-wave-signal generating circuit 190 of FIG. 37 may be replaced by a modified second-composite-sine-wave-signal generating circuit 190' having the same arrangement as the modified first-composite-sine-wave-signal generating circuit 180'.

Figure 39:
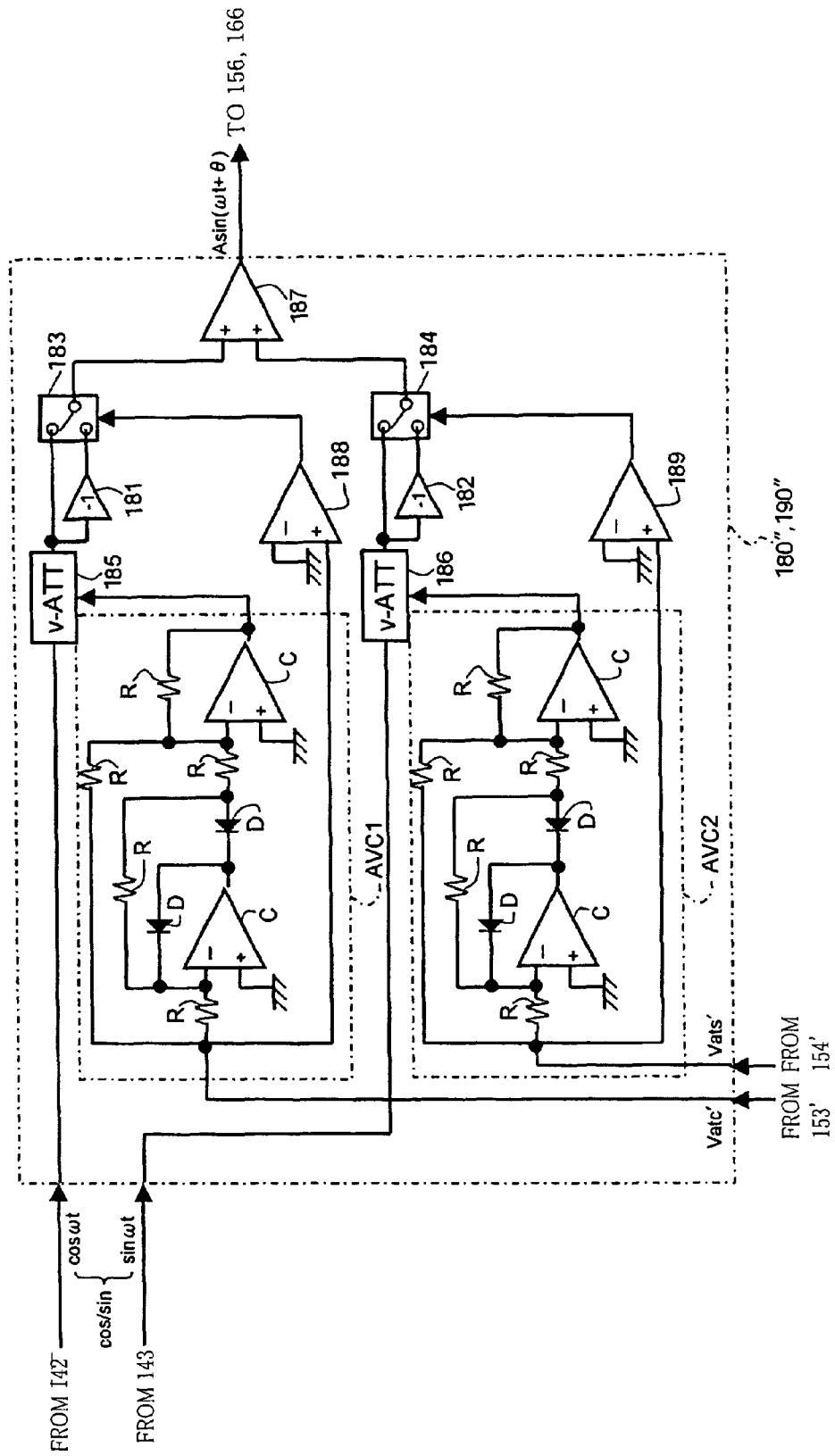
FIG. 39 is a circuit diagram showing another modified form of the composite sine-wave signal generating circuit.

Referring to next to the circuit diagram of FIG. 39, there is shown another modified first-composite-sine-wave-signal generating circuit 180" provided in place of the first-composite-sine-wave signal generating circuit 180 of FIG. 37. In FIG. 39, the same reference signs as used in FIGS. 37 and 38 are used to identify the same elements. The description of these elements is simplified or omitted.

The modified first-composite-sine-wave generating circuit 180" includes an absolute-value circuit AVC1 for the first sine-wave signal, and an absolute-value circuit AVC2 for the second sine-wave signal. Each of the absolute-value circuits AVC1, AVC2 includes two converters C, two diodes D and five resistors R, as known in the art.

The absolute-value circuit AVC1 is arranged to receive a control voltage signal Vatc' (having a polarity as well as an amplitude) corresponding to the amplitude control signals Vatc (Vatc1 and Vatc2) described above, and applies an absolute value |Vatc'| of the received control voltage signal Vatc' to the-variable attenuator 185. The generating circuit 180" includes a comparator 188 having two inputs one of which is grounded. The control voltage signal Vatc' is applied to the other input of the comparator 188, which applies to the switch 183 a polarity control signal indicative of the polarity (plus or minus) of the control voltage signal Vatc', so that the switch 183 cooperates with the amplifier 181 to control polarity of the first sine-wave signal.

The absolute-value circuit AVC2 is arranged to receive a control voltage signal Vats' (having a polarity as well as an amplitude) corresponding to the amplitude control signals Vats (Vats1 and Vats2) described above, and applies an absolute value |Vats'| of the received control voltage signal Vats' to the variable attenuator 186. The generating circuit 180" includes a comparator 189 having two inputs one of which is grounded. The control voltage signal Vats' is applied to the other input of the comparator 189, which applies to the switch 184 a polarity control signal indicative of the polarity (plus or minus) of the control voltage signal Vats', so that the switch 184 cooperates with the amplifier 182 to control the polarity of the second sine-wave signal.

The modified first-composite-sine-wave-signal generating circuit 180" does not require the polarity control signals Vswc1, Vsws1 generated by the first-cancel-control-signal output portion 124, and the absolute-value circuits AVC1, AVC2 receive from the D/A converting portions 153, 154 the above-described control voltage signals Vatc1', Vats1' (having also the polarity), the absolute values |Vatc1'| and |Vats1'| of which are applied to the variable attenuators 185, 186, to control the amplitudes of the first and second sine-wave signals. The polarity reversing portion in the form of the amplifiers 181, 182 and switches 183, 184 controls the polarity of the first and second sine-wave signals, according to the polarity control signals received from the comparators 188, 189. This arrangement permits a high degree of freedom to select the amplitudes and polarities of the first and second sine-wave signals (sin ωt and cos ωt) that are to be combined together by the adder 187 to synthesize the composite sine-wave signal having the desired phase, which is to be applied to the second up-converter 156.

The second-composite-sine-wave-signal generating circuit 190 of FIG. 37 may be replaced by a modified second-composite-sine-wave-signal generating circuit 190" having the same arrangement as the modified first-composite-sine-wave-signal generating circuit 180". The modified second-composite-sine-wave-signal generating circuit 190" does not require the polarity control signals Vswc2, Vswc2 generated by the second-cancel-control-signal output portion 128, and the absolute-value circuits AVC1, AVC2 receive from the D/A converting portions 163, 164 the above-described control voltage signals Vatc2', Vats2' (having also the polarity), the absolute values |Vatc2'| and, |Vats2'| of which are applied to the variable attenuators 185, 186, to control the amplitudes of the first and second sine-wave signals. The polarity reversing portion in the form of the amplifiers 181, 182 and switches 183, 184 controls the polarity of the first and second sine-wave signals, according to the polarity control signals received from the comparators 188, 189. This arrangement permits a high degree of freedom to select the amplitudes and polarities of the first and second sine-wave signals (sin ωt and cos ωt) that are to be combined together to synthesize the composite sine-wave signal having the desired phase, which is to be applied to the second signal combining portion 166.

The modified composite-sine-wave-signal generating circuits 180", 190" can be simplified with a reduced number of signal lines, since the generating circuits 180", 190" do not require the amplitude control signals Vswc1, Vsws1 generated by the first-cancel-control-signal output portion 125 or the polarity control signals Vswc2, Vsws2 generated by the second-cancel-control-signal output portion 128, as described above.

It will be understood from the foregoing description that the first transmission-signal D/A converting portion 142 and the second transmission-signal D/A converting portion 143 cooperate to constitute a sine-wave generating portion, and also a carrier-wave output portion operable to generate the first sine-wave signal as a carrier wave to gain an access to a desired object, while the antenna 2 constitutes a transmitting portion operable to transmit the carrier wave generated by the carrier-wave output portion, to the desired object, and also a receiving portion operable to receive a reply signal transmitted from the desired object in response to the carrier wave. It will also be understood that the first signal combining portion 158 constitutes a signal combining portion operable to combine together the reply signal received by the receiving portion and the cancel signal generated by a sine-wave synthesizing portion, to obtain a first composite signal, while the second-composite-signal A/D converting portion 172 constitutes an analog-to-digital converter operable to convert the first composite signal into a digital signal.

It will also be understood that the first transmission-signal D/A converting portion 142 constitutes a first digital-to-analog converter operable to convert a set of sine-wave sampling values into a first sine-wave signal, while the second transmission-signal D/A converting portion 143 constitutes a second digital-to-analog converter operable to convert a set of sine-wave sampling values into a second sine-wave signal. It will further be understood that the second up-converter 156 constitutes an up-converting portion operable to increase the frequency of the composite sine-wave signal generated by the sine-wave synthesizing portion, while the first down-converter 162 constitutes a down-converting portion operable to reduce the frequency of the first composite signal generated by the signal combining portion.

In the RFID-tag communication system S according to the fifth embodiment of this invention described above, the first and second sine-wave signals which are generated by the first and first and second transmission-signal D/A converting portions 142, 143 and which have a phase difference of 90° are combined together by the composite-sine-wave-signal generating circuits 180, 190 to synthesize the composite sine-wave signals after the amplitudes of the first and second sine-wave signals are controlled. The present RFID-tag communication system S is capable of generating the desired sine-wave signals, by combining together the sine-wave and cosine-wave signals having the respective different amplitudes. Thus, the present RFID-tag communication system S has a simple arrangement for changing the phases of the composite sine-wave signals as desired. Further, unlike an ordinary phase shifter, the present arrangement does not suffer from a limited range of change of the phase of the composite sine-wave signals.

Further, the clock signal applied to the first transmission-signal D/A converting portion 142 and the clock signal applied to the second-composite-signal A/D converting portion 172 are both generated by the same clock-signal output portion 178. Namely, the same clock signal is applied to the D/A converting portion 142 and the A/D converting portion 172. Accordingly, the first transmission-signal D/A converting portion 142 arranged to convert a set of sine-wave sampling values into the first sine-wave signal, and the second-composite-signal A/D converting portion 172 arranged to convert the second composite signal (subjected to the primary and secondary suppressions of the leakage signal) into a digital signal can be operated in synchronization with each other. This arrangement assures a high degree of demodulation of the received signal, without a deviation of the frequency of the received signal from the frequency of the transmission signal.

In addition, the provision of the second up-converter 156 to increase the frequency of the composite sine-wave signal permits the composite-sine-wave-signal generating circuit 180, 190 to synthesize the sine-wave signals having a comparatively low frequency, whereby the cost of manufacture of the communication system S can be lowered. Further, the provision of the first down-converter 162 to reduce the frequency of the first composite signal generated by the first signal combining portion 158 permits the second-composite-signal A/D converting portion 172 to convert the first composite signal into the digital signal after the frequency of the first composite signal has been reduced. In this respect, too, the cost of manufacture of the communication system S can be lowered.

Embodiment 6

Figure 40:
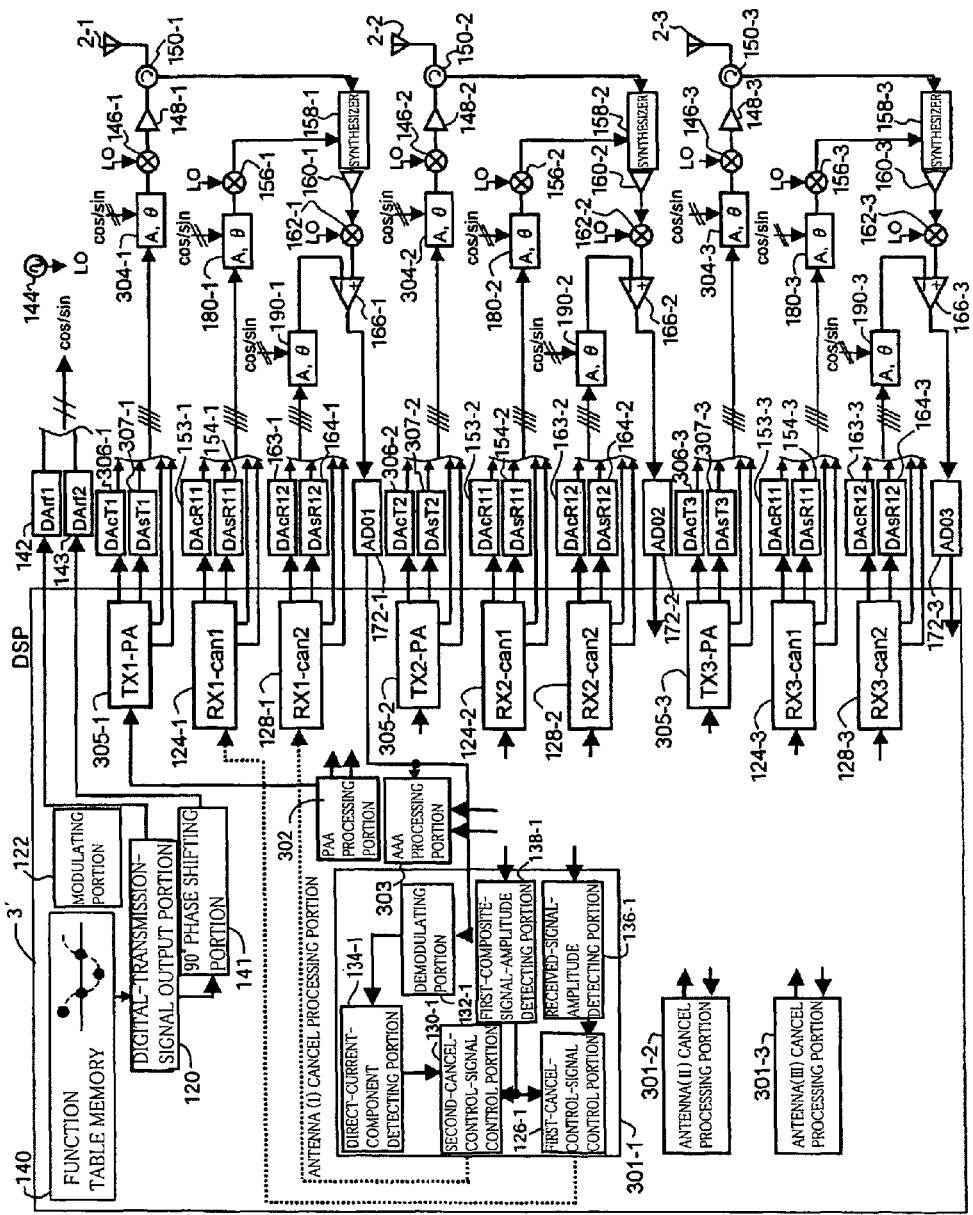
FIG. 40 is a function block diagram showing a function arrangement of an interrogator in an RFID-tag communication device provided with an array antenna according to a sixth embodiment of the present invention.

Referring next to the functional block diagram of FIG. 40 corresponding to that of FIG. 27, there is shown a functional arrangement of an interrogator which has an array antenna and which is constructed according to the sixth embodiment of this invention. In FIG. 40, the same reference signs as used in FIG. 27 are used to identify the same elements, which will be only briefly described or will not be described.

While the interrogator according to the preceding fifth embodiment uses one transmitter/receiver antenna 2, the interrogator according to the present sixth embodiment uses a plurality of antennas, namely, three transmitter/receiver antennas 2-1, 2-2 and 2-3. The present interrogator includes a DSP 3' incorporating three cancel processing portions 301-1, 301-2 and 301-3 which correspond to the respective three antennas 2-1, 2-2 and 2-3. Since the three cancel processing portions 301-1, 301-2 and 301-3 have the same circuit arrangement, the cancel processing portion 301-1 corresponding to the antenna 2-1 will be described, and the description of the cancel processing portion 301-1 applies to the cancel processing portions 301-2 and 301-3. The elements associated with the antennas 2-1, 2-2 and 2-3 are identified by numerals 1, 2 and 3 following the reference signs used in the fifth embodiment, and the description of these elements are simplified or omitted.

Like the interrogator according to the preceding fifth embodiment, the interrogator according to the present sixth embodiment includes the function table 140, digital-transmission-signal output portion 120, 90° phase shifting portion, modulating portion 122, first transmission-signal D/A converting portion 142, second transmission-signal D/A converting portion 143 and local-oscillation-signal output portion 144. The present interrogator further includes a phased-array (PAA) processing portion 302 and an adaptive-array (AAA) processing portion 303, which are characteristic of the present sixth embodiment. The adaptive-array processing portion 303 is arranged to control the directivity of the antennas 2-1, 2-2 and 2-3, in a known manner on the basis of the reply signals received by those three antennas 2-1, 2-2, 2-3, so as to maximize the sensitivity of reception of the reply signals from the desired objects (RFID tags T), or so as to minimize a ratio of failure of reception of the reply signals. The phased-array processing portion 302 is arranged to control the directivity of the antennas 2-1, 2-2 and 2-3 upon transmission of the transmission signal toward the desired objects (RFID tags T), such that the direction in which the antennas 2-1, 2-2, 2-3 have the highest gain and which is temporarily held is sequentially changed, as described below in detail. As well known in the art, the direction in which the antennas 2-1, 2-2 and 2-3 have the highest gain is determined by the spacing distance of the three antennas, and the phase difference of the transmission signals applied to those antennas. Therefore, it is necessary to change the phase of the transmission signal to be applied to each antenna 2, for changing the direction of the highest gain. The elements of the DSP 3' other than the cancel processing portion 301-1, which are associated with the transmitter/receiver antenna 2-1, includes a first-cancel-control-signal output portion 124-1, a second-cancel-control-signal output portion 128-1, and a phased-array-control-signal output portion 305-1 operable to generate a control signal for temporarily hold and sequentially change the direction in which the antennas 2-1, 2-2 and 2-3 have the highest gain during the transmission of the transmission signal toward the RFID tags T. The cancel processing portion 301-1 includes a first-cancel-control-signal control portion 126-1, a second-cancel-control-signal control portion 130-1, a demodulating portion 134-1, a direct-current-component detecting portion 134-1, a received-signal-amplitude detecting portion 136-1 and a first-composite-signal-amplitude detecting portion 138-1.

In the present sixth embodiment, the digital transmission signal generated by the digital-transmission-signal output portion 120 on the basis of the function table stored in the function table 140 is converted by the high-speed D/A converting portion 142 into an analog signal (first sine-wave signal), as in the preceding fifth embodiment. The transmission signal is generated by the 90° phase shifting portion 141 on the basis of the signal generated by the digital-transmission-signal output portion 120, and this transmission signal is converted by the high-speed transmission-signal D/A converting portion 143 into an analog signal (second sine-wave signal), as in the fifth embodiment. The first and second sine-wave signals generated by the transmission-signal D/A converting portions 142 and 143 are applied to the first-composite-sine-wave-signal generating circuit 180 and the second-composite-sine-wave-signal generating circuit 190, and also to a third-composite-sine-wave-signal generating circuit 304-1 (which will be described in detail).

The third-composite-sine-wave-signal generating circuit 304-1 is provided to control the amplitudes of the first and second sine-wave signals and combine together these sine-wave-signals, on the basis of a phased-array control signal generated by the phased-array processing portion 302, to synthesize a composite sine-wave signal the phase of which has been controlled with respect to the antennas 2-1, 2-2, 2-3. The frequency of the composite sine-wave signal generated by the third-composite-sine-wave-signal generating circuit 304-1 is increased by the first up-converter 146-1 by an amount corresponding to the frequency of the local oscillation signal generated by the local-oscillation-signal output portion 144, and the amplitude of the same composite sine-wave signal is increased by the first amplifying portion 148-1. Further, the composite sine-wave signal in question is modulated according to a modulating signal generated by the modulating portion 122. The transmission signal generated by the first amplifying portion 148-1 is applied to the antenna 2-1 through the transmission/reception separator 150-1, and is transmitted as an interrogating wave F, from the antenna 2-1 toward the RFID-circuit element $T_0$.

The reflected wave F transmitted from the RFID-circuit element $T_0$ and received by the antenna 2-1 is received as a received signal by the first signal combining portion 158-1. The present interrogator includes the second down-converter 174-1, received-signal A/D converting portion 176-1, received-signal-amplitude detecting portion 136 and first-composite-signal-amplitude detecting portion 138 (which are not shown), as in the fifth embodiment. The primary suppression or cancellation (offsetting) of the leakage signal is effected by the first signal combining portion 158-1. That is, the first-cancel-control-signal output portion 126-1 determines the phase and amplitude of the first cancel control signal on the basis of the amplitude detected by the received-signal-amplitude detecting portion 136-1, and the amplitude detected by the first-composite-signal-amplitude detecting portion 138-1. The determined phase and amplitude are applied to the first-cancel-control-signal output portion 124-1, which generates the first cancel control signal.

The first-composite-sine-wave-signal generating circuit 180-1 is provided to combine together the received first and second sine-wave signals to synthesize the composite sine-wave signal (first cancel signal for the primary suppression or cancellation of the leakage signal), on the basis of the first cancel control signal received from the first-cancel-control-signal output portion 124-1 (and the signals received through the low-speed first-cancel-control-signal D/A converting portions 153-1, and 154-1), while the amplitudes of the first and second sine-wave signals are controlled. The amplitude of the first cancel signal generated by the first-composite-sine-wave-signal generating circuit 180-1 is increased by the second up-converter 156-1, by an amount corresponding to the frequency of the local oscillation signal generated by the local-oscillation-signal output portion 144. The first cancel signal generated by the second up-converter 156-1 and the received signal received through the transmission/reception separator 150-1 are combined together by the first signal combining portion 158-1 to obtain the first composite signal from which the leakage signal received by the interrogator is totally or partially suppressed.

The amplitude of the first composite signal generated by the first signal combining portion 158-1 is amplified by the second amplifying portion 160-1, by a predetermined gain. Then, the frequency of the first composite signal is reduced by the first down-converter 162-1 by the amount corresponding to the frequency of the local oscillation signal generated by the local-signal output portion 144, and the first composite signal the frequency of which has been reduced is applied to the second signal combining portion 166-1 and the third amplifying portion 168-1 not shown. The amplitude of the first composite signal applied to the third amplifying portion 168-1 is amplified, and the amplified first composite signal is converted into a digital signal by the first-composite-signal A/D converting portion 170-1. The digital first composite signal is applied to the first-composite-signal-amplitude detecting portion 138-1, so that the amplitude of the signal is detected. The output of the first-composite-signal-amplitude detecting portion 138-1 is applied to the first-cancel-control-signal control portion 126-1 and the second-cancel-control-signal control portion 130-1.

The second-cancel-control-signal control portion 130-1 determines the phase and amplitude of the second cancel control signal, on the basis of the output of the first-composite-signal-amplitude detecting portion 138-1 (indicative of the amplitude of the received signal subjected to the primary suppression of the leakage signal) and the second composite signal generated by the second-composite-signal A/D converting portion 172. The second-cancel-control-signal output portion 128-1 generates the second cancel control signal for generation of the second cancel signal having the determined phase and amplitude. The second-composite-sine-wave-signal generating circuit 190-1 is arranged to control the amplitudes of the first and second sine-wave signals and combine together those sine-wave signals, to obtain the second cancel signal, on the basis of the second cancel control signal received from the second-cancel-control-signal output portion 128-1 (and the signals received through the low-speed second-cancel-control-signal D/A converting portions 163-1, and 164-1), while the amplitudes of the first and second sine-wave signals are controlled.

The second cancel signal generated by the second-composite-sine-wave-signal generating circuit 190-1 and the first composite signal the frequency of which has been reduced by the first down-converter 162-1 are combined together by the second signal combining portion 166-1 to obtain the second composite signal from which the leakage signal has been totally or partially suppressed.

The second composite signal generated by the second signal combining portion 166-1 is converted into the digital signal by the second-composite-signal A/D converting portion 172-1, and the digital second composite signal is applied to the modulating portion 132-1 and the adaptive-array processing portion 303, so that the second composite signal from which the leakage signal has been totally or partially suppressed is subjected to an adaptive processing operation by the adaptive-array processing portion 303, to read the reply signal which is received from the RFID-circuit element $T_0$ with the maximum sensitivity and which has a high signal-to-noise ratio (a low ratio of reception failure). The second composite signal demodulated by the demodulating portion 132-1 is applied to the direct-current-component detecting portion 134-1, so that the direct current component of the demodulated signal is detected by the direct-current-component detecting portion 134-1. An output of the detecting portion 134-1 is received by the second-cancel-control-signal control portion 130-1. Since the reply signal received from the RFID-circuit element $T_0$ is read by the adaptive-array processing portion 303, the demodulating portion 132-1 operates to demodulate the second composite signal, only for the purpose of permitting the direct-current-component detecting portion 134-1 to detect the direct current component to be applied to the second-cancel-control-signal control portion 130-1.

Figure 41:
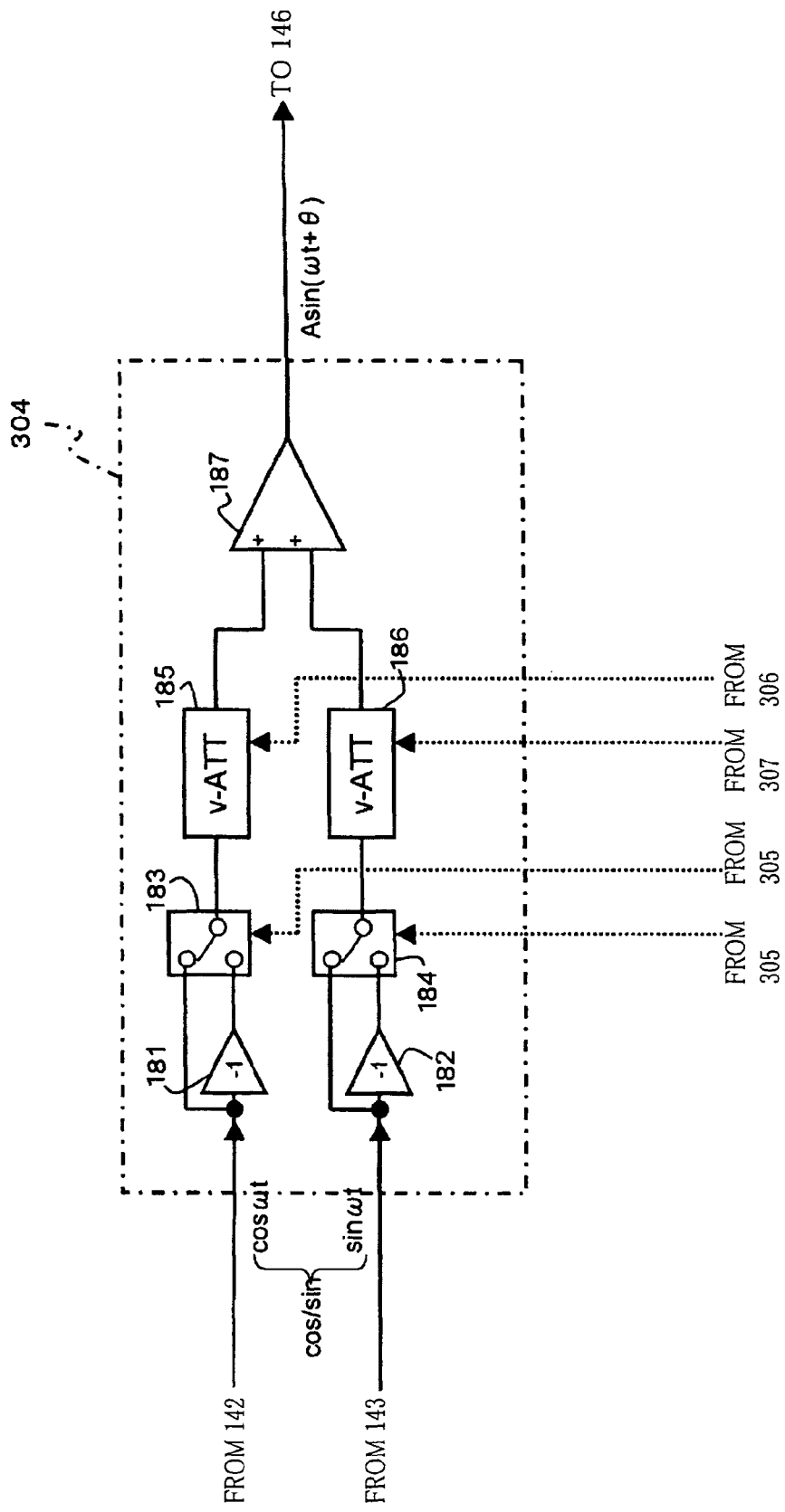
FIG. 41 is a circuit diagram showing in detail a third-composite sine-wave signal generating circuit.

Referring to FIG. 41, there is shown in detail an arrangement of the third-composite-sine-wave-signal generating circuit 304, which is similar in arrangement to the first-composite-sine-wave-signal generating circuit 180 and the second-composite-sine-wave-signal generating circuit 190. The third-composite-sine-wave-signal generating circuit 304 includes the above-described amplifiers 181, 182, switches 183, 184, variable attenuators 185, 186, and adder 187. The variable attenuator 185 operates according to the amplitude control signal (control voltage) which is generated by a low-speed D/A converting portion 306-1 arranged to convert the digital signal received from the phased-array-control-signal output portion 305-1 into an analog signal. The variable attenuator 185 controls the amplitude of the first sine-wave signal ($\cos \omega t$) generated by the high-speed first transmission-signal D/A converting portion 142. The amplifier 181 is arranged to reverse the polarity of the first sine-wave signal. The switch 183 operates according to the polarity control signal generated by the phased-array-control-signal output portion 305-1, to switch or control the polarity of the first sine-wave signal. The variable attenuator 186 operates according to the amplitude control signal (control voltage) generated by a low-speed D/A converting portion 307-1 arranged to convert the digital signal received from the phased-array-control-signal output portion 305-1. The variable attenuator 186 controls the amplitude of the second sine-wave signal (sin ωt) generated by the high-speed second transmission-signal D/A converting portion 143. The amplifier 182 is arranged to reverse the polarity of the second sine-wave signal. The switch 184 operates according to the polarity control signal generated by the phased-array-control-signal output portion 305-1, to switch or control the polarity of the second sine-wave signal. The adder 187 operates to combine together the outputs of the variable attenuators 185, 186, to synthesize the composite sine-wave signal.

In the third-composite-sine-wave-signal generating circuit 304 arranged as described above, the amplitudes of the first and second sine-wave signals are controlled by the respective variable attenuators 185, 186 according to the respective amplitude control signals (control voltages) received from the D/A converting portions 306-1 and 307-1, and the polarities of the first and second sine-wave signals are controlled according to the respective polarity control signals received from the phased-array-control-signal output portion 305-1, by the amplifiers 181, 182 and switches 183, 184. Accordingly, the amplitudes and the polarities of the first sine-wave signal sin ωt and the second sine-wave signal cos ωt that are to be combined together by the adder 187 to synthesize the composite sine-wave signal having the desired phase can be selected as desired with a high degree of freedom. The thus synthesized composite sine-wave signal is applied to the first up-converter 146-1. The arrangement and operation of the elements associated with the other antennas 2-2 and 2-3 are the same as those of the elements associated with the antenna 2-1 which have been described.

In the present sixth embodiment, the leakage signal is totally or partially suppressed from the received signals received through the antennas 2-1, 2-2 and 2-3, so that the ratio communication with the RFID tags can be effected with a high degree of sensitivity, as in the preceding fifth embodiment.

The sixth embodiment has the following further advantages. That is, an interrogator using a digital oscillator and an array antenna device including a plurality of antennas as in the interrogator of the present sixth embodiment generally requires a high-speed D/A converter for each of the antennas, namely, a plurality of D/A converters, and is accordingly expensive. In the present sixth embodiment, however, the first transmission-signal D/A converting portion 142 and the second transmission-signal D/A converting portion 143 are provided commonly for the three antennas 2-1, 2-2 and 2-3, that is, a common oscillator sine-wave generating portion is provided to generate the first and second sine-wave signals which are amplified and combined together by the three first-composite-sine-wave-signal generating circuits 180-1, 180-2 and 180-3, three second-composite-sine-wave-signal generating circuits 190-1, 190-2 and 190-3, and three third composite-sine-wave-signal generating circuits 304-1, 304-2 and 304-3, which are provided for the respective three antennas 2-1, 2-2 and 2-3. Accordingly, the interrogator using the three antennas 2-1, 2-2, 2-4 according to the present sixth embodiment can be made simple in the circuit arrangement and is available at an accordingly low cost.

Described in detail, generation of sine-wave signals of 10.7 MHz, for example, requires expensive high-speed D/A converters which are operated at 42.8 MHz, for example. Where the first and second cancel signals in addition to the transmission signal are generated using a function table, three sets of high-speed D/A converters are required for each of a plurality of antennas of the array antenna device, so that the interrogator requires a considerably large number of high-speed D/A converters, and is complicated in the circuit arrangement and accordingly expensive. In the interrogator 1 of the present sixth embodiment, however, only the first and second transmission-signal D/A converting portions 142, 143 are provided by respective expensive D/A converters capable of high-speed processing operations to generate the first and second sine-wave signals, but the first-cancel-control-signal D/A converting portions 153, 154, second-cancel-control-signal D/A converting portions 163, 164, and phased-array-control-signal D/A converting portions 306, 307 can be provided by inexpensive low-speed D/A converters to generate the transmission signal and the first and second cancel signals having the controlled amplitudes and phases, by using analog amplitude control signals, whereby the interrogator 1 is available at a relatively low cost. That is, the interrogator 1 can be made simple in construction and accordingly inexpensive, since the frequency required to control the amplitudes and phases of the first and second cancel signals is considerably lower than the frequency of the transmission signal.

In the sixth embodiment, the adaptive-array processing operation is performed independently of the phased-array processing operation, only for the reception of the reply signals. However, the adaptive-array processing operation may be performed by the adaptive-array processing portion 303, for the transmission of the transmission signal as well as for the reception of the reply signals, by using the weights determined in the adaptive-array processing for the reception. Described in detail, the interrogator 1 may be provided with an adaptive-array-control-signal output portion similar to the phased-array-control-signal output portion 305, and a composite-sine-wave-signal output portion operable according to a control signal generated by the adaptive-array-control signal output portion, for generating a composite sine-wave signal having an amplitude and a phase which are controlled to maximize the gain of the antennas 2-1, 2-2, 2-3 upon transmission of the transmission signal toward the RFID tags T, on the basis of the direction in which the antennas 2 have the highest sensitivity of reception of the reply signals from the RFID tags T.

The composite-sine-wave-signal generating circuits 180, 190, 180', 190', 180", 190", 304 are arranged to receive the plurality of input control signals as shown in FIGS. 37-39 and 41, these generating circuits are not limited to the details shown in these figures, and may modified to reduce the number of the input control signals.

Figure 42:
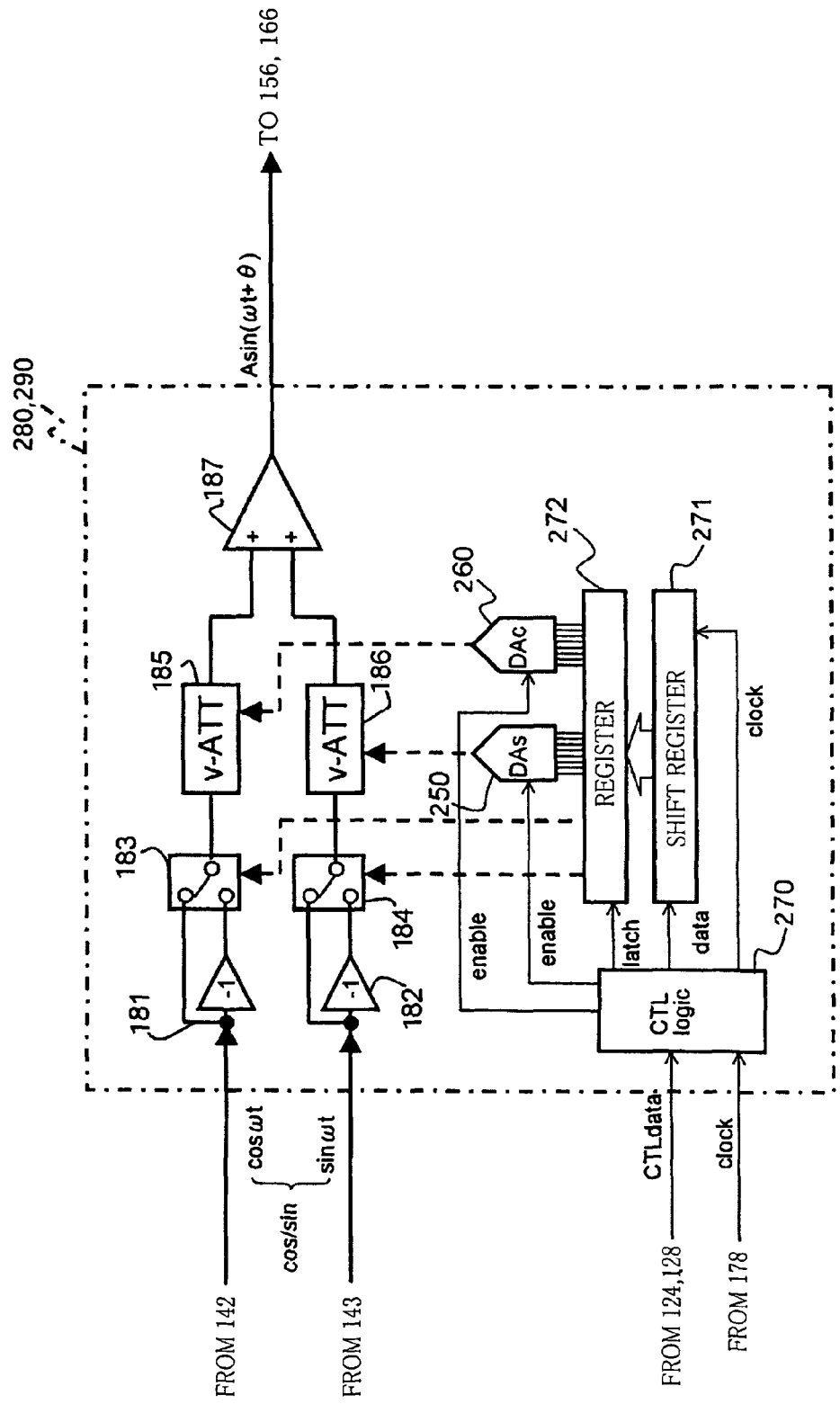
FIG. 42 is a circuit diagram showing in detail a modified composite sine-wave generating circuit which is simplified in the control signal received by the circuit.

Referring to the circuit diagram of FIG. 42, there is shown in detail an example of an arrangement of a modified composite-sine-wave-signal generating circuit 280, 290. In FIG. 42, the same reference signs as used in FIG. 37 are used to identify the same elements, the description of which is omitted or simplified.

The composite-sine-wave-signal generating circuit 280 shown in FIG. 42 includes low-speed D/A converters 250, 260, a logic circuit 270, a shift register 271 and a register 272. The logic circuit 270 is operable as an amplitude control portion to generate an amplitude control signal, on the basis of an input serial signal. The shift register 271 and register 272 are operable as a registering portion to generate an amplitude control signal and a polarity control signal for controlling the first and second sine-wave signals, on the basis of a serial-data signal extracted by the logic circuit 270. The low-speed D/A converters 250, 260 are arranged to convert the amplitude control signal into an analog signal.

In the composite-sine-wave-signal generating circuit 280 arranged as described above, control signal line information and data to be applied to the D/A converters 250, 260 are supplied as serial data from the first-cancel-control-signal output portion 124 to the logic circuit 270. The shift register 271 receives the serial data signal from the logic circuit 270, and converts the received serial data signal into a parallel data signal. The lock signal received from the clock-signal output portion 178 is made effective by a start bit inserted before the received serial data, and is made ineffective upon expiration of a predetermined time defined by a predetermined bit received by the shift register 271, so that the parallel data in the shift register 271 are latched by the register 272, and the values of the bits (at least a portion of the parallel data in the shift register 271) are applied as the above-described amplitude control signal to the variable attenuators 185, 186 through the D/A converters 250, 260, and are applied as the polarity control signal to the switches 183, 184.

As described above, the composite-sine-wave-signal generating circuit 280 is arranged to control the amplitudes and phases of the first and second sine-wave signals according to the amplitude control signal and the polarity control signal generated on the basis of the parallel signal obtained by conversion of the output of the logic circuit 270. Accordingly, the first and second sine-wave signals can be controlled by using a single signal line extending from the first-cancel-control-signal output portion 124 (or the second-cancel-control-signal output portion 128 or phased-array-control-signal output portion 305).

Figure 43:
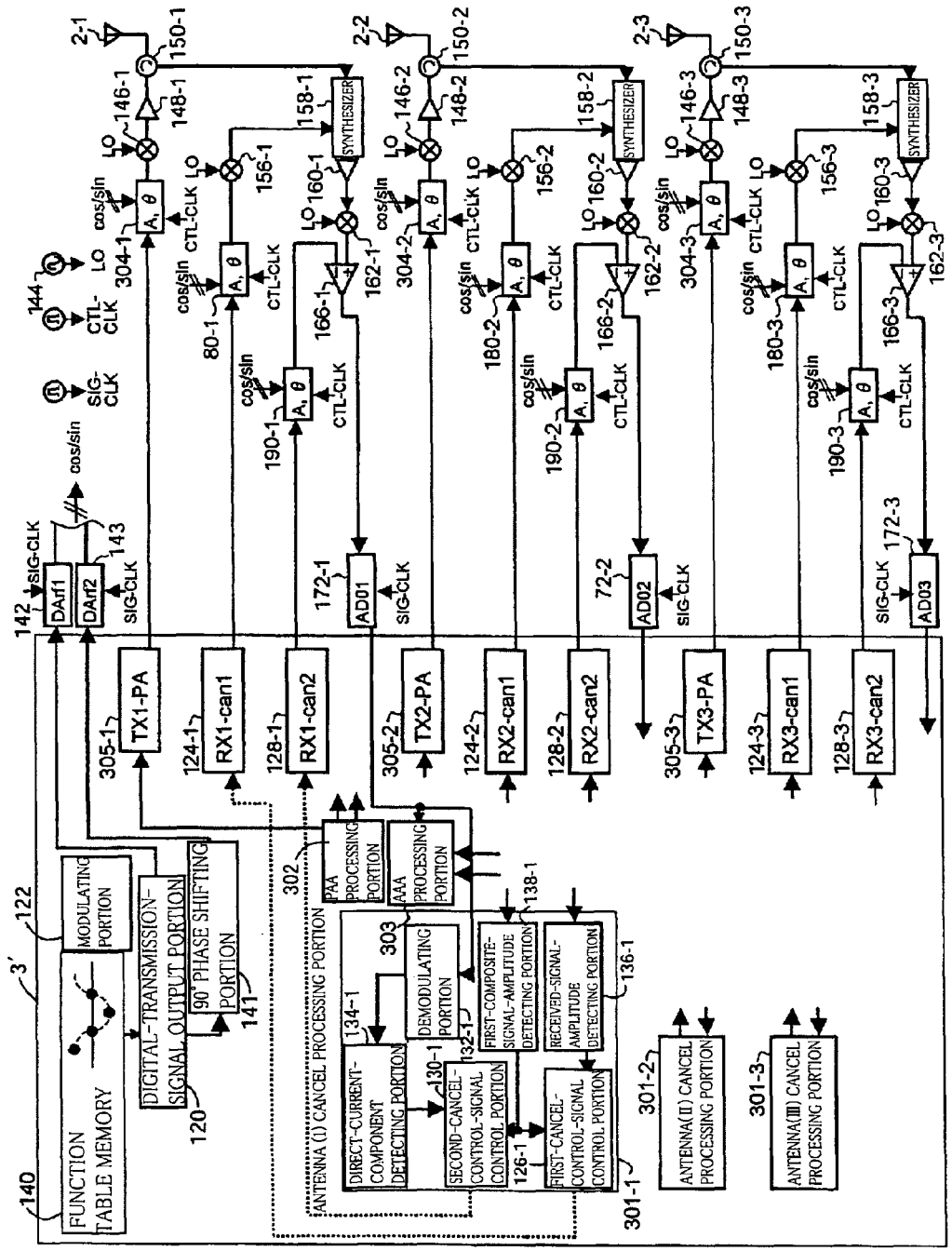
FIG. 43 is a circuit diagram showing a composite sine-wave signal generating circuit which is obtained by applying the composite sine-wave signal generating circuit of FIG. 42 to the circuit of FIG. 40.

The circuit diagram of FIG. 43 shows the interrogator of FIG. 40 as modified to use the composite-sine-wave-signal generating circuit 280 of FIG. 42 as each of the first-composite-sine-wave-signal generating circuits 180-1, 180-2, 180-3, second composite-sine-wave-signal generating circuits 190-1, 190-2, 190-3, and third-composite-sine-wave-signal generating circuits 304-1, 304-2, 304-3. As shown in FIG. 43, the number of the signal lines required I the composite-sine-wave-signal generating circuit 280 is effectively reduced, and the arrangement of the generating circuit 280 is simplified.

Embodiment 7

Figure 44:
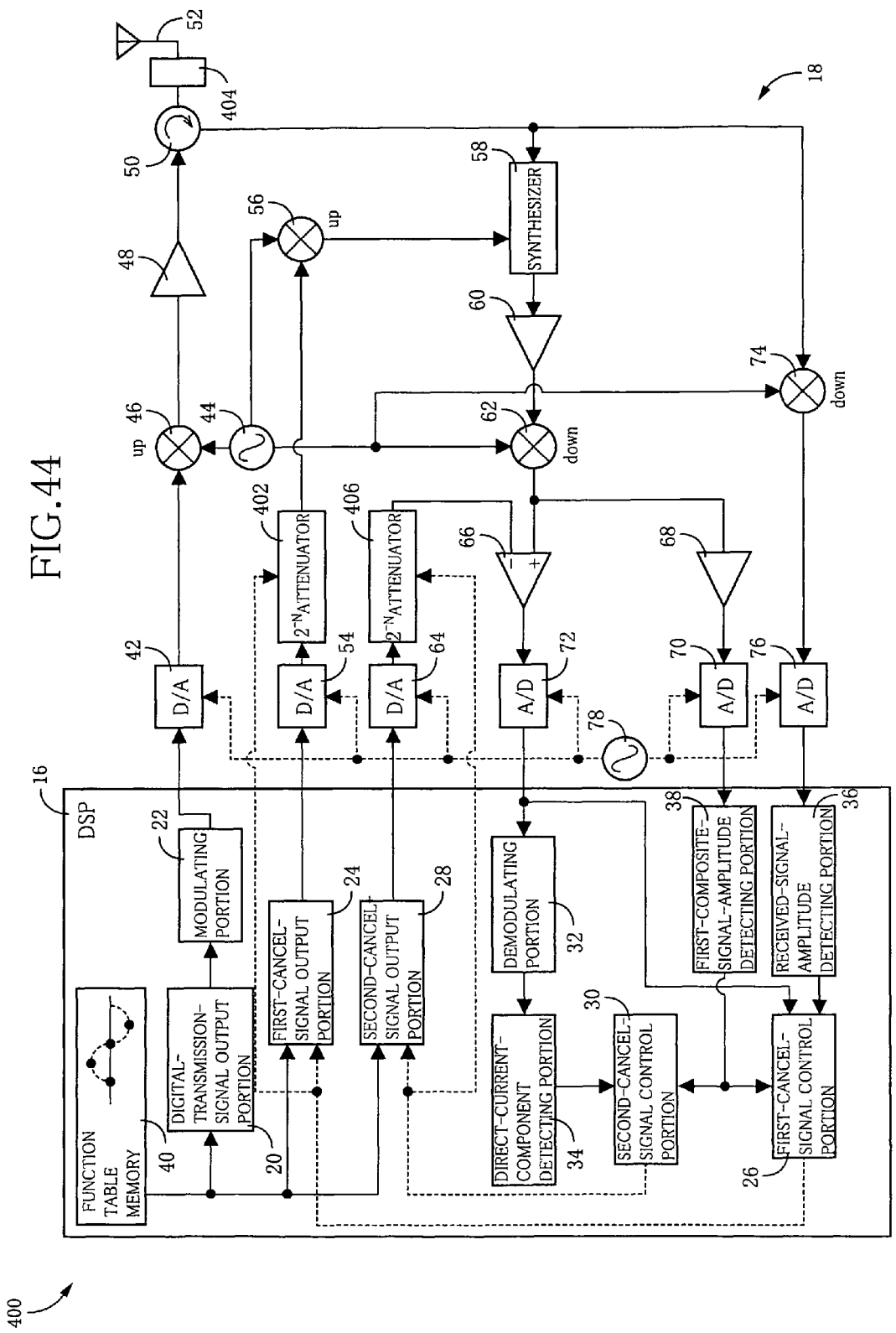
FIG. 44 is a view showing an arrangement of an RFID-tag communication device constructed according to a seventh embodiment of this invention.

Referring next to FIG. 44, there is shown an RFID-tag communication device 400 constructed according to a seventh embodiment of this invention, which includes a first-cancel-signal attenuator 402, in addition to the elements provided in the RFID-tag communication device 12 of FIG. 2. The first-cancel-signal attenuator 402 is disposed to receive the analog first cancel signal generated by the first-cancel-signal D/A converting portion 54, so that the analog first cancel signal is attenuated on the basis of the control signal generated from the first-cancel-signal control portion 26, to reduce its amplitude depending upon the leakage signal that is a part of the transmission signal which is transmitted from the RFID-tag communication device 400 and which is returned to this communication device 400. The attenuated first cancel signal is applied to the second up-converter 56. The RFID-tag communication device 400 further includes a filter 404 interposed between the transmission/reception separator 50 and the transmitter/receiver antenna 52, and a second-cancel-signal attenuator 406 disposed to receive the analog second cancel signal generated by the second-cancel-signal D/A converting portion 64, so that the analog second cancel signal is attenuated on the basis of the second control signal generated from the second-cancel-signal control portion 30, to reduce its amplitude depending upon the leakage signal. The attenuated second cancel signal is applied to the second signal combining portion 66.

Figure 45:
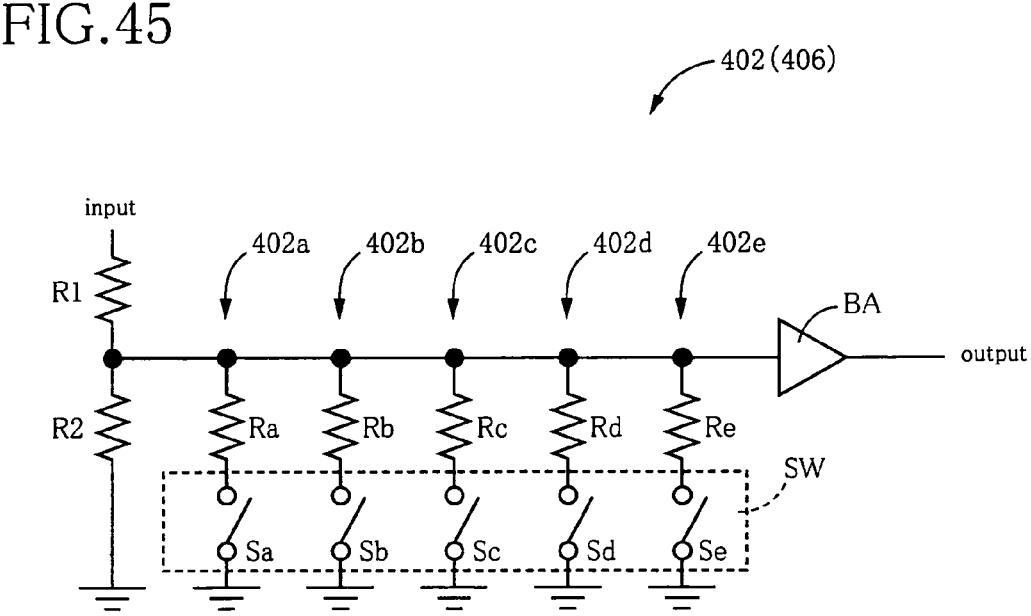
FIG. 45 is a view showing an arrangement of an attenuator provided in the RFID-tag communication device of FIG. 44.

FIG. 45 shows an arrangement of the first-cancel-signal attenuator 402. Since the second-cancel-signal attenuator 406 has the same arrangement as the first-cancel-signal attenuator 402, only the first-cancel-signal attenuator 402 will be described. As shown in FIG. 45, the first-cancel-signal attenuator 402 includes a switching device SW having resistors R1 and R2, five dividers 402a, 402b, 402c, 402d and 402e in the form of five resisters Ra, Rb, Rc, Rd and Re, and five switches Sa, Sb, Sc, Sd and Se for selectively operating the five dividers. The first-cancel-signal attenuator 402 further includes a buffer amplifier BA having a buffer function. While the register R1 is grounded in the present embodiment, it may be grounded through a suitable switch. The switching device SW is preferably arranged to selectively connect the resisters Ra, Rc, Rc, Rd, Re to the ground. Thus, the first-cancel-signal attenuator 402 is arranged to change the amount of attenuation of the cancel signal to a selected one of different values. Preferably, the different values to which the cancel signal can be selectively attenuated are multiples of ½, namely, ½, ¼, ⅛, ⅟₁₆ and ⅟₃₂, for example.

Figure 46:
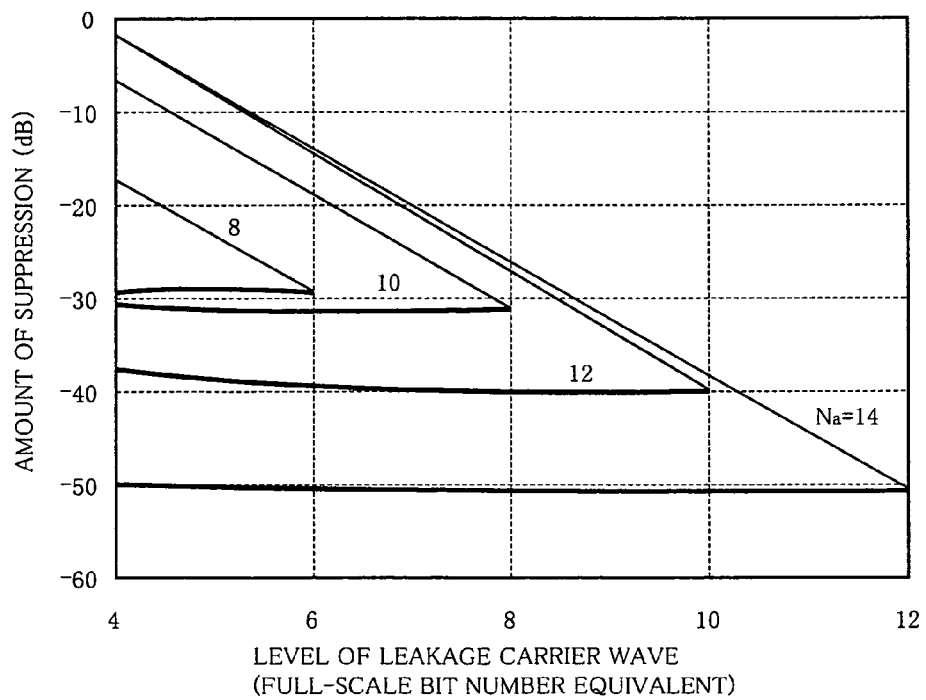
FIG. 46 is a view indicating a relationship between a leakage carrier wave level and an amount of suppression.

Referring to FIG. 46, there will be described a relationship between the level of a leakage carrier wave and an amount of suppression. The unnecessary or leakage signal mixed in the received signal received by the communication device 400 includes a leakage signal which is a part of the transmission signal (carrier wave) which leaks from the transmission/reception separator 50, and a leakage signal that is a part of the transmission signal which is transmitted from the communication device 400 and which is reflected by an external object and returned back to the communication device 400. Where the communication device uses separate transmitter antenna and receiver antenna, the leakage signal mixed in the received signal includes a signal transmitted by the transmitter antenna and received by the receiver antenna directly or indirectly from the transmitter antenna. Where a 14-bit D/A converter is used, the maximum amount of suppression is 50 dB, as indicated in FIG. 46. When the amplitude of the leakage carrier wave is reduced to ¼, that is, when the leakage carrier wave level is reduced to about 12 bits to about 10 bits (full-scale input bit number equivalent of the D/A converter), the amount of suppression is reduced by about 10 dB. When the leakage carrier wave level is reduced to about 6 bits (full-scale input bit number equivalent of the D/A converter), the amount of suppression is reduced by about 15 dB. It is noted that a high-resolution D/A converter has a relatively large conversion error, the phase error increases with a decrease in the level of the generated signal, so that the amount of suppression may be insufficient. In the present RFID-tag communication device 400, the amount of attenuation of the first cancel signal by the first-cancel-signal attenuator 402 connected to the output of the first-cancel-signal D/A converting portion 54 is variable to a selected one of values $2^{-N}$ (namely, ½, ¼, ⅛, . . . ). Accordingly, the amount of attenuation can be changed as desired depending upon the amplitude of the leakage signal. Thus, the amplitude of the first cancel signal generated by the first-cancel-signal D/A converting portion 54 can be adjusted by the first-cancel-signal attenuator 402, depending upon the level of the leakage carrier wave, so that the output of the first-cancel-signal D/A converting portion 54 is held between 2 and 3 bits (full-scale bit number equivalents). Accordingly, the amount of suppression of about 45-51 dB is obtained irrespectively of the level of the leakage carrier wave, where the 14-bit D/A converter is used, so that the unnecessary or leakage signal can be effectively suppressed from the received signal. Fine adjustment of the amplitude and phase of the first cancel signal can also be made according to the control signal applied to the first-cancel-signal D/A converting portion 54. As described above, four sampling values in the function table stored in the function table 40 are used per one period, so that the phase of the first cancel signal can be controlled with high accuracy in a highly efficient manner. Further, the filter 404 interposed between the transmission/reception separator 50 and the transmitter/receiver antenna 52 can suppress a quantization error which is a higher harmonic, so that the transmission signal to be transmitted from the communication device 400 has a high signal-to-noise (S/N) ratio. Further, the filter 404 which prevents an increase of the noise floor assures the high signal-to-noise ratio in spite of the attenuation of the first cancel signal by the first-cancel-signal attenuator 402.

Referring to the flow charts of FIGS. 47-50, there will be described control operations of the DSP 16 of the RFID-tag communication device 400 to suppress the leakage signal. A control routine shown in the flow charts corresponds to the control routine shown in the flow charts of FIGS. 14-19. Described in detail, the flow charts of FIGS. 47-40 respectively correspond to those of FIGS. 14, 15, 17 and 18. The control operations of FIGS. 16 and 19 are also performed in the present seventh embodiment. The control operations of the DSP 16 of the RFID-tag communication device 400 which are different from those in the first embodiment will be described by reference to the flow charts of FIGS. 47-50.

Figure 47:
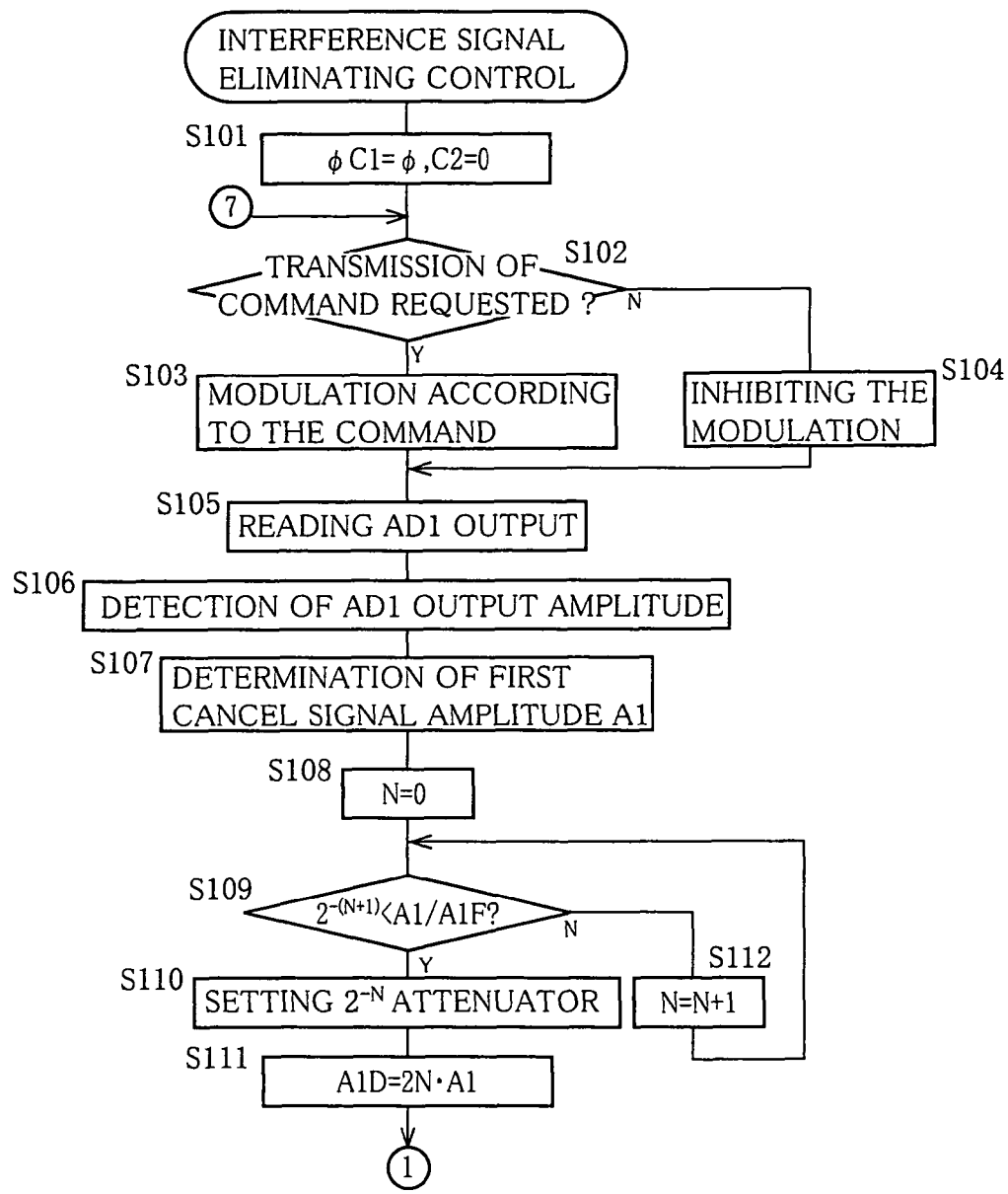
FIG. 47 is a part of a flow chart illustrating control operations of a DSP of the RFID-tag communication device of FIG. 44 to suppress a leakage signal that is a part of the transmission signal transmitted from the RFID-tag communication device and returned to the communication device, this part corresponding to that of FIG. 14.

The present control routine is initiated with step S101 of FIG. 47 to reset the phase $\phi C1$ of the first cancel signal and $\phi C2$ of the second cancel signal to "0". Then, the control flow goes to step S102 to determine whether a command signal should be transmitted toward the RFID tags 14. The transmission of the command signal is requested in an upper-order control routine (not shown). If an affirmative decision is obtained in step S102, the control flow goes to step S103 corresponding to the modulating portion 22 to modulate the above-described transmission signal according to the command signal. Then, step S105 and the following steps are implemented. If a negative decision is obtained in step S102, the control flow goes to step S104 to inhibit the modulation of the transmission signal, and then goes to the step S105 and the flowing steps. The step S105 is provided to read the received signal AD1 which has been converted into the digital signal by the received-signal A/D converting portion 76. In the next step S106 corresponding to the received-signal-amplitude detecting portion 36, the amplitude of the received signal AD1 read in the step S105 is detected. In the next step S107, the amplitude A1 of the first cancel signal is determined. Then, the control flow goes to step S108 to reset the number "N" to "0", and to step S109 to determine whether $2^{-(N+1)}$ is smaller than A1/A1F. The value A1F is the full-scale value. If a negative decision is obtained in the step S108, the control flow goes to step S112 to increment the number "N", and goes back to the step S109. If an affirmative decision is obtained in the step S109, the control flow goes to step S110 to set the amount of attenuation by the first-cancel-signal attenuator 402 to "$2^{-N}$", and then to step S111 to set the value A1D to "2N·A1". Then, the control flow goes to step S113 and the following steps of FIG. 48.

Figure 48:
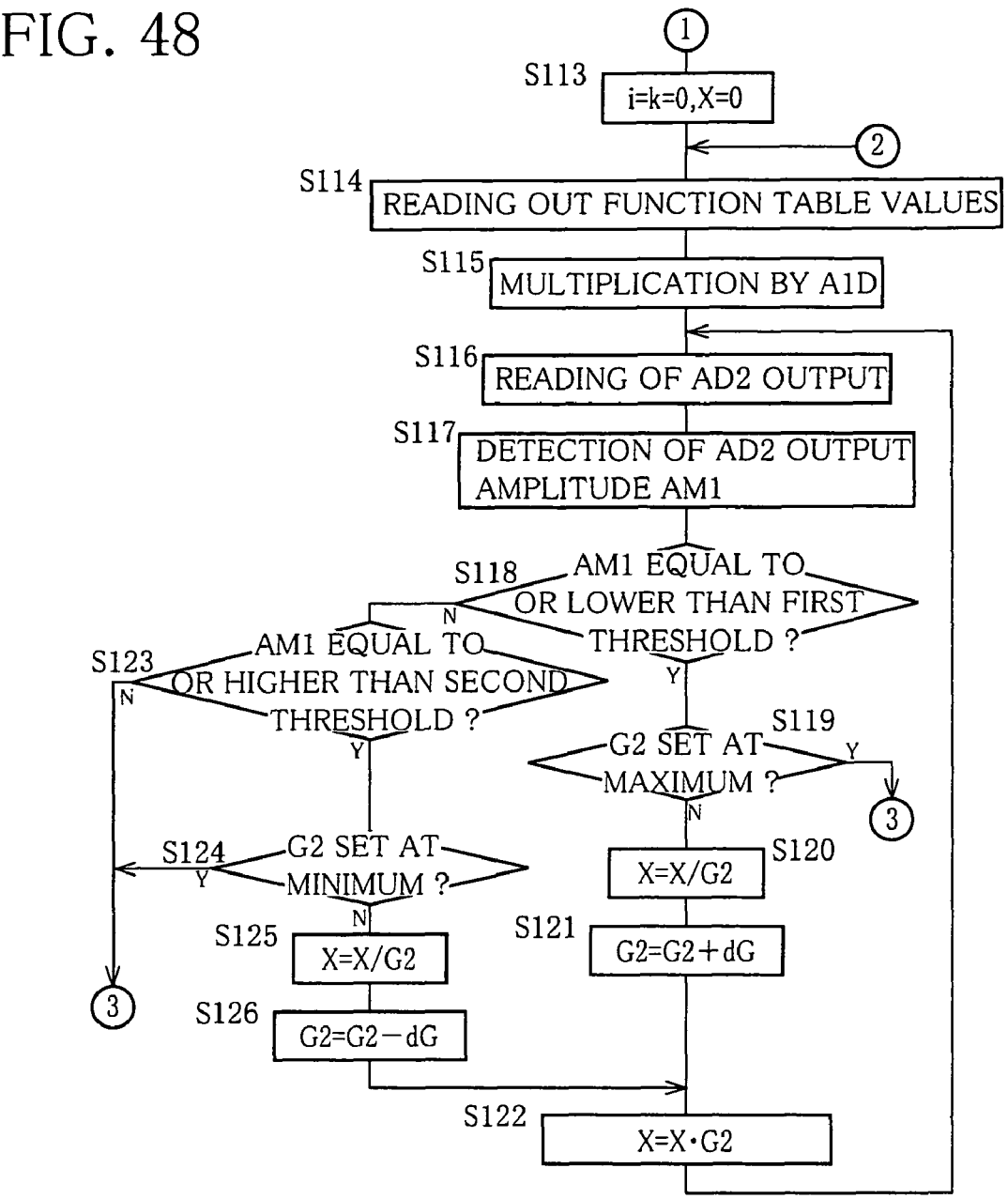
FIG. 48 is another part of the flow chart illustrating the above-described control operations of the DSP of the RFID-tag communication device of FIG. 47, this part corresponding to that of FIG. 15.

In the step S113 of FIG. 48, variables "i", "k" and "X" are reset to "0". The control flow then goes to step S114 to read out function values from the function table 40. In the next step S115, the function values read out in the step S114 are multiplied by the amplitude A1D determined in the step S111. The control flow then goes to step S116 to read the first composite signal AD2 which has been converted into the digital signal by the first-composite-signal A/D converting portion 70. In the next step S117, the amplitude AM1 of the first composite signal detected in the step S116 is detected.

Then, the control flow goes to step S118 to determine whether the amplitude AM1 of the first composite signal detected in the step S117 is equal to or lower than a first threshold value. If a negative decision is obtained in the step S-118, the control flow goes to step S123 and the following steps. If an affirmative decision is obtained in the step S118, the control flow goes to step S119 to determine whether the gain G2 of the third amplifying portion 68 is set at the maximum value. If an affirmative decision is obtained in step S119, that is, if the gain G2 of the third amplifying portion 68 is set at the maximum value, the control flow goes to the step S21 of the flow chart of FIG. 16 described above with respect to the first embodiment. If a negative decision is obtained in the step S119, that is, the gain G2 is not set at the maximum value, the control flow goes to step S120 to divide the variable. "X" by the gain G2 of the third amplifying portion 68. The step S120 is followed by step S121 to add a predetermined value dG to the gain G2, and step S122 to multiply the variable "X" by the gain G2. Then, the control flow goes back to the step S116. The step S123 is provided to determine whether the amplitude AM1 of the first composite signal detected in the step S117 is equal to or larger than a second threshold value. That is, an optimum range of the amplitude AM1 in which the input voltage of the first-composite-signal A/D converting portion 70 is adequate is defined by the first threshold value that is a lower limit, and a second threshold value that is an upper limit. If the input voltage is initially lower than the first threshold value or lower limit, the gain G2 of the third amplifying portion 68 should be increased. If the affirmative decision is obtained in the step S118, therefore, the control flow goes to the step S119 to determine whether the gain G2 of the third amplifying portion 68 is set at the maximum value. If the negative decision is obtained in the step S118, the control flow goes to the step S123 to determine whether the amplitude AM1 of the first composite signal detected in the step S12 is equal to or higher than the second threshold value. If a negative decision is obtained in the step S123, this means that the input voltage of the first-composite-signal A/D converting portion 70 is adequate. In this case, the control flow goes to step S21 of the flow chart of FIG. 16 and the following steps. If an affirmative decision is obtained in the step S123, that is, if the input voltage of the first-composite-signal A/D converting portion 70 is higher than the second threshold value or upper limit, the control flow goes to step S124 to determine whether the gain G2 is set at the minimum value. If an affirmative decision is obtained in the step S124, the control flow goes to the step S21 of the flow chart FIG. 16 and the following steps. If a negative decision is obtained in the step S124, the control flow goes to step S125 to divide the variable "X" by the gain G2, and to step S126 to subtract the predetermined value dG from the gain G2. Then, the control flow goes to the step S122 and the following steps. Thus, the gain G2 of the third amplifying portion 68 is controlled such that the amplitude AM1 of the first composite signal (the input voltage of the first-composite-signal A/D converting portion 70) is held within the optimum range, so that the communication of the RFID-tag communication device 400 with the RFID tags 14 can be effected with high sensitivity, even when the amplitude of the first composite signal generated by the first signal combining portion 58 is reduced by the suppression of the leakage signal.

Figure 49:
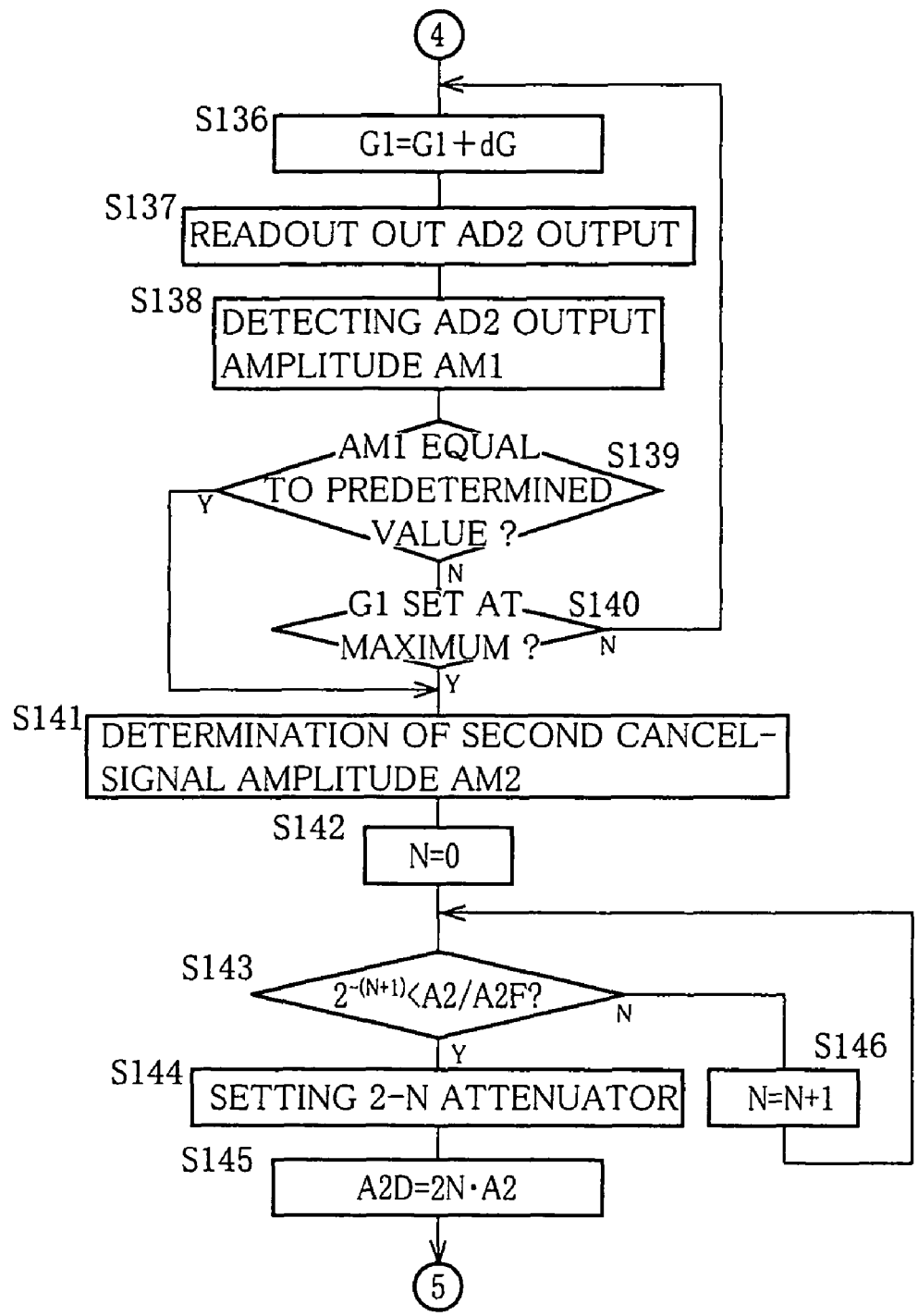
FIG. 49 is a further part of the flow chart illustrating the above-described control operations of the DSP, this part corresponding to that of FIG. 17.

The control operation of the flow chart of FIG. 16 is followed by step S136 of the flow chart of FIG. 49 in which the predetermined value dG is added to the gain G1 of the second amplifying portion 60. Then, step S137 is implemented to read the first composite signal which has been converted into the digital signal by the first-composite-signal A/D converting portion 70. Step S138 is then implemented to detect the amplitude AM1 of the first composite signal read in the step S138. The control flow then goes to step S139 to determine whether the amplitude AM1 of the first composite signal detected in the step S138 is set equal to a predetermined value. If an affirmative decision is obtained in the step S139, the control flow goes to step S141. If a negative decision is obtained in the step S139, the control flow goes to step S140 to determine whether the gain G1 of the second amplifying portion 60 is set at the maximum value. If a negative decision is obtained in the step S140, the control flow goes back to the step S136 and the flowing steps. If an affirmative decision is obtained in the step S140, the control flow goes to the above-indicated step S141 to determine the amplitude A2 of the second cancel signal. The step S141 is followed by step S142 to reset the number "N" to zero. Then, step S143 is implemented to determine whether $2^{-(N+1)}$ is smaller than A2/A2F. The value A2F is the full-scale value. If a negative decision is obtained in the step S143, the control flow goes to step S146 to increment the number "N", and goes back to the step S143. If an affirmative decision is obtained in the step S143, the control flow goes to step S144 to set the amount of attenuation by the second-cancel-signal attenuator 406 to "$2^{-N}$". Then, step S145 is implemented to set the value A2D to 2N·A2. The control flow then goes to the of FIG. 50 and the flowing steps. The operation of the DSP 16 described above permits high-frequency amplification by the second amplifying portion 60 of the received signal the amplitude-modulated component of which is increased as a result of suppression of the leakage signal. Accordingly, the present RFID-tag communication device 400 permits detection of the reply signals with high sensitivity, with a reduced influence of the noise.

Figure 50:
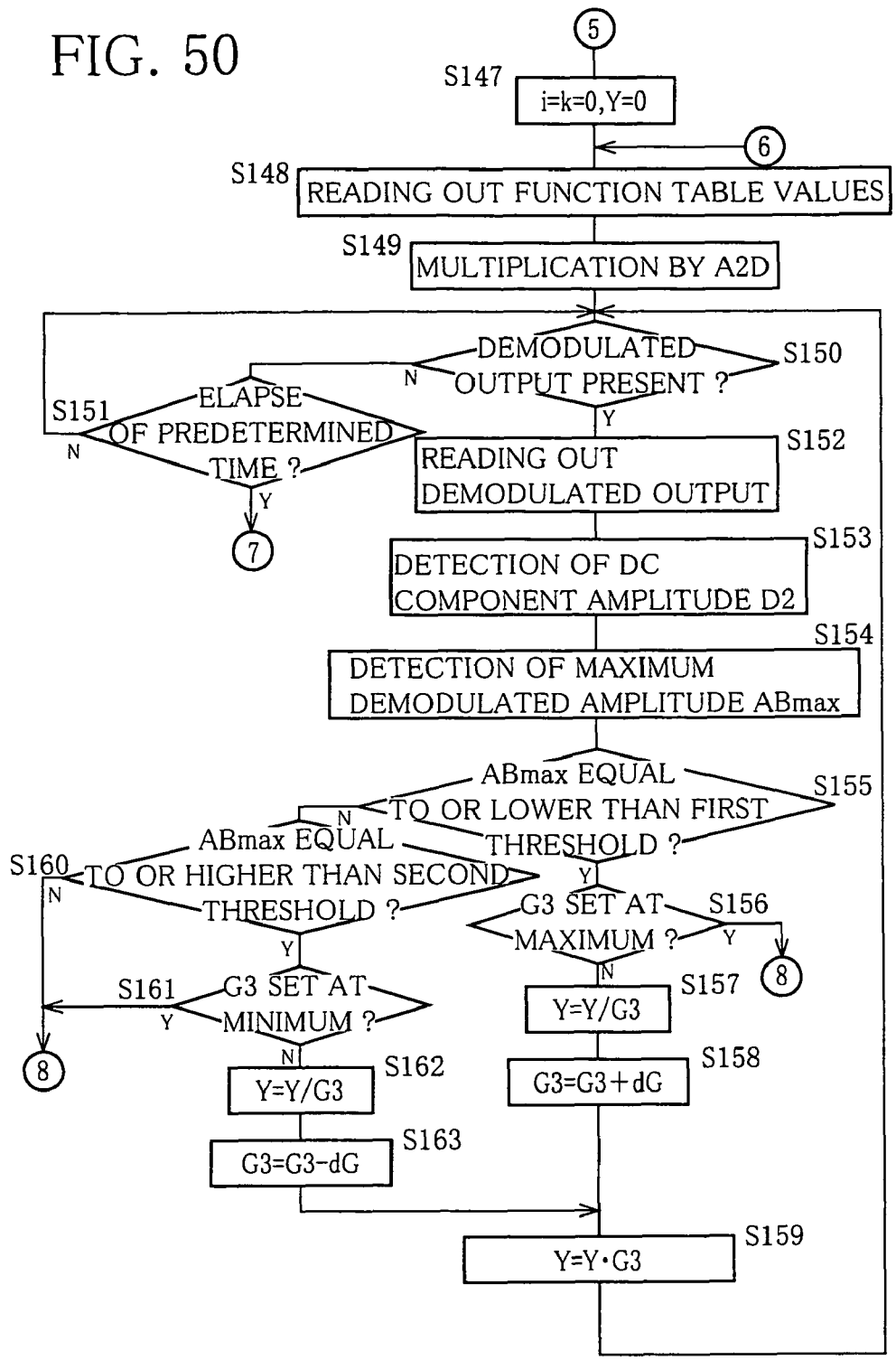
FIG. 50 is a still further part of the flow chart illustrating the control operations of the DSP, this part corresponding to that of FIG. 18.

In the step S147 of FIG. 50, the variables "i", "k" and "Y" are reset to "0". Then, step S148 is implemented to read out the function values from the function table 40. The control flow then goes to step S149 to multiply the function values read out in the step S148, by the amplitude AD2 determined in the step S145. Step S150 is then implemented to determine whether the demodulated signal output of the demodulating portion 32 is present. If a negative decision is obtained in the step S150, the control flow goes to step S151 determine whether a predetermined time has elapsed. If an affirmative decision is obtained in the step S151, this means that the RFID tags 14 have not transmitted the reply signals. In this case, the control flow goes back to the step S102 of FIG. 47 and the following steps. If a negative decision is obtained in the step S151, the control flow goes back to the step S150. If an affirmative decision is obtained in the step S150, that is, if the demodulated signal output of the demodulating portion 32 is present, the control flow goes to step S152 corresponding to the demodulating portion 32, to read the demodulated second composite signal generated by the demodulating portion 32. Then, step S153 corresponding to the direct-current-component detecting portion 34 is implemented to detect the amplitude D2 of the direct current component of the demodulated second composite signal. The control flow then goes to step S154 to detect a maximum amplitude $AB_{max}$ of the modulated second composite signal, and step S155 to determine whether the maximum amplitude $AB_{max}$ of the demodulated signal detected in the step S154 is equal to or lower than a first threshold value (which is different from the first threshold value used in the step S118 of FIG. 48). That is, an optimum range of the amplitude $AB_{max}$ in which the input voltage of the second-composite-signal A/D converting portion 72 is adequate is defined by the first threshold value that is a lower limit, and a second threshold value that is an upper limit. If the input voltage is initially lower than the first threshold value or lower limit, the gain G3 of the second signal combining portion 66 should be increased. If an affirmative decision is obtained in the step S155, therefore, the control flow goes to step S156 to determine whether the gain G3 of the second signal combining portion 66 is set at the maximum value. If a negative decision is obtained in the step S155, the control flow goes to step S160 to determine whether the amplitude $AB_{max}$ of the modulated second composite signal detected in the step S154 is equal to or higher than the second threshold value (which is different from the second threshold value used in the step S123 of FIG. 48). If a negative decision is obtained in the step S160', the control flow goes to step S52 of FIG. 19 and the following steps. If an affirmative decision is obtained in the step S160, that is, if the input voltage of the second-composite-signal A/D converting portion 72 is higher than the second threshold value or upper limit, the control flow goes to step S161 to determine whether the gain G3 is set at the minimum value. If an affirmative decision is obtained in the step S156, that is, the gain G3 of the second signal combining portion 66 is set at the maximum value, the control flow goes to the step S52 of FIG. 19 and the following steps. If a negative decision is obtained in the step S156, that is, if the gain G3 of the second signal combining portion 66 is not set at the maximum value, the control flow goes to step S157 to divide the variable "Y" by the gain G3. The step S157 is followed by step S158 to add a predetermined value dG to the gain G3, to increase the amplifying factor of the second signal combining portion 66, and step S159 to multiply the variable "Y" by the gain G3. Then, the control flow goes back to the step S150. If an affirmative decision is obtained in the step S161, that is, if the gain G3 of the second signal combining portion 66 is set at the minimum value, even where the input voltage of the second-composite-signal A/D converting portion 72 is higher than the upper limit, the control flow goes to the step S52 of FIG. 16 and the following steps. If a negative decision is obtained in the step S161, that is, if the gain G3 of the second signal combining portion 66 is not set at the minimum value, the control flow goes to step S162 to divide the variable "Y" by the gain G3, and to step S163 to subtract the predetermined value dG from the gain G3, to reduce the amplifying factor of the second signal combining portion 66. Then, the control flow goes to the step S159 and the following steps.

As described above, the RFID-tag communication device 440 includes: the first-cancel-signal output portion 24 operable to generate the first cancel signal in the form of a digital signal for suppressing from the received signal the leakage signal that is a part of the transmission signal which is transmitted from the transmitter/receiver antenna 52 and which is returned to and received by the antenna 52; the first-cancel-signal D/A converting portion 54 operable to convert the first cancel signal generated by the first-cancel-signal output portion 24, into an analog signal; the first-cancel-signal control portion 26 operable to generate a first control signal for controlling the amplitude A1 and/or the phase $\phi$C1 of the first cancel signal generated by the first-cancel-signal output portion 24; the first-cancel-signal attenuator 402 operable according to the first control signal generated by the first-cancel-signal control portion, to attenuate the analog first cancel signal generated by the first-cancel-signal D/A converting portion 54, to an amplitude corresponding to the leakage signal; and the first signal combining portion 58 operable to combine together the first cancel signal which has been attenuated by the first-cancel-signal attenuator 402, and the received signal, to obtain the first composite signal. Accordingly, the present RFID-tag communication device 400 permits effective suppression of the leakage signal by adequately controlling the first-cancel-signal attenuator 402 depending upon the level of the leakage signal, even where the leakage signal has a comparatively low intensity. Namely, the present RFID-tag communication device 12 is capable of suppressing the leakage signal with a simple arrangement, irrespective of the level or intensity of the leakage signal.

The first-cancel-signal attenuator 402 may be arranged to attenuate the amplitude A1 of the first cancel signal to a value which is closest to but not larger than the amplitude of the leakage signal. In this case, the amplitude of the first control signal generated by the first-cancel-signal control portion 26 can be made equal to the maximum output amplitude of the first-cancel-signal D/A converting portion 54, or equal to a value close to ½ of the maximum output amplitude, so that the amplitude A1 and phase ϕC1 of the first cancel signal can be accurately controlled, and the leakage signal can be effectively suppressed.

The first-cancel-signal attenuator 402 is arranged to attenuate the amplitude A1 of the first cancel signal to a value which is larger than and closest to the amplitude of the leakage signal. In this case, the leakage signal can be effectively suppressed.

Further, the first-cancel-signal control portion 26 is arranged to generate the first control signal which causes the amplitude of the first cancel signal generated by the first-cancel-signal D/A converting portion 54, to be equal to ½ of the maximum amplitude, so that the leakage signal can be sufficiently suppressed.

The RFID-tag communication device 440 further includes: the second-cancel-signal output portion 28 operable to generate the second cancel signal in the form of a digital signal for suppressing from the received signal the leakage signal the second-cancel-signal D/A converting portion 64 operable to convert the second cancel signal generated by the second-cancel-signal output portion 24, into an analog signal; the second-cancel-signal output control 30 operable to generate a second control signal for controlling the amplitude A2 and/or the phase ϕC2 of the second cancel signal generated by the second-cancel-signal output portion 28; the second-cancel-signal attenuator 406 operable according to the second control signal generated by the second-cancel-signal control portion 30, to attenuate the analog second cancel signal generated by the second-cancel-signal D/A converting portion 64, to an amplitude corresponding to the leakage signal; and the second signal combining portion 66 operable to combine together the second cancel signal which has been attenuated by the second-cancel-signal attenuator 406, and the first composite signal generated by the first signal combining portion 58, to obtain the second composite signal. Accordingly, the present RFID-tag communication device 400 permits secondary suppression of the leakage signal at the second signal combining portion 66, as well as primary suppression of the leakage signal at the first signal combining portion 58, making it possible to further improve the signal-to-noise ratio.

The first-cancel-signal attenuator 402 and the second-cancel-signal attenuator 406 are arranged to change its amount of attenuation of the first and second cancel signals, to a selected one of different values, so that these attenuators 402, 406 can be simplified in construction, and the control to attenuate the cancel signals can be simplified.

Further, the different values to which the amount of attenuation of the first and second cancel signals by the attenuators 402, 406 is variable are multiples of ½, so that the circuit arrangement of the attenuators 402, 406 can be made considerably simple. Further, the control to attenuate the cancel signals can be simplified by a bit-shift logic using binary digits, for example.

Each of the attenuators 402, 406 includes the plurality of voltage dividers 402a through 402e in the form of the plurality of registers Ra through Re, and the plurality of switches Sa through Se operable to selectively operate the plurality of voltage dividers 402a through 402e. Thus, the attenuators 402, 406 are simple in construction and economical to manufacture.

The attenuator 402, 406 further includes the buffer amplifier BA functioning as a buffer device, which assures a stable operation of the attenuator.

Since the four sampling values are used by the cancel-signal D/A converting portions 54, 64, per one period of the output periodic function, the noise floor can be held low, permitting high-speed converting operations of the converting portions, and assuring a high signal-to-noise ratio of the analog cancel signals which have been attenuated by the attenuators 402, 406.

Embodiment 8

Figure 51:
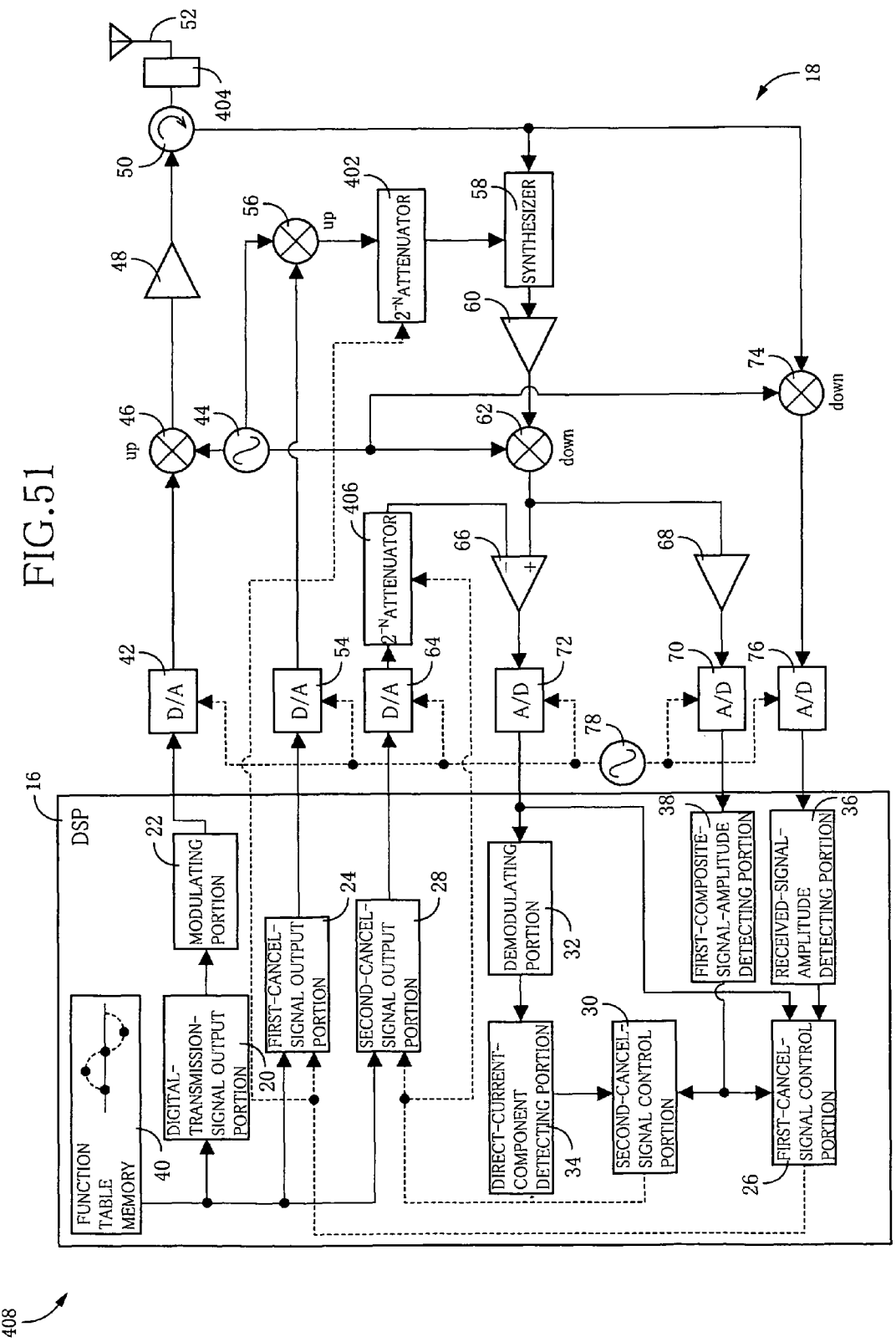
FIG. 51 is a view showing an arrangement of an RFID-tag communication device constructed according to an eighth embodiment of this invention.

Referring next to FIG. 51, there is shown an arrangement of an RFID-tag communication device 408 constructed according to an eighth embodiment of this invention, wherein the first-cancel-signal attenuator 402 is interposed between the second up-converter 56 and the first signal combining portion 58. The first-cancel-signal attenuator 402 attenuates the amplitude of the first cancel signal the frequency of which has been increased by the second up-converter 56, to a value corresponding to the leakage signal. Like the RFID-tag communication device 400 of the preceding seventh embodiment, this present RFID0-tag communication device 408 permits effective suppression of the leakage signal.

Embodiment 9

Referring to FIG. 52, there is shown an arrangement of an RFID-tag communication device 410 constructed according to a ninth embodiment of this invention, which includes a transmission-signal register 412 interposed between the modulating portion 22 of the DSP 16 and the transmission-signal D/A converting portion 42 of the transmitter/receiver circuit 18, and further includes a first-cancel-signal register 414 interposed between the first-cancel-signal output portion 24 of the DSP 16 and the first-cancel-signal D/A converting portion 54 of the circuit 18. The communication device 410 further includes: a high-speed clock-signal output portion 416 arranged to generate a clock signal to be applied to the transmission-signal D/A converting portion 42 and the first-cancel-signal D/A converting portion 54; a first frequency divider 418 arranged to supply the clock signal generated by the high-speed clock-signal output portion 416, to the second-cancel-signal D/A converting portion 64, first-composite-signal A/D converting portion 70, second composite-signal A/D converting portion 72, and received-signal A/D converting portion 76; a second frequency divider 420 arranged to supply the clock signal generated by the high-speed clock-signal output portion 416, to a PLL 422; and the PLL 422 arranged to generate a local oscillation signal having a predetermined frequency, according to the clock signal supplied from the second frequency divider 420, and supply the generated local oscillation signal to the first down-converter 62 and the second down-converter 74. It is possible to use 8-bit D/A converters for obtaining the amount of suppression of at least 20 dB, as indicated in FIG. 46. Since the 8-bit D/A converters are capable of comparatively high-speed D/A converting operations, the present RFID-tag communication device 410 is arranged to directly generate radio frequency signals. The modulated signal and the first cancel signal are temporarily stored in the registers 412, 414, which are accessible at a high speed. The present communication device 410 permits high-speed processing operations while assuring a high signal-to-noise ratio.

While the preferred embodiments of the present invention have been described in detail by reference to the drawings, it is to be understood that the invention is not limited to the details of the illustrated embodiments, and may be otherwise embodied.

Although the communication devices 400, 408, 410 according to the seventh through ninth embodiments includes both the first-cancel-signal attenuator 402 corresponding to the first cancel signal and the second-cancel-signal attenuator 406 corresponding to the second cancel signal, the communication device may include only one of those two attenuators 402, 406, provided the unnecessary or leakage signal can be sufficiently suppressed.

It is to be understood that the present invention may be embodied with various other changes not specifically described, without departing from the spirit of the invention.

What is claimed is:

1. An RFID-tag communication device including an antenna from which a transmission signal is transmitted toward an RFID tag and through which a reply signal transmitted from the RFID tag in response to the transmission signal is received, for radio communication with the RFID tag, said RFID-tag communication device comprising:
a first-cancel-signal output portion operable to generate a digital first cancel signal for suppressing a leakage signal from a received signal which is received through said antenna and which contains said leakage signal as well as said reply signal, said leakage signal being a part of said transmission signal which is transmitted from said antenna and which is returned to and received by said antenna;
a first-cancel-signal control portion operable to control an amplitude and/or a phase of said first cancel signal generated by said first-cancel-signal output portion;
a first-cancel-signal D/A converting portion operable to convert said first cancel signal, after said first cancel signal is generated by said first-cancel-signal output portion and controlled by said first-cancel-signal control portion, into an analog signal;
a first signal combining portion operable to combine together the analog first cancel signal generated by said first-cancel-signal D/A converting portion, and said received signal, to obtain a first composite signal;
a second-cancel-signal output portion operable to generate a digital second cancel signal for suppressing said leakage signal from said received signal;
a second-cancel-signal control portion operable to control an amplitude and/or a phase of said second cancel signal generated by said second-cancel-signal output portion;
a second-cancel-signal D/A converting portion operable to convert said second cancel signal generated by said second-cancel-signal output portion, into an analog signal;
a second signal combining portion operable to combine together the analog second cancel signal generated by said second-cancel-signal D/A converting portion, and said first composite signal, to obtain a second composite signal;
a demodulating portion operable to demodulate said second composite signal generated by said second signal combining portion; and
a direct-current-component detecting portion operable to detect a direct current component of the second composite signal demodulated by said demodulating portion, and wherein said second-cancel-signal control portion controls a phase of said second cancel signal on the basis of the direct current component of the demodulated second composite signal detected by said direct-current-component detecting portion.

2. The RFID-tag communication device according to claim 1, wherein said first and second cancel signals have respective different frequencies.

3. The RFID-tag communication device according to claim 1, further comprising an amplifying portion interposed between said first and second signal combining portions and operable to amplify an amplitude of said first composite signal generated by said first signal combining portion.

4. The RFID-tag communication device according to claim 1, further comprising an amplifying portion operable to amplify an amplitude of said second composite signal generated by said second signal combining portion.

5. The RFID-tag communication device according to claim 1, further comprising a received-signal-amplitude detecting portion operable to detect an amplitude of said received signal, and said first-cancel-signal control portion controls an amplitude of said first cancel signal, on the basis of the amplitude of said received signal detected by said received-signal-amplitude detecting portion.

6. The RFID-tag communication device according to claim 1, further comprising a first-composite-signal-amplitude detecting portion operable to detect an amplitude of said first composite signal generated by said first signal combining portion, and said first-cancel-signal control portion controls a phase of said-first cancel signal, on the basis of the amplitude of said first composite signal detected by said first-composite-signal-amplitude detecting portion.

7. The RFID-tag communication device according to claim 1, further comprising a first-composite-signal-amplitude detecting portion operable to detect an amplitude of said first composite signal generated by said first signal combining portion, and wherein said first-cancel-signal control portion controls a phase of said first cancel signal, on the basis of the amplitude of said first composite signal detected by said first-composite-signal-amplitude detecting portion, and said second-cancel-signal control portion controls an amplitude of said second cancel signal, on the basis of the amplitude of said first composite signal detected by said first-composite-signal-amplitude detecting portion.

8. The RFID-tag communication device according to claim 1, further comprising:
a first-composite-signal-amplitude detecting portion operable to detect an amplitude of said first composite signal generated by said first signal combining portion;
a digital-transmission-signal output portion operable to generate said transmission signal in the form of a digital signal;
a transmission-signal D/A converting portion operable to covert the digital transmission signal generated by said digital-transmission-signal output portion, into an analog signal;
a first-composite-signal A/D converting portion interposed between said first signal combining portion and said first-composite-signal-amplitude detecting portion and operable to convert said first composite signal generated by said first signal combining portion, into a digital signal;
a second-composite-signal A/D converting portion interposed between said second signal combining portion and said demodulating portion and operable to convert said second composite signal generated by said second signal combining portion, into an analog signal; and a received-signal A/D converting portion operable to convert said received signal into an analog signal, wherein said first-cancel-signal control portion controls a phase of said first cancel signal, on the basis of the amplitude of said first composite signal detected by said first-composite-signal-amplitude detecting portion, and wherein said first-cancel-signal D/A converting portion, said second-cancel-signal D/A converting portion, said transmission-signal D/A converting portion, said first-composite-signal A/D converting portion, said second-composite-signal A/D converting portion and said receive-signal A/D converting portion use a common clock signal.

9. The RFID-tag communication device according to claim 1, further comprising:
  a local-oscillation-signal output portion operable to generate a local oscillation signal:
  a first up-converter operable to increase a frequency of the analog transmission signal generated by said transmission-signal D/A converting portion, by an amount corresponding to a frequency of said local oscillation signal generated by said local-oscillation-signal output portion; and
  a first down-converter operable to reduce a frequency of said first composite signal generated by said first signal combining portion, by the frequency of said local oscillation signal generated by said local-oscillation-signal output portion.

10. The RFID-tag communication device according to claim 9, further comprising a second down-converter operable to reduce a frequency of said received signal, by an amount corresponding to the frequency of said local oscillation signal generated by said local-oscillation-signal output portion.

11. The RFID-tag communication device according to claim 9, wherein said local-oscillation-signal output portion is operable to effect hopping of frequency of said local oscillation signal.

12. The RFID-tag communication device according to claim 1, further comprising a digital-transmission-signal output portion operable to generate said transmission signal in the form of a digital signal, and a table storing a sine-wave or cosine-wave table which represents predetermined sampling values corresponding to respective phases at predetermined sampling points, wherein said digital-transmission-signal output portion generates said transmission signal on the basis of said sine-wave or cosine-wave table.

13. The RFID-tag communication device according to claim 12, wherein said first-cancel-signal output portion generates said first cancel signal on the basis of said sine-wave or cosine-wave table, and said first-cancel-signal control portion controls a phase of said first cancel signal by changing positions of said sine-wave or cosine-wave table from which said sampling values are read out.

14. The RFID-tag communication device according to claim 13, wherein said first-cancel-signal control portion controls an amplitude of said first cancel signal by multiplying the digital signal generated on the basis of said sine-wave or cosine-wave table, by a predetermined control value.

15. The RFID-tag communication device according to claim 12, further comprising a local-oscillation-signal output portion operable to generate a local oscillation signal, and a down-converter operable to reduce an amplitude of said received signal by an amount corresponding to a frequency of said local oscillation signal generated by said local-oscillation-signal output portion, and wherein said first-cancel-signal control portion controls an amplitude and a phase of said first cancel signal on the basis of said received signal or an output of said down-converter, and controls the phase of said first cancel signal on the basis of said second composite signal generated by said second signal combining portion.

16. The RFID-tag communication device according to claim 1, further comprising:
  a third-cancel-signal output portion operable to generate a third cancel signal for suppressing said leakage signal from said received signal;
  a third signal combining portion operable to combine together said third cancel signal generated by said third-cancel-signal output portion and said received signal, to obtain a third composite signal, and wherein said first-cancel-signal control portion controls an amplitude of said first cancel signal on the basis of said third composite signal generated by said third signal combining portion.

17. An RFID-tag communication device including an antenna from which a transmission signal is transmitted toward an RFID tag and through which a reply signal transmitted from the RFID tag in response to the transmission signal is received, for radio communication with the RFID tag, said RFID-tag communication device comprising:
  a first-cancel-signal output portion operable to generate a digital first cancel signal for suppressing a leakage signal from a received signal which is received through said antenna and which contains said leakage signal as well as said reply signal, said leakage signal being a part of said transmission signal which is transmitted from said antenna and which is returned to and received by said antenna;
  a first-cancel-signal control portion operable to control an amplitude and/or a phase of said first cancel signal generated by said first-cancel-signal output portion;
  a first-cancel-signal D/A converting portion operable to convert said first cancel signal, after said first cancel signal is generated by said first-cancel-signal output portion and controlled by said first-cancel-signal control portion, into an analog signal;
  a first signal combining portion operable to combine together the analog first cancel signal generated by said first-cancel-signal D/A converting portion, and said received signal, to obtain a first composite signal;
  a digital-transmission-signal output portion operable to generate said transmission signal in the form of a digital signal; and
  a table storing a sine-wave or cosine-wave table which represents predetermined sampling values corresponding to respective phases at predetermined sampling points,
  wherein said digital-transmission-signal output portion generates said transmission signal on the basis of said sine-wave or cosine-wave table;
  further comprising a second-cancel-signal output portion operable to generate said second cancel signal on the basis of said sine-wave or cosine-wave table, and a second-cancel-signal control portion operable to control a phase of said second cancel signal, by changing positions of said sine-wave or cosine-wave table from which said sampling values are read out.

18. The RFID-tag communication device according to claim 17, wherein said second-cancel-signal control portion controls an amplitude of said second cancel signal, by multiplying the digital signal generated on the basis of said sine-wave or cosine-wave table, by a predetermined control value.

19. An RFID-tag communication device including an antenna from which a transmission signal is transmitted toward an RFID tag and through which a reply signal transmitted from the RFID tag in response to the transmission signal is received, for radio communication with the RFID tag, said RFID-tag communication device comprising:

a first-cancel-signal output portion operable to generate a digital first cancel signal for suppressing a leakage signal from a received signal which is received through said antenna and which contains said leakage signal as well as said reply signal, said leakage signal being a part of said transmission signal which is transmitted from said antenna and which is returned to and received by said antenna;

a first-cancel-signal control portion operable to control an amplitude and/or a phase of said first cancel signal generated by said first-cancel-signal output portion;

a first-cancel-signal D/A converting portion operable to convert said first cancel signal, after said first cancel signal is generated by said first-cancel-signal output portion and controlled by said first-cancel-signal control portion, into an analog signal;

a first signal combining portion operable to combine together the analog first cancel signal generated by said first-cancel-signal D/A converting portion, and said received signal, to obtain a first composite signal;

a sine-wave-signal generating portion operable to generate a first sine-wave signal and a second sine-wave signal which have respective different phases;

an amplitude control portion operable to control amplitudes of said first and second sine-wave signals generated by said sine-wave-signal generating portion; and a sine-wave synthesizing portion operable to combine together said first and second sine-wave signals the amplitudes of which have been controlled by said amplitude control portion, to synthesize a composite sine-wave signal for radio communication.

20. The RFID-tag communication device according to claim 19, wherein said sine-wave-signal generating portion generates said first and second sine-wave signals which have a phase difference of about 90°, and said sine-wave synthesizing portion generates said composite sine-wave signal having an amplitude and a phase which are different from those of said first and second sine-wave signals.

21. The RFID-tag communication device according to claim 20, wherein said sine-wave-signal generating portion includes a carrier-wave output portion operable to generate said first sine-wave signal as said transmission signal in the form of a carrier wave for obtaining an access to said RFID tag, said antenna comprising a transmitter portion operable to transmit said carrier component generated by said carrier-wave output portion, toward said RFID tag, and a receiver portion operable to receive said reply signal transmitted from said RFID tag in response to said carrier wave, said sine-wave synthesizing portion generating said composite sine-wave signal as said first cancel signal which has an amplitude substantially equal to an amplitude of said leakage signal, and a phase that is reversed with respect to that of said leakage signal.

22. The RFID-tag communication device according to claim 21, wherein said first signal combining portion synthesizes said first composite signal by combining together said received signal received by said receiver portion, and said first cancel signal generated by said sine-wave synthesizing portion, said RFID-tag communication device further comprising an analog-to-digital converting portion operable to convert said first composite signal into an analog signal, and wherein said first digital-to-analog converting portion and said analog-to-digital converting portion receive a common clock signal.

23. The RFID-tag communication device according to claim 22, further comprising an up-converter operable to increase a frequency of said composite sine-wave signal generated by said sine-wave synthesizing portion, and a down-converter operable to reduce a frequency of said first composite signal generated by said first signal combining portion.

24. The RFID-tag communication device according to claim 21, wherein said sine-wave generating portion includes a first digital-to-analog converting portion operable to convert a set of sine-wave sampling values into said first sine-wave signal, and a second digital-to-analog converting portion operable to convert a set of sine-wave sampling values into said second sine-wave signal.

25. The RFID-tag communication device according to claim 22, wherein said sine-wave synthesizing portion synthesizes, in addition to said first cancel signal, a second cancel signal having an amplitude substantially equal to an amplitude of a carrier component of said first composite signal, and a phase that is reversed with respect to that of said carrier component of said first composite signal.

26. The RFID-tag communication device according to claim 19, wherein said antenna has a plurality of antenna elements for radio communication with said RFID tag, and said sine-wave synthesizing portion generates said composite sine-wave signal a phase of which has been controlled with respect to said plurality of antenna elements, such that the generated composite sine-wave signal is transmitted toward said RFID tag while a directivity of said plurality of antenna elements is controlled.

27. The RFID-tag communication device according to claim 26, wherein said sine-wave synthesizing portion transmits, toward said RFID tag, said composite sine-wave signal at least the phase of which has been controlled, such that the direction in which the plurality of antennas have a highest gain and which is temporarily held is sequentially changed.

28. The RFID-tag communication device according to claim 26, wherein said sine-wave synthesizing portion transmits, toward said RFID tag, said composite sine-wave signal an amplitude and the phase of which have been controlled, such that a sensitivity of reception by said plurality of antennas of said reply signal transmitted from said RFID tag is maximized.

29. The RFID-tag communication device according to claim 26, wherein said sine-wave generating portion includes a first digital-analog converter operable to convert a set of sine-wave sampling values into said first sine-wave signal, and a second digital-analog converter operable to convert a set of sine-wave sampling values into said second sine-wave signal.

30. The RFID-tag communication device according to claim 26, further comprising an up-converter operable to increase a frequency of said composite sine-wave signal synthesized by said sine-wave synthesizing portion.

31. The RFID-tag communication device according to claim 19, wherein said amplitude control portion includes a first variable attenuator operable to control the amplitude of said first sine-wave signal, and a second variable attenuator operable to control the amplitude of said second sine-wave signal, and a polarity switching portion operable to change polarities of the first and second sine-wave signals.

32. The RFID-tag communication device according to claim 31, wherein said amplitude control portion includes a logic circuit operable to generate a control signal in the form of a serial signal, and a registering portion operable to convert said serial signal into a parallel signal and generate an amplitude control signal and a polarity control signal on the basis of said parallel signal, said amplitude control signal and said polarity control signal being applied to said first and second variable attenuators and said polarity switching portion for controlling the amplitudes and polarities of said first and second sine-wave signals.

* * * * *